(12) United States Patent
Shirota et al.

(10) Patent No.: US 7,929,738 B2
(45) Date of Patent: Apr. 19, 2011

(54) MICROSCOPE APPARATUS AND MICROSCOPE SYSTEM

(75) Inventors: Tetsuya Shirota, Tokyo (JP); Yasuko Ishii, Tokyo (JP); Takashi Yoneyama, Sagamihara (JP)

(73) Assignee: Olympus Corporation, Tokyo (JP)

( * ) Notice: Subject to any disclaimer, the term of this patent is extended or adjusted under 35 U.S.C. 154(b) by 1174 days.

(21) Appl. No.: 11/545,416

(22) Filed: Oct. 10, 2006

(65) Prior Publication Data

US 2007/0081231 A1 Apr. 12, 2007

(30) Foreign Application Priority Data

Oct. 11, 2005 (JP) ................... 2005-296434
Oct. 31, 2005 (JP) ................... 2005-316240
Nov. 14, 2005 (JP) ................... 2005-328835

(51) Int. Cl.
*G06K 9/00* (2006.01)
*G02B 21/00* (2006.01)

(52) U.S. Cl. ........................ 382/128; 359/380
(58) Field of Classification Search .......... 382/100, 382/128–134; 359/362, 380–382; 250/201.3; 378/145

See application file for complete search history.

(56) References Cited

U.S. PATENT DOCUMENTS

| | | | |
|---|---|---|---|
| 6,101,265 A | 8/2000 | Bacus et al. | |
| 6,396,941 B1* | 5/2002 | Bacus et al. | 382/128 |
| 2001/0050999 A1* | 12/2001 | Bacus et al. | 382/128 |
| 2002/0090120 A1* | 7/2002 | Wetzel et al. | 382/128 |
| 2003/0161039 A1* | 8/2003 | Fukano et al. | 359/388 |
| 2004/0066960 A1* | 4/2004 | McLaren et al. | 382/128 |
| 2004/0263848 A1 | 12/2004 | Chen et al. | |
| 2005/0190437 A1 | 9/2005 | Nakagawa | |
| 2005/0270639 A1 | 12/2005 | Miki | |

FOREIGN PATENT DOCUMENTS

| | | |
|---|---|---|
| DE | 10 2004 005425 A1 | 8/2005 |
| EP | 1 202 103 A2 | 5/2002 |
| EP | 1 598 688 A2 | 11/2005 |
| JP | 9-281405 A | 10/1997 |

(Continued)

OTHER PUBLICATIONS

Translation pp. 1-7 of European Patent Publication No. EP 1202103 published on May 2, 2002, application No. EP20010121788 filed on Sep. 20, 2001.*

(Continued)

*Primary Examiner* — Samir A Ahmed
*Assistant Examiner* — Mehdi Rashidian
(74) *Attorney, Agent, or Firm* — Holtz, Holtz, Goodman & Chick, PC

(57) ABSTRACT

A microscope apparatus includes a capture unit for capturing a microscopic image of a specimen in a predetermined microscopy, a capture control unit controlling the capture unit and capturing a microscopic image about the same specimen with a plurality of predetermined resolutions, and a microscopy switch unit switching the microscopy. With the configuration, the capture control unit at least includes a first capture control unit allowing the capture unit to capture the specimen with a first resolution controlled in advance, a definition unit defining a plurality of small sections obtained by dividing a first microscopic image captured by the capture unit under control of the first capture control unit; and a second capture control unit allowing the capture unit to capture a portion corresponding to the small section of the specimen with a predetermined second resolution as a resolution higher than the first resolution.

7 Claims, 62 Drawing Sheets

FOREIGN PATENT DOCUMENTS

| | | |
|---|---|---|
| JP | 10-333056 A | 12/1998 |
| JP | 11 249021 A | 9/1999 |
| JP | 2002-514319 A | 5/2002 |

OTHER PUBLICATIONS

Translation pp. 1-16 of Patent Abstraction of Japan Publication No. 10-333056 published on Dec. 18, 1998, application No. 09-154597 filed on May 28, 1997.*

European Patent Office Communication dated Aug. 22, 2008, issued in a counterpart European Application.

Communication from the European Patent Office Issued in related European Patent Application No. EP 06 021 331.1-2217, dated Aug. 23, 2007. 5 pages.

European Search Report Mar. 8, 2010 issued in counterpart European Application No. 06 021 331.1-2217.

European Search Report Mar. 8, 2010 issued in counterpart European Application No. 07 014 992.7 2217.

Extended European Search Report issued on Oct. 5, 2007 in related European Patent Application No. EP 07 01 4992.7-2217.

\* cited by examiner

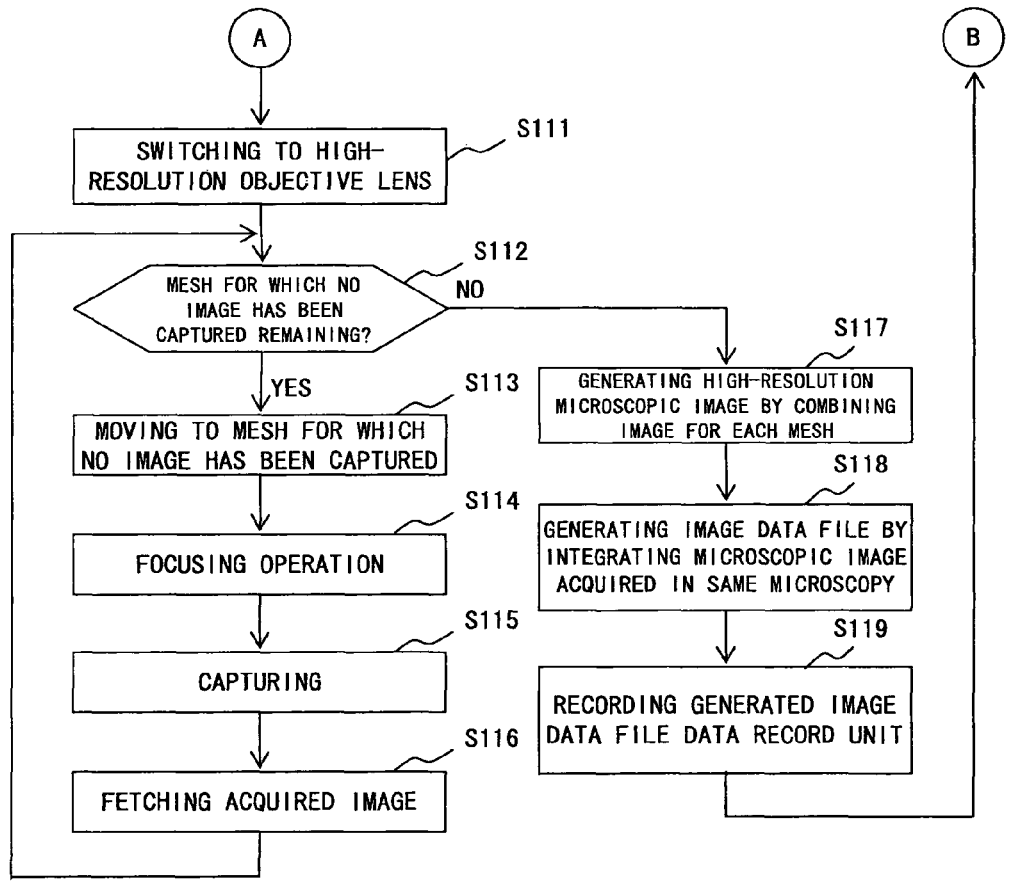
F I G. 2B

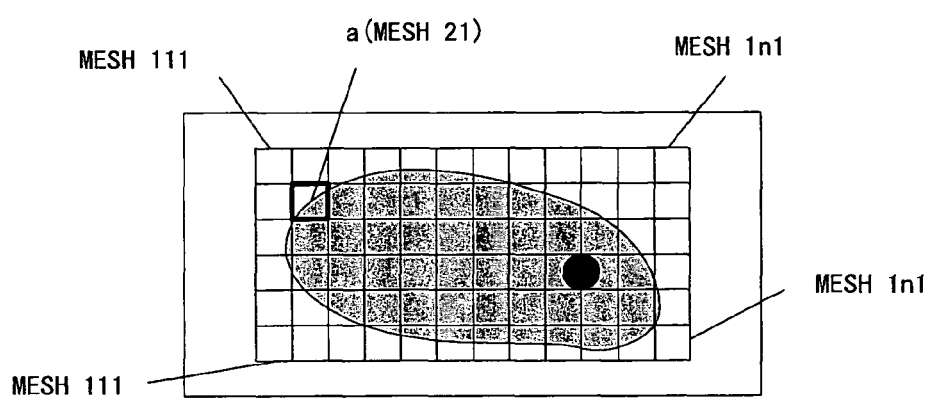
F I G. 3

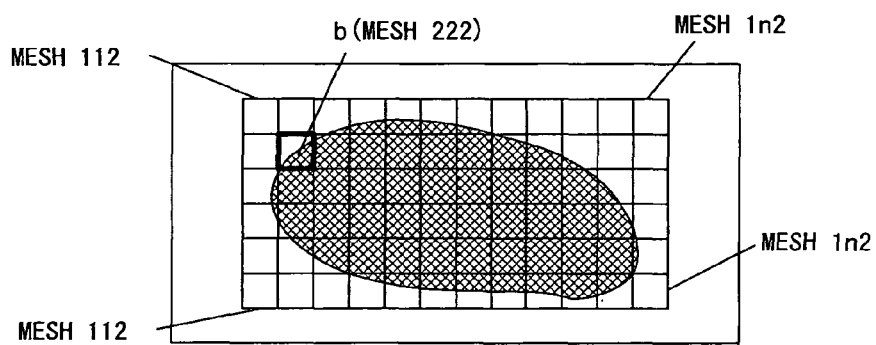
F I G. 4

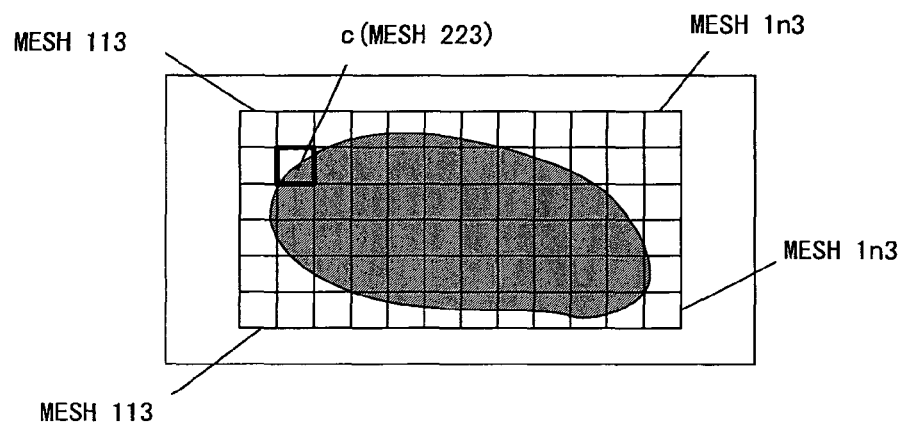
F I G. 5

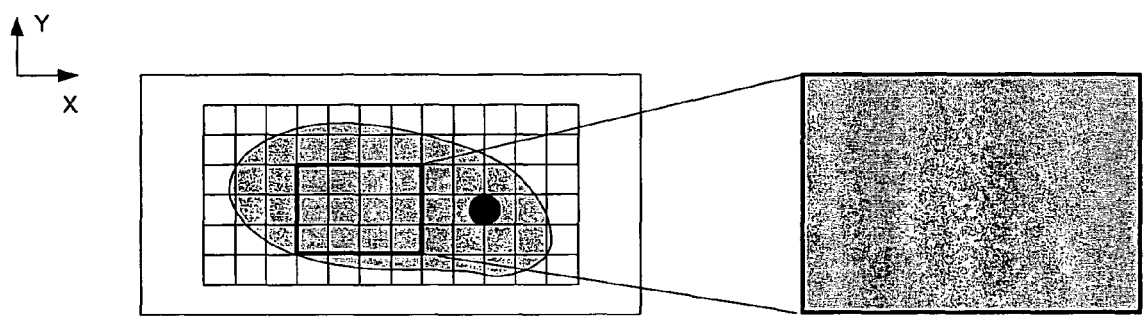
F I G. 8

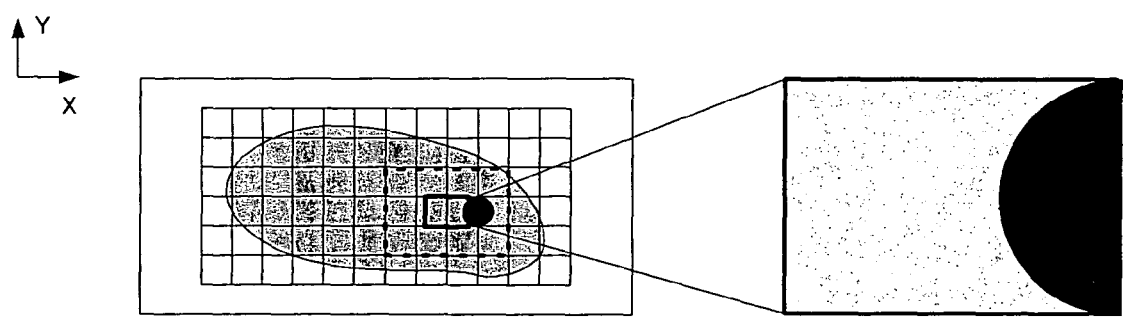
F I G. 10

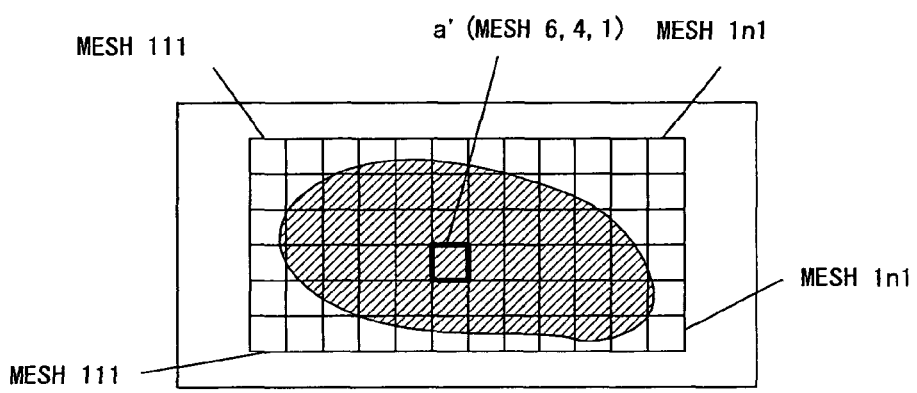
F I G. 13

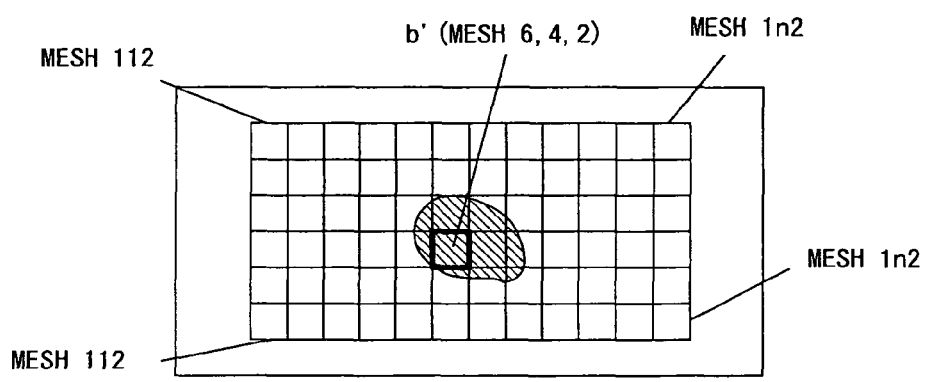
F I G. 14

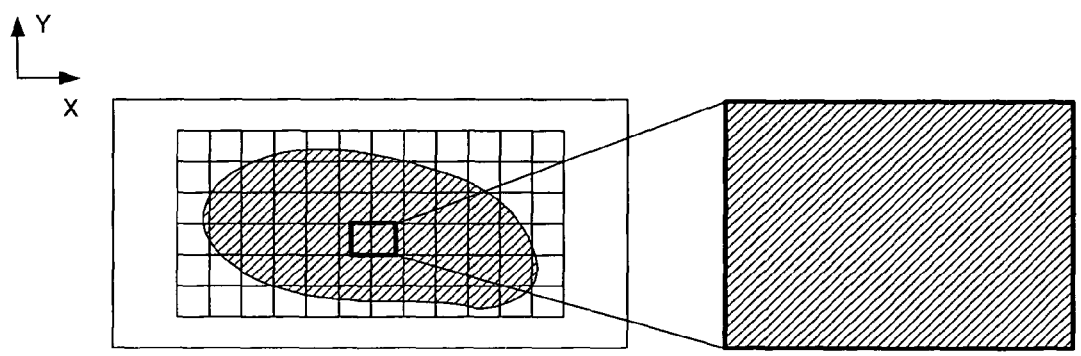
F I G. 17

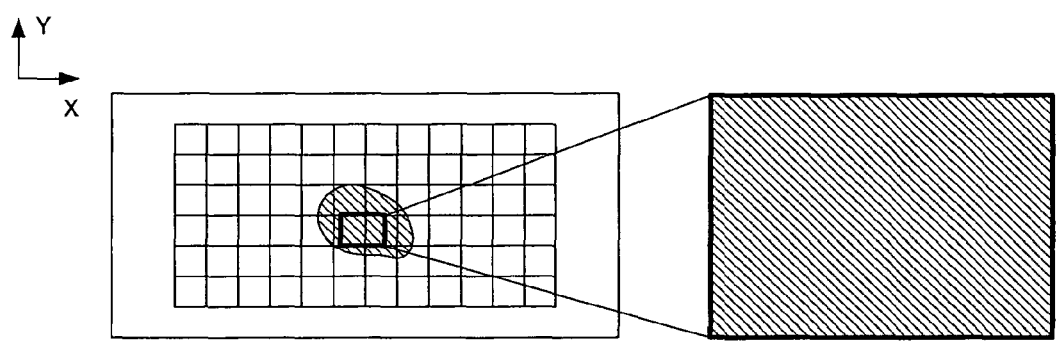
F I G. 1 8

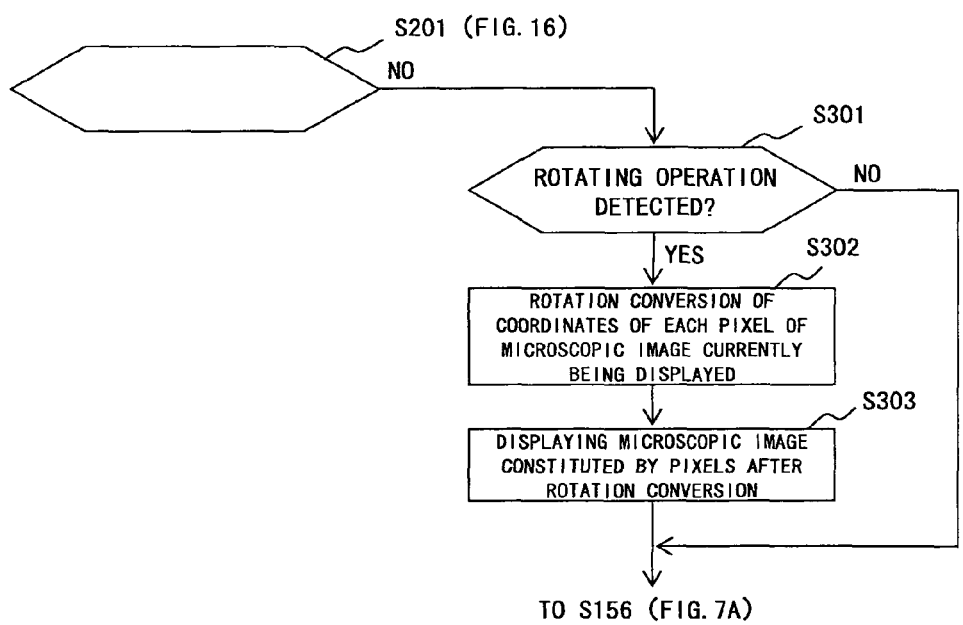
F I G. 2 4 A

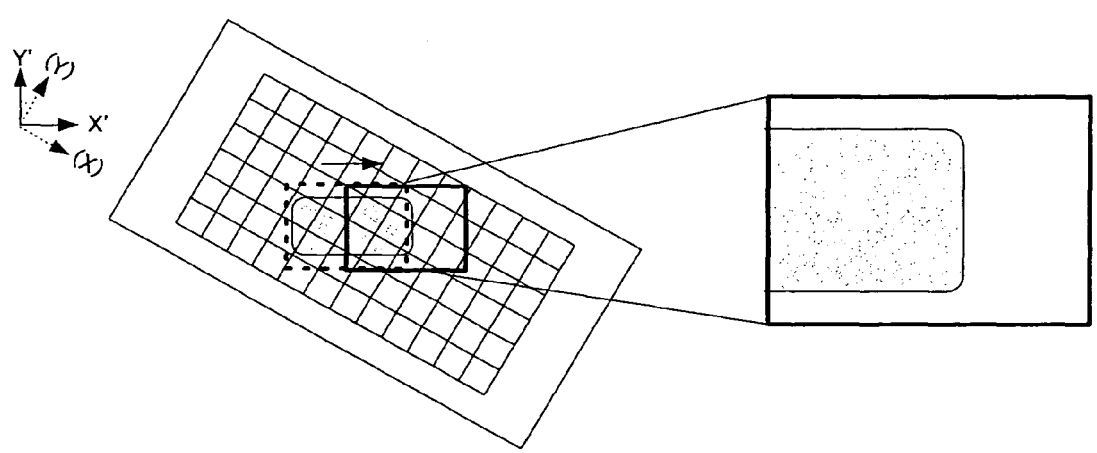
F I G. 27

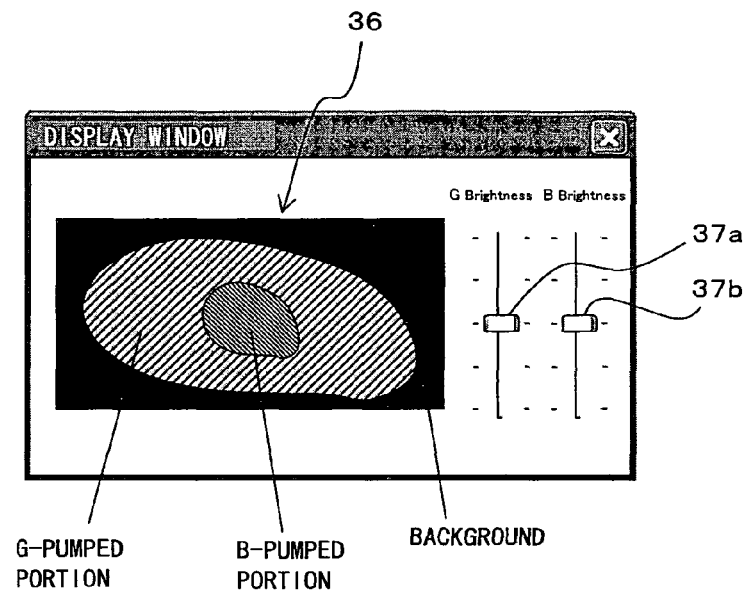
F I G. 30

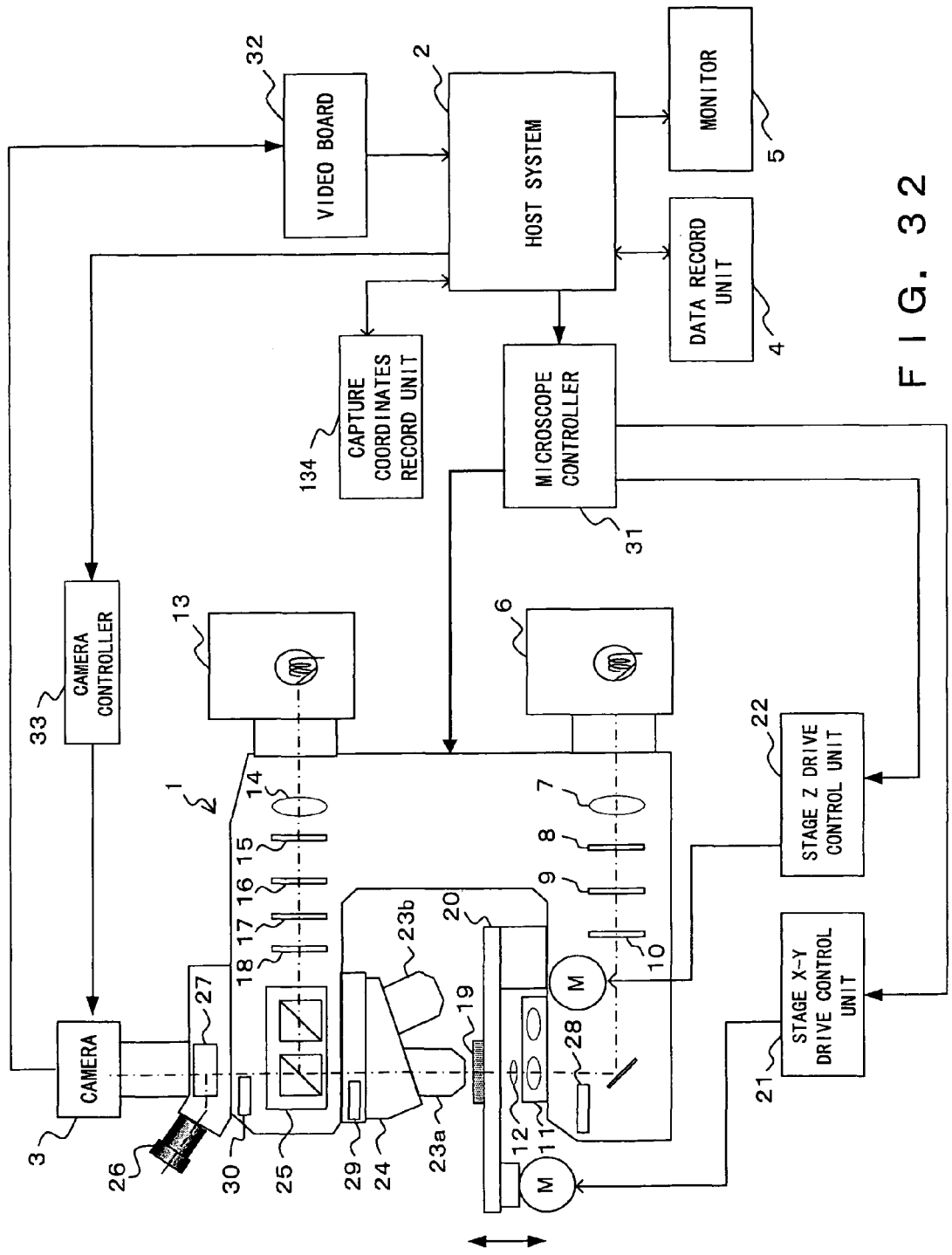
F I G. 32

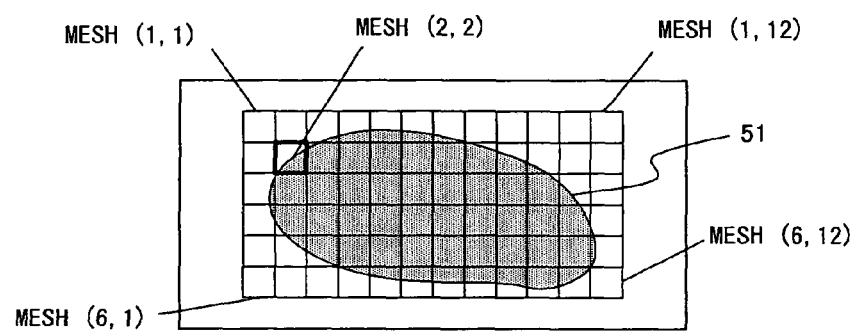
F I G. 3 4

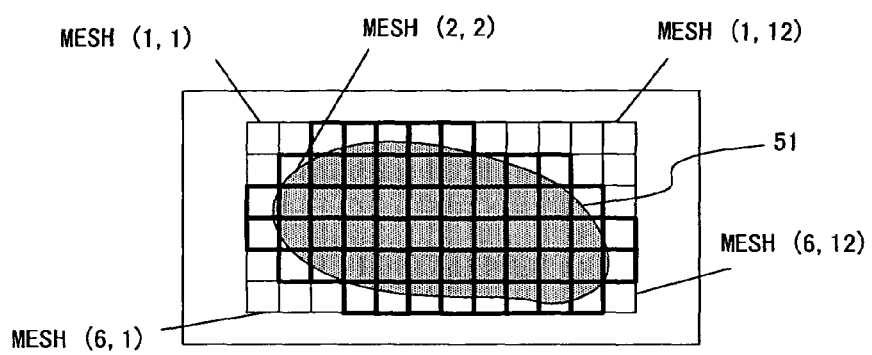
F I G. 3 5

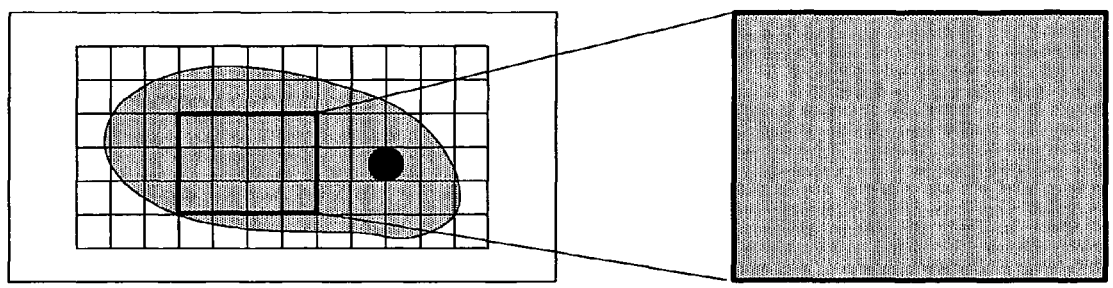
F I G. 3 8

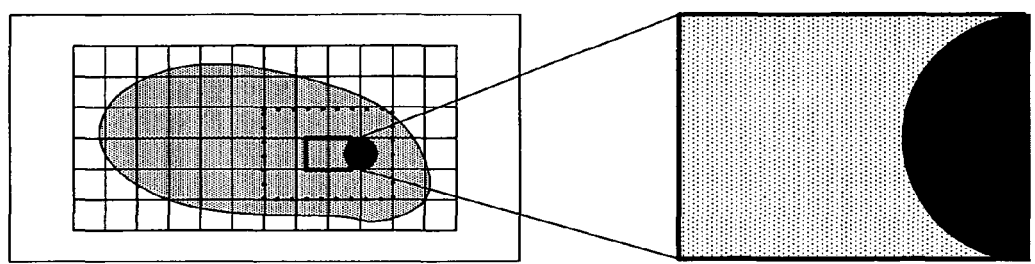
F I G. 4 0

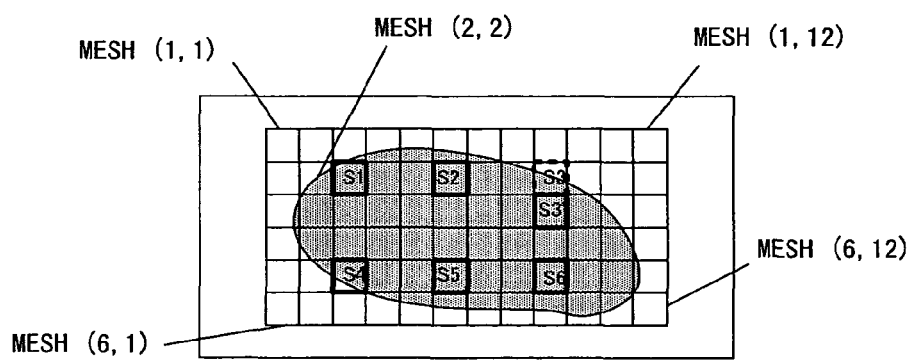
F I G. 4 3

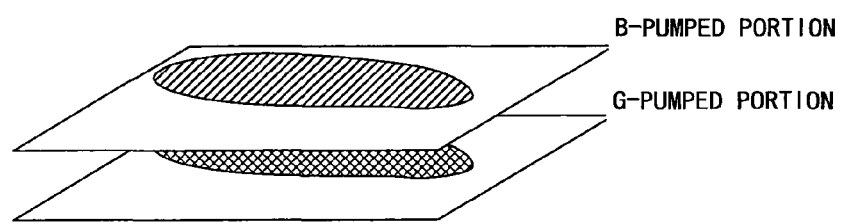
F I G. 4 4

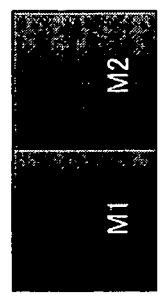
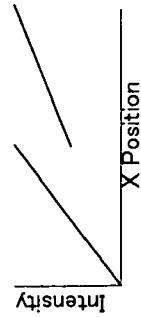
FIG. 50A
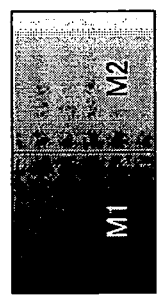
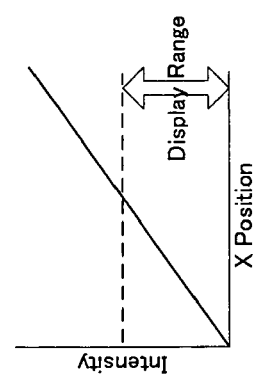
FIG. 50B
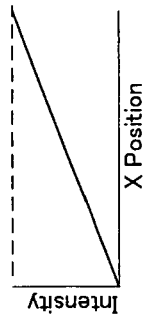
FIG. 50C

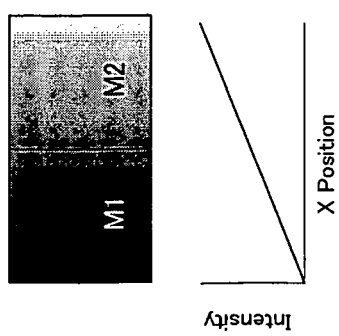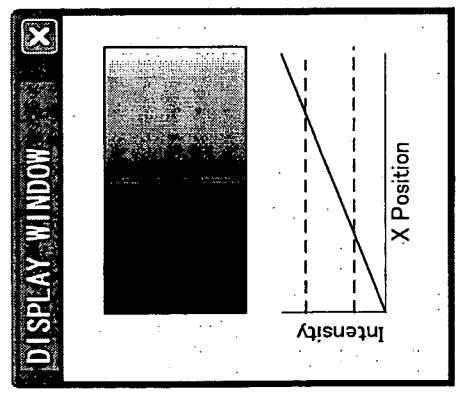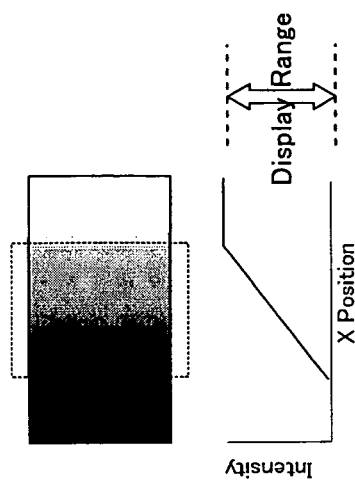
F I G. 51A  F I G. 51B  F I G. 51C

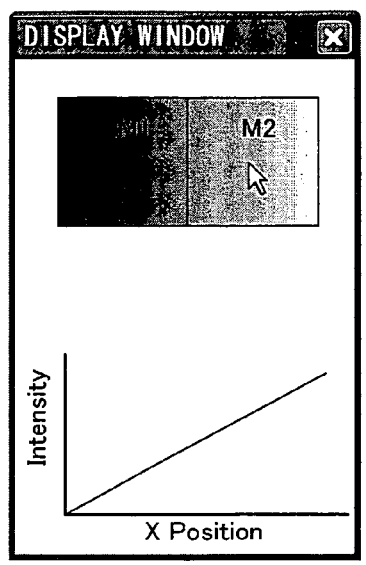 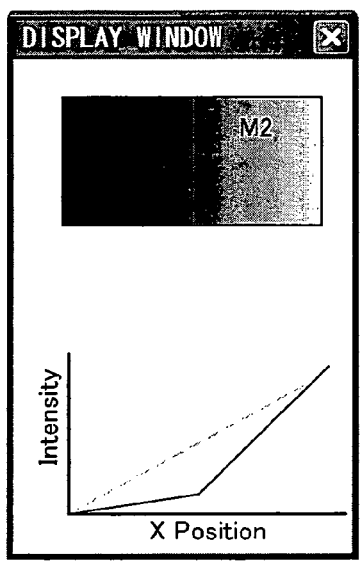
F I G. 5 3 A  F I G. 5 3 B

F I G. 55A
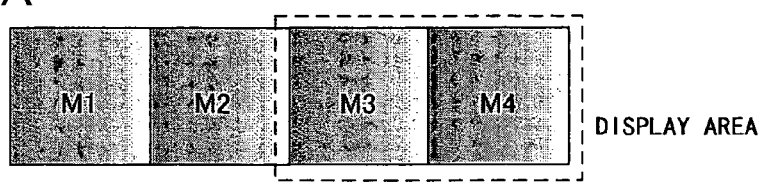
DISPLAY AREA
F I G. 55B
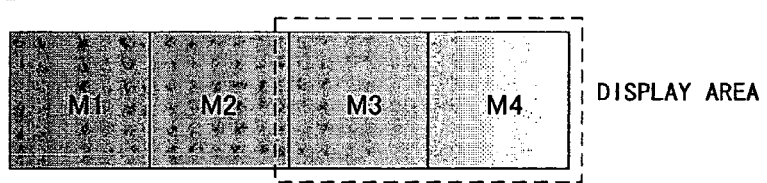
DISPLAY AREA
F I G. 55C
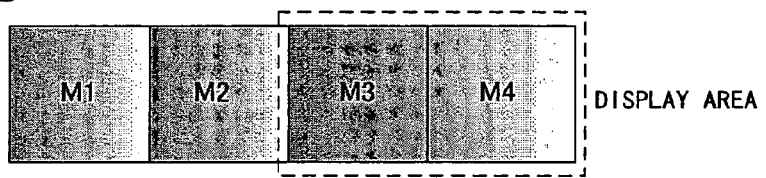
DISPLAY AREA

MICROSCOPE APPARATUS AND MICROSCOPE SYSTEM

CROSS REFERENCE TO RELATED APPLICATIONS

This application is based upon and claims the benefit of priority from the prior Japanese Patent Applications No. 2005-328835, filed Nov. 14, 2005, 2005-296434, filed Oct. 11, 2005, and 2005-316240, filed Oct. 31, 2005, the entire contents of which are incorporated herein by reference.

BACKGROUND OF THE INVENTION

1. Field of the Invention

The present invention relates to microscope technology, and more specifically to technology of acquiring a microscopic image of a specimen and displaying an acquired microscopic image.

2. Description of the Related Art

When a specimen is observed using a microscope, a range that can be simultaneously observed (observation range) mainly depends on the magnification of an objective lens. When a high-magnification objective lens is used, the observation range is limited to only a part of the specimen.

In a pathological diagnosis of, for example, a cell, a tissue, etc., a request is made to grasp the entire image of a specimen to avoid missing a point to be diagnosed. Additionally, with the development of information processing technology, more images are expressed as electronic information in the pathological diagnosis, and there is also a request to obtain high resolution of old solver salt film for an image observed by a microscope through a video camera, etc.

To realize the above-mentioned requests, for example, Japanese Published Patent Application No. H9-281405, Japanese Published Patent Application No. H10-333056, or National Publication of International patent Application No. 2002-514319 discloses a system for reconstituting an image of a specimen by dividing an image of a specimen into small sections in advance, capturing a part of the specimen corresponding to the small section using a high-resolution objective lens, and combining the microscopic images for the obtained small sections. Using the system, which is called a virtual microscope system, a specimen can be observed by a microscope even in an environment where there is practically not a specimen, and using the image processing technology, the following observation can be performed as in actually observing a specimen.

First, during observation with low magnification, a wide-angle image can be provided by displaying a combined scale-down microscopic image while high resolution can be provided during observation with high magnification by displaying a partial image captured for each small section.

The display range of a microscopic image being displayed is moved corresponding to the X-Y direction operation (the moving operation in the horizontal direction on the plane perpendicular to the optical axis) by an observer.

In this system, a specimen can be diagnosed by without time restrictions, and different points of the same specimen can be observed although there are a plurality of users who perform a diagnosis in different places by sharing image data indicating a microscopic image among each user.

When an observation is made while performing an operation in the X-Y direction using the entity of a specimen, it is necessary to amend incorrect focus generated by the tilt of a specimen. However, in the above-mentioned system, an observation can be continued constantly in correct focus. Therefore, the observation efficiency can be enhanced, and missing an observation due to incorrect focus can be reduced, thereby improving the reliability in a diagnosis.

Additionally, for example, when a person who performs a diagnosis is trained, it has conventionally been necessary to give training for observations, practical work, etc., by preparing a plurality of the same specimens. However, in the above-mentioned system, the same image of a specimen can be used in training by utilizing the feature of sharing image data.

Furthermore, although it is very difficult to restore the same status of a specimen of an entity enclosed on a glass slide when it is color-faded or damaged, the image data can be backed up. Therefore, the above-mentioned system enables a specimen to be observed anywhere at any time in the same status.

As described above, the virtual microscope system is efficient and highly accurate in observing an entity of a specimen using a microscope, thereby ensuring high reliability.

SUMMARY OF THE INVENTION

The microscope apparatus according to the first aspect of the present invention includes a capture unit for capturing a microscopic image of a specimen in a predetermined microscopy, a capture control unit for controlling the capture unit and capturing a microscopic image about the same specimen with a plurality of predetermined resolutions, and a microscopy switch unit for switching the microscopy. With the configuration, the capture control unit includes a first capture control unit for allowing the capture unit to capture the specimen with a first resolution controlled in advance, a definition unit for defining a plurality of small sections obtained by dividing a first microscopic image captured by the capture unit under control of the first capture control unit, a second capture control unit for allowing the capture unit to capture a portion corresponding to the small section of the specimen with a predetermined second resolution as a resolution higher than the first resolution, an image combination unit for generating a second microscopic image with the second resolution for the specimen by combining the microscopic images for the respective small sections captured by the capture unit under control of the second capture control unit, and an image accumulation unit for accumulating the combined microscopic images captured in plural microscopies for each specimen.

The microscope system according to the second aspect of the present invention includes a switch unit for switching an observation method, a microscope apparatus for observing a specimen in an observation method switched by the switch unit, a stage for moving the specimen, a division unit for dividing the specimen into a plurality of sections, a capture coordinate acquisition unit for acquiring a Z capture coordinate as a coordinate in an optical axis direction when the specimen is captured, a capture coordinate record unit for recording the Z capture coordinate, a capture unit for capturing the specimen in the sections based on the Z capture coordinate, an image record unit for recording an image of the specimen captured by the capture unit, and an image combination unit for combining images recorded in the image record unit, an image display unit for displaying the images combined by the image combination unit. With the configuration, the capture unit captures the specimen in a second observation method switched by the switch unit based on the Z capture coordinate acquired by the capture coordinate acquisition unit in a first observation method switched by the switch unit.

The microscope system according to the third aspect of the present invention includes a stage on which a specimen is placed, a division unit for dividing the specimen into a plurality of small sections, a capture condition setting unit for setting a capture condition used when the specimen is captured, a capture unit for capturing the specimen of the small sections based on the capture condition set by the capture condition setting unit and acquiring an image in the small section, a capture parameter acquisition unit for acquiring a capture parameter when the specimen is captured by the capture unit in the small sections based on the capture condition set by the capture condition setting unit, and an image composition unit for combining the images in the adjacent small sections acquired by the capture unit, and an image display unit for displaying an image.

BRIEF DESCRIPTION OF THE DRAWINGS

FIG. 2B is flowchart (2) showing the microscopic image data acquisition process;

FIG. 3 shows an example of a high-resolution microscopic image of a specimen captured using bright-field observation;

FIG. 4 shows an example of a high-resolution microscopic image of a specimen captured using differentiation interference observation;

FIG. 5 shows an example of a high-resolution microscopic image of a specimen captured using fluorescent observation;

FIG. 8 shows an example of displaying a microscopic image when a virtual observation using bright-field observation is specified;

FIG. 8 is displayed;

FIG. 10 shows an example of the displaying of a microscopic image when an instruction is given to switch the objective lens to a higher magnification when FIG. 9 is displayed;

FIG. 10 is displayed;

FIG. 11A is displayed;

FIG. 13 shows the first example of the high-resolution microscopic image of the specimen using B-pumped observation;

FIG. 14 shows the first example of the high-resolution microscopic image of the specimen using G-pumped observation;

FIG. 17 shows the first example of the displaying of a microscopic image when a virtual observation using B-pumped observation is specified;

FIG. 18 shows an example of the displaying of a microscopic image when a virtual observation using G-pumped observation is specified when FIG. 17 is displayed;

FIG. 18 is displayed;

FIG. 24A shows the first change portion in embodiment 3 of the microscopic image reproduction and display process;

FIG. 25 is displayed;

FIG. 27 shows an example of the displaying of a microscopic image when an X-Y position moving operation is performed when FIG. 25 is displayed;

FIG. 27 is displayed;

FIG. 30 shows an example of a display window;

FIG. 32 shows an example of the configuration of the microscope system according to embodiment 5 of the present invention;

FIG. 34 is an explanatory view showing the mesh defined in S1107;

FIG. 35 is an explanatory view showing the mesh to be captured that is determined in S1108;

FIG. 38 is an explanatory view showing a macro image and a partially enlarged image displayed on the monitor;

FIG. 40 is an explanatory view showing a macro image and a partially enlarged image displayed on the monitor when a switching instruction for an objective lens is received;

FIG. 43 is an explanatory view showing a selected and determined capture coordinate acquisition mesh;

FIG. 44 is an explanatory view showing a B-pumped high-resolution and wide-angle-view microscopic image and a G-pumped high-resolution and wide-angle-view microscopic image generated in S1229;

FIG. 50A is the first explanatory view of the process in S2153 in the microscopic image reproduction and display process using a practical example;

FIG. 50B is the second explanatory view of the process in S2153 in the microscopic image reproduction and display process using a practical example;

FIG. 50C is the third explanatory view of the process in S2153 in the microscopic image reproduction and display process using a practical example;

FIG. 51A is the first explanatory view of the process in S2158 in the microscopic image reproduction and display process using a practical example;

FIG. 51B is the second explanatory view of the process in S2158 in the microscopic image reproduction and display process using a practical example;

FIG. 51C is the third explanatory view of the process in S2158 in the microscopic image reproduction and display process using a practical example;

FIG. 53A is the first view showing an example of, a display window in which a gray-scale range can be flexibly specified;

FIG. 53B is the first view showing an example of a display window in which a gray-scale range can be flexibly specified;

FIG. 55A is the first explanatory view of a portion of the microscopic image reproduction and display process according to embodiment 8 using a practical example;

FIG. 55B is the second explanatory view of a portion of the microscopic image reproduction and display process according to embodiment 8 using a practical example; and FIG. 55C is the third explanatory view of a portion of the microscopic image reproduction and display process according to embodiment 8 using a practical example.

DESCRIPTION OF THE PREFERRED EMBODIMENT

The modes for embodying the present invention are explained below by referring to the attached drawings.

Embodiment 1

Figure 1:
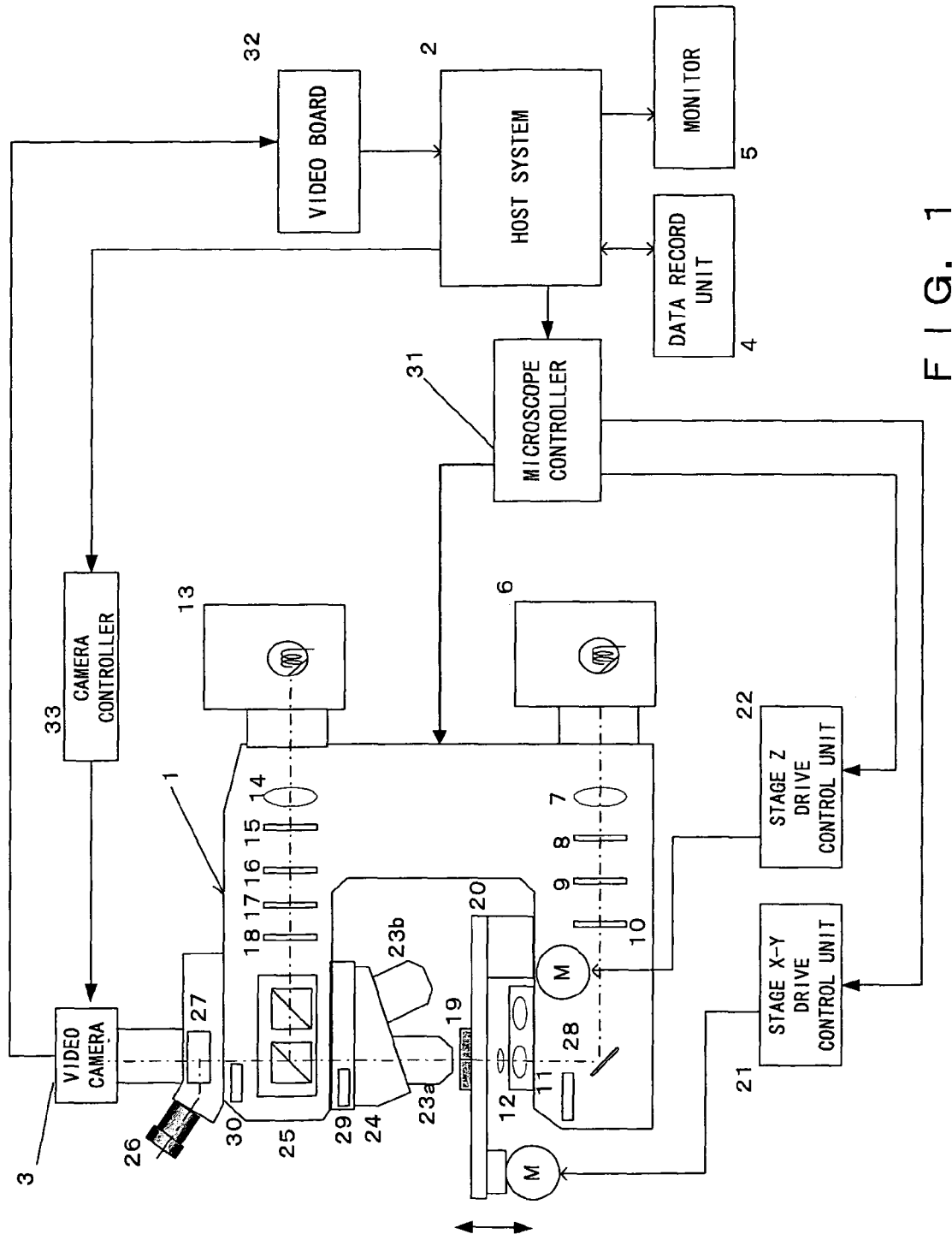
FIG. 1 shows the first example of the microscope system for embodying the present invention.

FIG. 1 shows the first example of the microscope system for embodying the present invention.

A microscope apparatus 1 comprises as a transmission observation optical system a transmission illumination light source 6, a collector lens 7 for collecting illumination light of the transmission illumination light source 6, a transmission filter unit 8, a transmission field iris 9, a transmission aperture iris 10, a capacitor optical element unit 11, and a top lens unit 12. As an incident-light observation optical system, it comprises an incident-light illumination light source 13, a collector lens 14, an incident-light filter unit 15, an incident-light shutter 16, an incident-light field iris 17, and an incident-light aperture iris 18.

There is an electric stage 20 capable of moving up, down, left, and right on which a specimen 19 is placed on the observation optical path where the optical path of the transmission observation optical system overlaps the optical path of the incident-light observation optical system. The movement of the electric stage 20 is controlled by a stage X-Y drive control unit 21 and a stage Z drive control unit 22. The electric stage 20 has the function of detecting an origin point (not shown in the attached drawings) using an origin point sensor, and can set coordinates for each unit of the specimen 19 placed on the electric stage 20.

On the observation optical path, a revolver 24 for selecting via a revolving operation from a plurality of objective lenses 23a, 23b, . . . (hereinafter generally referred to as an "objective lens 23" as necessary) a lens to be used in an observation, a cube unit 25 for switching the microscopy, and a beam splitter 27 for splitting the observation optical path toward an eyepiece 26 and a video camera 3. Furthermore, a polarizer 28 for differentiation interference observation, a DIC (differential interference contrast) prism 29, and an analyzer 30 can be inserted into the observation optical path. Each unit is motor driven, and the operation is controlled by a microscope controller 31 described later.

The microscope controller 31 connected to a host system 2 has the function of controlling the entire operation of the microscope apparatus 1, changes the microscopy, adjusts the transmission illumination light source 6 and the incident-light illumination light source 13 according to a control signal from the host system 2, and has the function of transmitting the current microscopy status of the current microscope apparatus 1 to the host system 2. The microscope controller 31 is also connected to the stage X-Y drive control unit 21 and the stage Z drive control unit 22, and the control of the electric stage 20 can also be performed by the host system 2.

A microscopic image of the specimen 19 captured by a video camera 3 is fetched to the host system 2 through a video board 32. The host system 2 can perform ON/OFF control of automatic gain, the setting of gain, ON/OFF control of automatic exposure, and the setting of exposure time on the video camera 3 through a camera controller 33. Additionally, the host system 2 can store a microscopic image transmitted from the video camera 3 as an image data file in a data record unit 4. The image data recorded in the data record unit 4 is read by the host system 2, and a microscopic image expressed by the image data can be displayed on a monitor 5.

The host system 2 also provides a so-called video AF function, which is a focusing operation that is based on the contrast of an image captured by the video camera 3.

The host system 2 is a computer with a standard configuration having a CPU (central processing unit) for controlling the entire operation of the microscope system by executing a control program, a main memory for use by the CPU as work memory as necessary, an input unit for acquiring various instructions from a user via instruments such as a mouse, a keyboard, etc., an interface unit for managing the communication of data with each component of the microscope system, and an auxiliary storage device such as a hard disk device, etc. for storing various programs and a variety of data.

The operation of the microscope system is explained below.

Figure 2A:
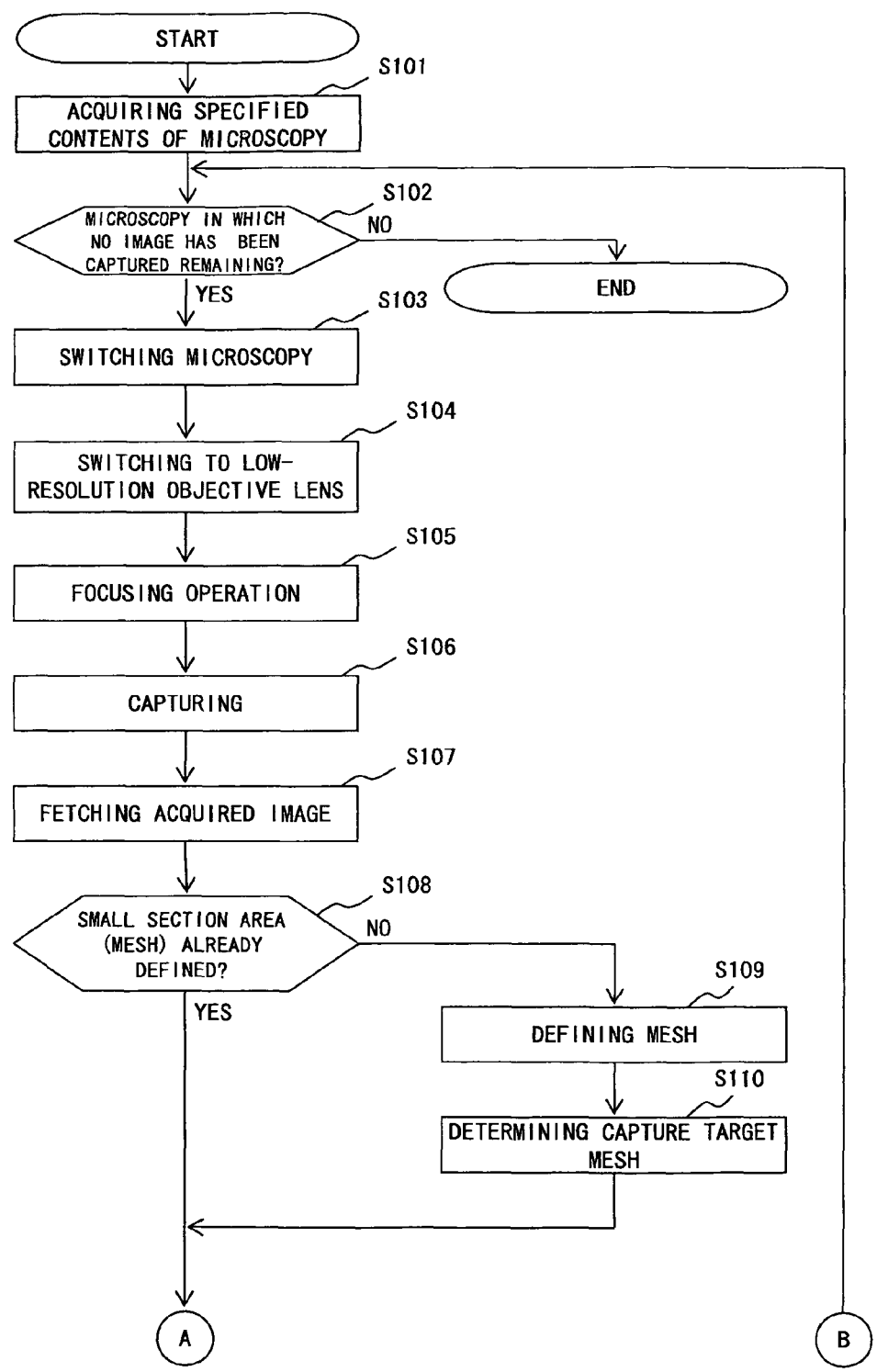
FIG. 2A is flowchart (1) showing the microscopic image data acquisition process.

First, FIGS. 2A and 2B are explained. They are flowcharts of the microscopic image data acquisition process performed by the host system 2. The process is performed to acquire microscopic image data of the specimen 19 by the microscope system shown in FIG. 1, and is realized and started by the CPU of the host system 2 executing a predetermined control program.

First, in S101 shown in FIG. 2A, the process of acquiring from a user the specification of the microscopy used in observation of the specimen 19 is performed.

In S102, the process of determining whether or not there are any microscopies in which a microscopic image has not been captured in the microscopies acquired in the process in S101 is performed. If it is determined that there are any (if the determination result is YES), control is passed to step S103. If it is determined that all of the microscopic images have been completely captured in all acquired microscopies (if the determination result is NO), the microscopic image data acquisition process is terminated.

In S103, an instruction is issued to the microscope controller 31, and the setting of the microscope apparatus 1 is changed to the setting of capturing a microscopic image in a microscopy in which no image has been captured. Upon receiving the instruction, the microscope controller 31 controls the operation of each component of the microscope apparatus 1 to enter the state in which an image is captured in the microscopy. At this time, the coordinate system of the specimen 19 is set by the origin point sensor of the electric stage 20 and its initializing operation.

In S104, an instruction is issued to the microscope controller 31, and the revolver 24 is rotated to select the low-magnification objective lens 23*a*. In S105, a control process for focusing operation that is based on the contrast of a microscopic image of the specimen 19 captured by the video camera 3 is performed.

In S106, an instruction is issued to the camera controller 33 and the process of capturing the entire image of the specimen 19 by the video camera 3 is performed. Then, in S107, the low-resolution microscopic image acquired by the capturing process is fetched from the video camera 3 to the host system 2 through the video board 32.

In S108, after the microscopic image data acquisition process is started, the process is performed of determining whether or not the process has been performed at a low resolution of defining a small section (mesh) corresponding to a view (angle of view) area when the specimen 19 performs a capturing process using the high-magnification objective lens 23*b*, captured using the low-magnification objective lens 23*a*. If it is determined that the defining process has been performed (if the determination result is YES), control is passed to step S111 (FIG. 2B).

If it is determined in the determining process in S108 that the defining process has not been performed (when the determination result is NO), control is passed to step S109, and the process of defining the mesh is performed on the fetched low-resolution microscopic image. In this process, it is assumed that a 1×n (1 row by n columns) rectangular mesh is defined.

In S110, it is determined whether or not the image of the portion of the specimen 19 is included in each partial area of the low-resolution microscopic image divided into the defined meshes, and the process of determining a mesh for which an image is captured using the high-magnification objective lens 23 is performed. The determination can be performed on the basis of, for example, the presence/absence of a contour image (contrast image) of the specimen 19 obtained by calculating the difference between adjacent pixels, the color of the image of each mesh, etc. The determined mesh for which a high-resolution microscopic image is to be captured is assigned a number.

Control is passed to the process in FIG. 2B, an instruction is issued to the microscope controller 31 in S111, the revolver 24 is rotated, and the high-magnification objective lens 23*b* is selected.

Performed in S112 is the process of determining whether or not there is a mesh on which a high-resolution capturing process in the current microscopy has not been performed in the meshes for which it is determined in the process in S110 that the high-resolution capturing process is to be performed. If it is determined that there is (if the determination result is YES), control is passed to S113. If it is determined that the high-resolution capturing process has been completed in the present microscopy on all meshes to be captured (if the determination result is NO), control is passed to the process in S117.

In S113, an instruction is issued to the microscope controller 31, and the electric stage 20 is moved such that the portion of the specimen 19 expressed in the mesh area not captured yet in the low-resolution microscopic image can be located in the position immediately below the objective lens 23*b*.

In S114, the controlling process for a focusing operation based on the contrast of the microscopic image of the specimen 19 captured by the video camera 3 is performed. In S115, an instruction is issued to the camera controller 33, and the process of capturing an image of the portion of the specimen 19 by the video camera 3 is performed. In S116, a high-resolution microscopic image of the portion of the specimen 19 obtained by the capturing process is fetched from the video camera 3 to the host system 2 through the video board 32, and then control is returned to S112 and the above-mentioned processes are repeated.

If it is determined in the determining process in S112 that a high-resolution capturing process has been completed in the current microscopy on all meshes to be captured, then in S117, the high-resolution microscopic images in the respective meshes are combined, and a high-resolution microscopic image of the entire specimen 19 is generated.

In S118, the low-resolution microscopic image of the specimen 19 fetched to the host system 2 in the process in S107 (FIG. 2A) and the high-resolution microscopic image of the specimen 19 obtained in the process in S117 are combined as one image data file. Each microscopic image to be integrated into one image data file is captured in the same microscopy.

In S119, the image data file obtained in the process in the preceding step is recorded in the data record unit 4, and then control is returned to S102 (FIG. 2A) and the above-mentioned processes are repeated.

The above-mentioned processes constitute the microscopic image data acquisition process.

The operation of acquiring a microscopic image in the microscopic image data acquisition process is explained below by referring to an example in which a user specifies bright-field observation, differentiation interference observation, and the fluorescent observation as the microscopy in observing the specimen 19.

First, in the processes in S103 through S107, a low-resolution microscopic image of the specimen 19 is obtained by bright-field observation, and then in processes in S108 through 110, a mesh in which a high-resolution microscopic image is to be captured for the low-resolution microscopic image using bright-field observation is determined. In the processes in S112 through S116, a high-resolution microscopic image is obtained for each mesh of the specimen 19 using bright-field observation, each mesh is combined in the process in S117, and a high-resolution microscopic image of the specimen 19 is generated using bright-field observation. Then, in the process in S118, the low-resolution microscopic image and the high-resolution microscopic image of the specimen 19 using bright-field observation are combined, and an image data file is generated.

Then, in the processes in S102 through S107, a low-resolution microscopic image of the specimen 19 is obtained in differentiation interference observation. In this case, since a mesh is defined for a low-resolution microscopic image of the specimen 19 using bright-field observation, the result of the determining process in S108 is NO, and in the subsequent processes in S112 through S116, a high-resolution microscopic image is obtained for each mesh of the specimen 19 in differentiation interference observation on the basis of the definition of the mesh for a low-resolution microscopic image using bright-field observation. Afterwards, in the process in S117, meshes are combined and a high-resolution microscopic image of the specimen 19 is generated in differentiation interference observation. Then, in the process in S118, the low-resolution microscopic image and the high-resolution microscopic image of the specimen 19 in differentiation interference observation are combined and one image data file is generated.

Figure 6:
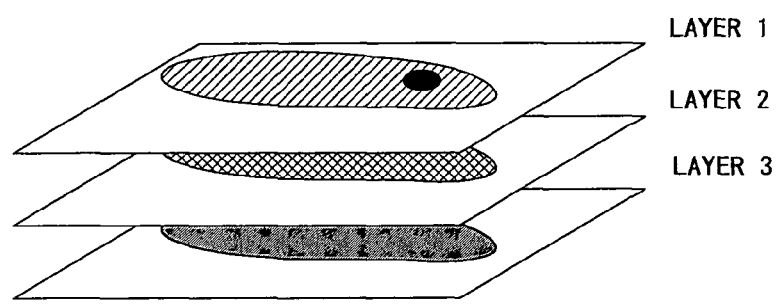
FIG. 6 shows the relationship among the images shown in FIGS. 3, 4, and 5.

Afterwards, in the processes in S102 through S107, a low-resolution microscopic image of the specimen 19 is obtained using fluorescent observation. At this time, since a mesh has already been defined for the low-resolution microscopic image of the specimen 19 using bright-field observation, the result of the determining process in S108 is NO, and in the subsequent processes in S112 through S116, a high-resolution microscopic image for each mesh of the specimen 19 is obtained using fluorescent observation on the basis of the definition of the mesh for the low-resolution microscopic image in bright-field observation. Afterwards, in the process in S117, meshes are combined, and a high-resolution microscopic image of the specimen 19 using fluorescent observation is generated. Then, in the process in S118, the low-resolution microscopic image and the high-resolution microscopic image of the specimen 19 using fluorescent observation are combined, and an image data file is generated FIGS. 3, 4, and 5 show examples of a high-resolution microscopic image integrated into an image data file for each microscopy as described above. These figures are explained below. An example of an image of layer 1 shown in FIG. 3 shows a high-resolution microscopic image of the specimen 19 captured using bright-field observation. An example of an image of layer 2 shown in FIG. 4 shows a high-resolution microscopic image of the specimen 19 captured in differentiation interference observation. An example of an image of layer 3 shown in FIG. 5 shows a high-resolution microscopic image of the specimen 19 captured using fluorescent observation. FIG. 6 shows the relationship among the examples of images of the respective layers.

Thus, via the host system 2 performing the above-mentioned microscopic image data acquisition process, microscopic images are acquired in different microscopies such as bright-field observation, differentiation interference observation, fluorescent observation, etc. as shown in FIG. 6. As clearly indicated by the comparison of the coordinates between mesh a (2,2,1) shown in FIG. 3, mesh b (2,2,2) shown in FIG. 4, and mesh c (2,2,3) shown in FIG. 5, the specimen 19 expressed by these microscopic images is positioned at the same coordinates in each image.

Figure 7A:
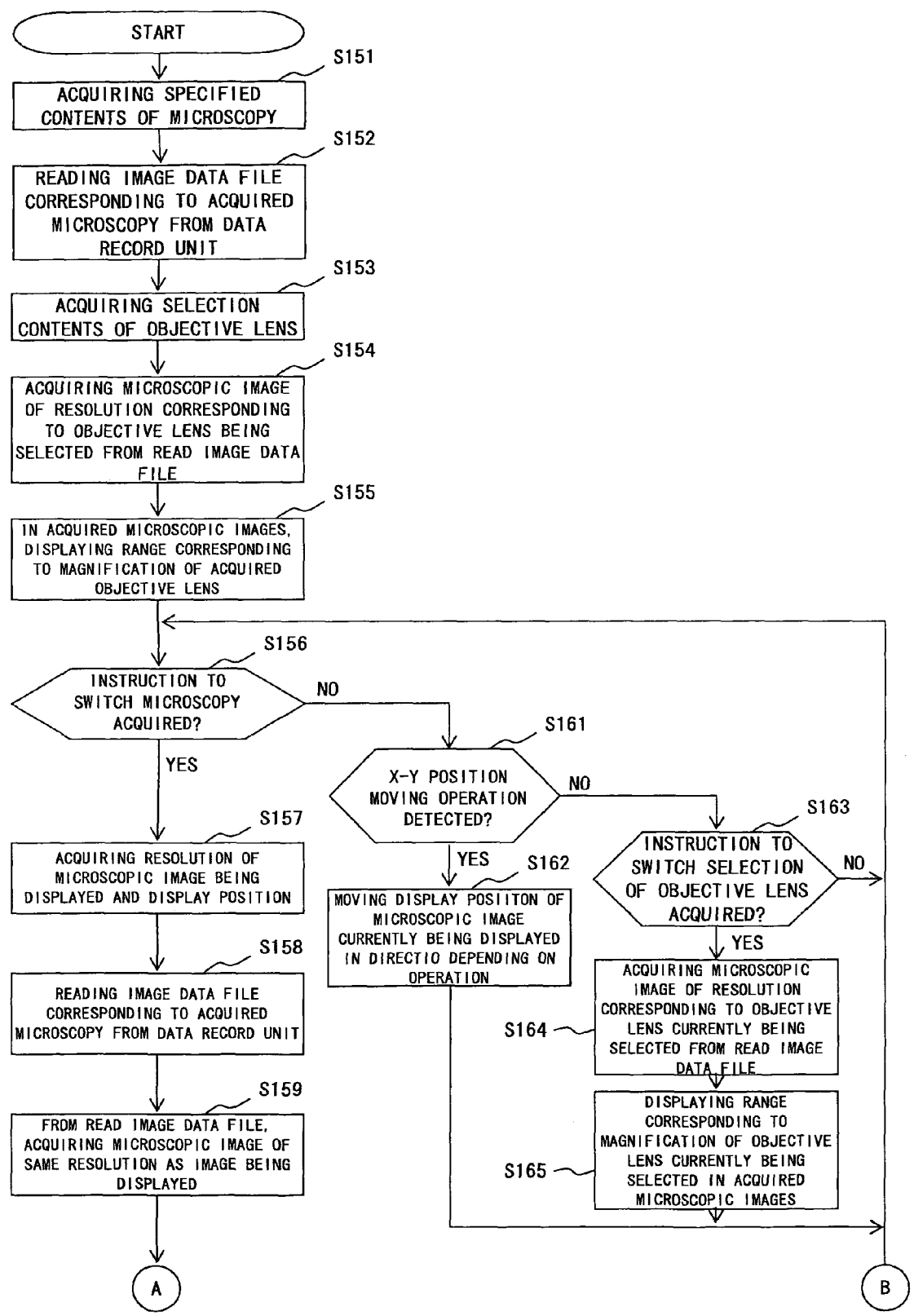
FIG. 7A is flowchart (1) showing the microscopic image reproduction and display process.
Figure 7B:
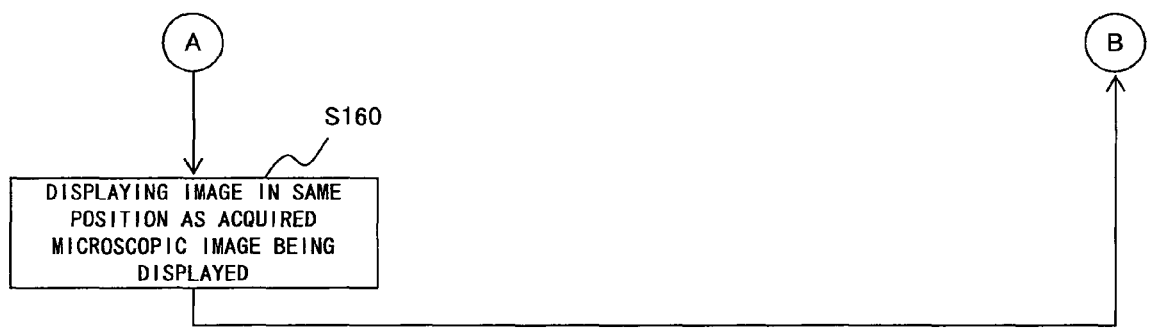
FIG. 7B is flowchart (2) showing the microscopic image reproduction and display process.

FIGS. 7A and 7B. are described below. These figures are flowcharts of the processes of the microscopic image reproduction and display process performed by the host system 2. This process is performed to reproduce and display an image on the monitor 5 so that the microscopic image is expressed by the image data file recorded in the data record unit 4 by performing the above-mentioned microscopic image data acquisition process in the virtual observation. It is realized and started by the execution of a predetermined control program by the CPU of the host system 2.

In this process, it is assumed that user instructions are given and user operations are performed for the input unit of the host system 2 not shown in the attached drawings.

In S151 shown in FIG. 7A, the process is performed of acquiring from a user an instruction for a microscopy in the virtual observation of the specimen 19.

In S152, from among the image data files recorded in the data record unit 4, a combined image of microscopic images captured in the microscopy acquired in the process in S151 is read, a microscopic image having the lowest resolution (obtained by capturing the specimen 19 with the lowest magnification) in the microscopic images integrated into a read image data file is displayed on the monitor 5 as a macro image.

In S153, the details of the selection by a user of the objective lens 23 in the virtual observation are acquired.

In S154, in the microscopic images integrated into the image data file read in the process in S152, the images of the resolution corresponding to the objective lens 23 relating to the selection details in the process in S153 (i.e. the images obtained by capturing the specimen 19 through the objective lens 23) are acquired and the acquired images are temporarily stored in a predetermined work storage area of the host system 2.

In S155, in the microscopic images acquired in the process in S154, the images in the range corresponding to the magnification of the objective lens 23 relating to the selection details acquired in the process in S153 are displayed by arranging the macro images on the monitor 5 as the images obtained by enlarging the images of the macro image portion.

The user performs a virtual observation while watching the microscopic images displayed on the monitor 5.

In S156, it is determined whether or not an instruction to switch the microscopy in the virtual observation of the specimen 19 has been acquired. If it is determined that the switching instruction has been acquired (when the determination result is YES), control is passed to S157. If it is determined that the switching instruction has not been acquired (if the determination result is NO), control is passed to S161.

In S157, the resolution and the display position (enlargement position of the macro image of the enlarged image being displayed) of the microscopic image (enlarged image) currently being displayed on the monitor 5 are acquired.

In S158, in the image data files recorded in the data record unit 4, the files are read in which the microscopic images captured in the microscopy after the switch that relate to the instruction acquired in the process in S156 and the images having the lowest resolution in the microscopic image integrated into the read image data file are switched and displayed on the monitor 5 as new macro images.

In S159, the images having the resolution obtained in the process in S157 in the microscopic images integrated into the image data file read in the process in S158—that is, the images having the same resolution as the microscopic images (enlarged images) currently being displayed on the monitor 5—are acquired and are temporarily stored in a predetermined work storage area in the host system 2.

Control is passed to the process shown in FIG. 7B. In S160, the microscopic images that are in the range corresponding to the magnification of the objective lens 23 currently selected in the virtual observation in the microscopic image acquired in the process in S159 and that are in the same position as the display position acquired in the process in S157 are arranged in the macro image on the monitor 5 and are then switched and displayed. Afterwards, control is returned to S156 (FIG. 7A) and the above-mentioned processes are repeated.

In the processes in S157 to S160, the display of images on the monitor 5 is switched, and the partial images are displayed of the microscopic images captured in the microscopy relating to the switching instruction; these partial images have the same resolution as the displayed partial images before the switch of the portion of the specimen 19 at the same position as the displayed partial image before the switch.

In the determining process in S156 shown in FIG. 7A, when it is determined that an instruction to switch the microscopy has not been acquired, it is determined in S161 whether or not the host system 2 has detected the movement of the X-Y position by the user, which is the operation performed to move the display position of the specimen 19 in the enlarged image displayed on the monitor 5. If it is determined that the operation to move the display position has been detected (YES as a determination result), control is passed to the process in S162. If it is determined that the move operation is not detected (NO as a determination result), control is passed to S163.

In S162, in the processes in S154 and S159 or the process in S164 described later, the microscopic images temporarily stored in a predetermined work storage area of the host system 2 are referred to, the display position being displayed as an enlarged image on the monitor 5 in the microscopic image is moved in a certain direction and by a certain amount depending on the detected move operation, switching is performed and the display is shown on the monitor 5, and then control is returned to the process in S156 and the above-mentioned processes are thereby repeated.

Thus, in the process in S162, by displaying images using the microscopic images temporarily stored (cached) in the work storage area, the image display can be more smoothly switched than in the case where image data files are sequentially read from the data record unit 4. Instead of temporarily storing the microscopic images in their entirety in the work storage area, only the partial images near the partial images currently being displayed on the monitor 5 in the microscopic images are stored in the work storage area. In the process in S162, the partial images in the vicinity are displayed in accordance with the performance by the user of the operation to move the X-Y position, the image data file can be newly read from the data record unit 4, and the partial images near the newly displayed partial images can be stored in the work storage area.

On the other hand, in the determining process in S161, when it is determined that the move operation of the X-Y position has not been detected, it is determined in S163 whether or not an instruction to switch the selection details of the objective lens 23 in the virtual observation of the specimen 19 has been acquired. If it is determined that the switching instruction has been acquired (YES as a determination result), control is passed to S164. When it is determined that the switching instruction has not been acquired (NO as a determination result), control is returned to S156, and the above-mentioned processes are repeated.

In S164, the images of the resolution corresponding to the objective lens 23 relating to the selection details determined to have been acquired in the process in S163 in the microscopic image integrated into the image data file read in the process in S152 or S158 are acquired and temporarily stored in a predetermined work storage area of the host system 2.

In S165, in the microscopic images acquired in the process in S164, the images in the range corresponding to the magnification of the objective lens 23 relating to the selection details acquired in the process in S163 are rearranged in the macro images and displayed on the monitor 5. Afterwards, control is returned to S156, and the above-mentioned processes are repeated.

The above-mentioned processes constitute the microscopic image reproduction and display process.

The state of displaying the microscopic images in the microscopic image reproduction and display process is explained below by referring to an example in which the image data file into which the microscopic images captured in each microscopy of bright-field observation, differentiation interference observation, and the fluorescent observation is recorded in the data record unit 4.

For example, when a user specifies the virtual observation via bright-field observation, a macro image of the specimen 19 as exemplified on the left of FIG. 8 and an enlarged image as if it were obtained by enlarging a part of the macro image as exemplified on the right of FIG. 8 are displayed on the monitor 5 in the processes in S151 to S155.

Figure 9:
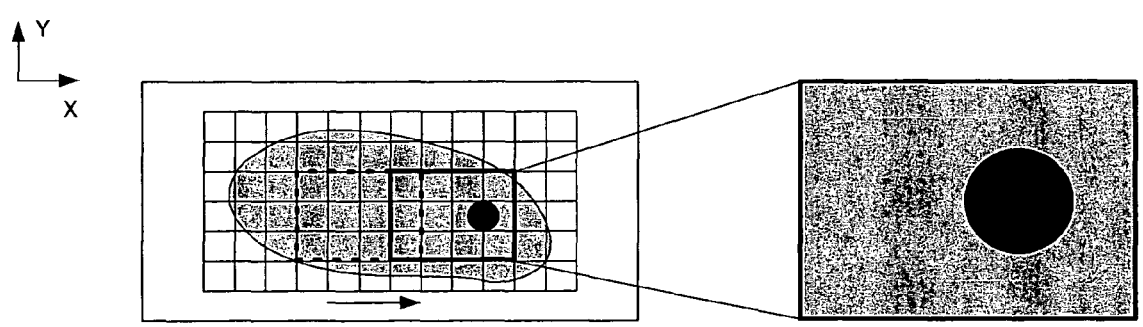
FIG. 9 shows an example of displaying a microscopic image when a move operation is performed on the X-Y position when

When a user performs an operation to move the X-Y position (especially when performing an operation to move the position in the X direction as in this example), the display of the enlarged image on the monitor 5 is switched from the display of the specimen 19 in FIG. 8 to the display of the portion moved in the X direction as exemplified in FIG. 9 in the processes in S161 and S162.

At this time, if a user issues an instruction to switch the selection of the objective lens 23 to obtain a higher magnification, the display of the enlarged image on the monitor 5 is switched from the display of the specimen 19 shown in FIG. 9 to the display of an enlarged image as exemplified in FIG. 10 in the processes in S163 to S165.

Figure 11A:
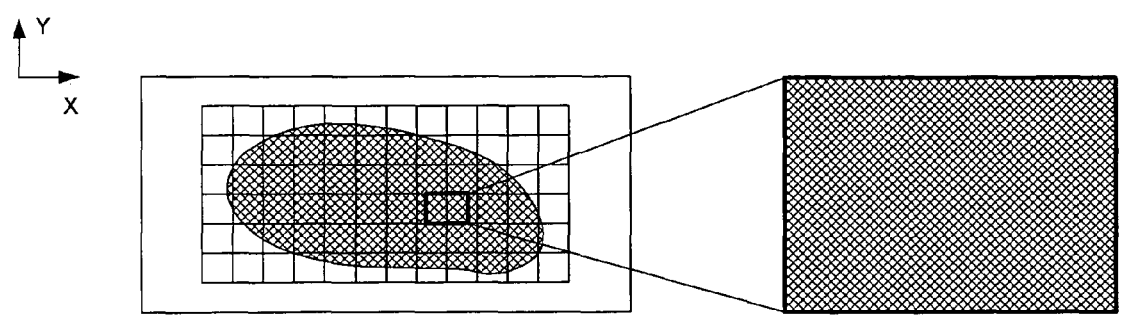
FIG. 11A shows an example of the displaying of a microscopic image when a virtual observation using differentiation interference observation is specified when

At this time, when the user switches the specification of the microscopy from bright-field observation to differentiation interference observation, the display of the image on the monitor 5 is switched from the image captured in bright-field observation to the microscopic image captured in differentiation interference observation as shown in FIG. 11A in the processes in S156 to S160. In the microscopic images before and after the switch of the display, the enlarged images of the same resolution (display magnification) and of the portion at the same position of the specimen 19 are displayed.

Figure 11B:
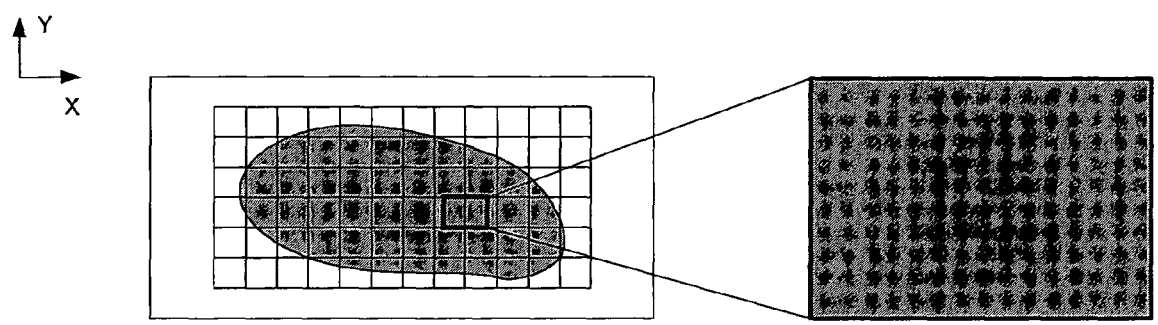
FIG. 11B shows an example of the displaying of a microscopic image when a virtual observation using fluorescent observation is specified when

Furthermore, at this time, when the user switches the specification of the microscopy from differentiation interference observation to the fluorescent observation, the display of the image on the monitor 5 is switched from the image captured in differentiation interference observation to the microscopic image captured on the fluorescent observation as shown in FIG. 11B in the processes in S156 to S160. Then, in the microscopic images before and after the switch of the display, the enlarged images of the same resolution (display magnification) and of the portion at the same position of the specimen 19 are displayed.

Thus, in the above-mentioned microscopic image reproduction and display process, the microscopic image of the same magnification and at the same position of the specimen 19 is immediately displayed when the microscopy is switched. Therefore, a virtual observation with high reliability in faithfully reproducing the position information of a specimen can be realized via an operation similar to that in the case in which the specimen is observed using a microscope.

As described above, in the microscope system according to the present embodiment, the microscopy can be switched by using a method similar to that used in the case in which the specimen is observed using a microscope in a so-called virtual microscope system that is used for reconstituting an image of a specimen by combining the microscopic images obtained by capturing a specimen.

In the present embodiment, the three microscopies, i.e. bright-field observation, differentiation interference observation, and the fluorescent observation, are exemplified, and switching between them occurs in the switching operation. However, this embodiment is not limited to the switching of these three types of microscopies, but some other microscopies can also be switched.

The alignment in the coordinates among the microscopies is realized by the twenty origin point sensors and their initializing operations according to the present embodiment. It can also be realized by, for example, the detection of a marking made on the plate for a specimen. In order to align the coordinates of the images among different microscopies, a matching method (or other methods) via well-known image recognition methods can also be used.

In the microscopic image data acquisition process, after capturing the high-resolution microscopic images in one microscopy on all the meshes, the high-resolution microscopic images in another microscopy are captured. Alternately, a high-resolution microscopic image can be completely captured in a specified microscopy on one mesh, and the entire high-resolution microscopic image can be obtained by repeatedly performing the capturing process on each mesh.

Embodiment 2

Figure 12:
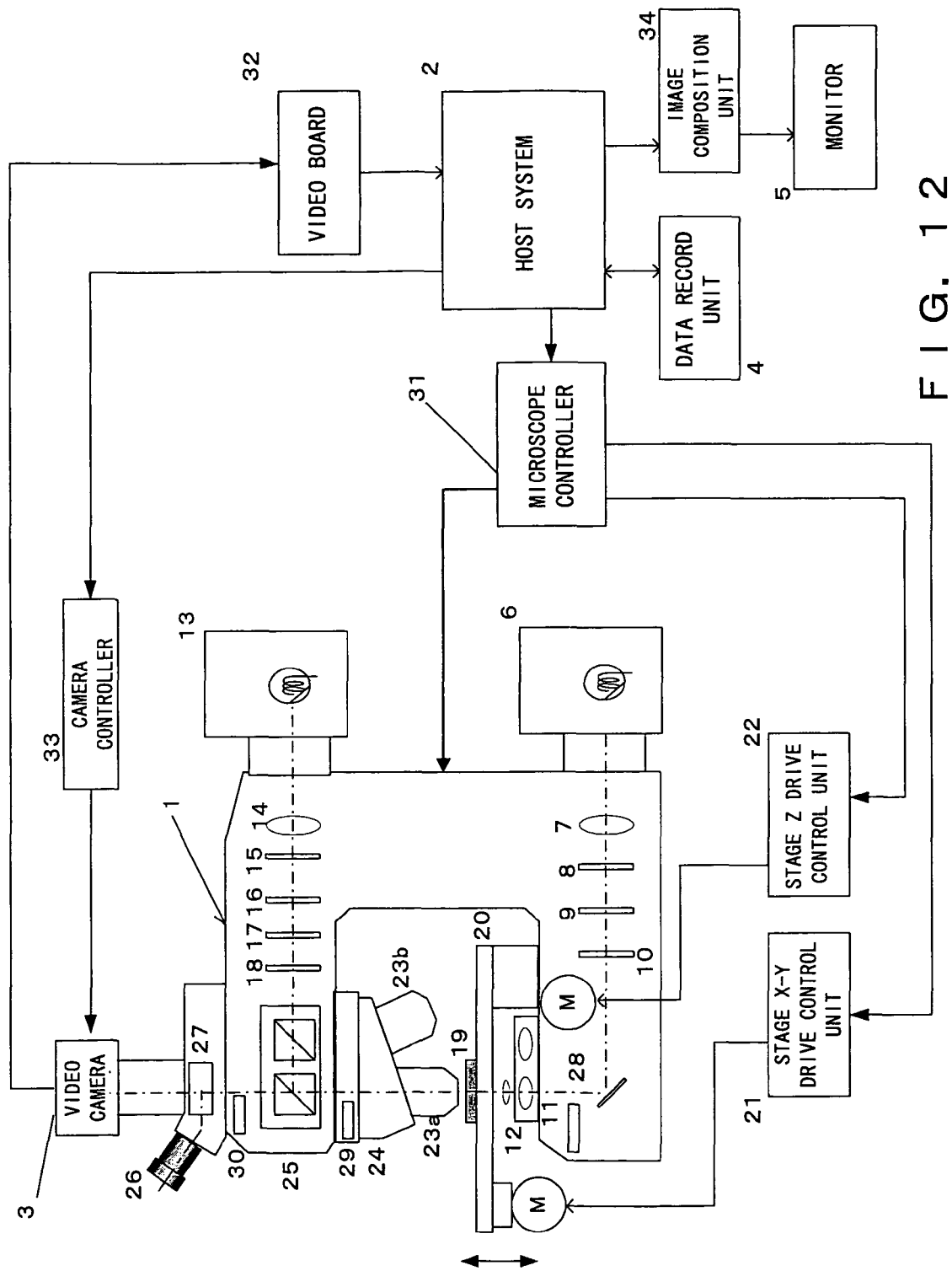
FIG. 12 shows the second example of the configuration of the microscope system embodying the present invention.

FIG. 12 shows the second example of the configuration of the microscope system embodying the present invention. In FIG. 2, the same components as those in the first example shown in FIG. 1 are assigned the same reference numerals, and the detailed explanation is omitted here.

The configuration shown in FIG. 12 is different from the configuration shown in FIG. 1 in that an image composition unit 34 is inserted between the host system 2 and the monitor 5. At an instruction from the host system 2, the image composition unit 34 superposes and combines two images relating to the instruction, and displays the resultant image on the monitor 5.

Described below is the operation of the microscope system shown in FIG. 12.

First, the operation of acquiring a microscopic image is similar to the operation according to embodiment 1, and a microscopic image is acquired by the host system 2 performing the microscopic image data acquisition process shown in FIGS. 2A and 2B.

The operation of acquiring a microscopic image in the microscopic image data acquisition process is explained below by referring to the case in which B-pumped observation and G-pumped observation, which are fluorescent observations having different wavelengths, are specified as microscopies for observing the specimen 19.

When the user specifies the above-mentioned microscopy, the host system 2 acquires the specification in the process in S101 shown in FIG. 2A.

Then, in the processes in S103 to S107, a low-resolution microscopic image of the specimen 19 is obtained using B-pumped observation. Then, in the processes in S108 to S110, a 1×n mesh is defined for the low-resolution microscopic image obtained using B-pumped observation, and a mesh for which a microscopic image is to be captured at a high resolution is determined. In the processes in S112 to S116, a high-resolution microscopic image for each mesh of the specimen 19 using B-pumped observation is obtained, each mesh is combined in the process in S117, and the high-resolution microscopic image of the specimen 19 using B-pumped observation exemplified as shown in FIG. 13 is generated. Then, in the process in S118, the low-resolution microscopic images of the specimen 19 using B-pumped observation are integrated, and one image data file is generated.

Afterwards, in the processes in S102 to S107, the low-resolution microscopic image of the specimen 19 using G-pumped observation is obtained. At this time, since a mesh has already been defined for the low-resolution microscopic image of the specimen 19 using B-pumped observation, the result of the determining process in S108 is NO. In the subsequent processes in S112 to S116, a high-resolution microscopic image is obtained for each mesh of the specimen 19 using G-pumped observation on the basis of the definition of the mesh for the low-resolution microscopic image obtained using B-pumped observation. Afterwards, in the process in S117, each mesh is combined and a high-resolution microscopic image of the specimen 19 obtained using G-pumped observation as exemplified in FIG. 14 is generated. Then, in the process in S118, the low-resolution microscopic image and the high-resolution microscopic image of the specimen 19 obtained using G-pumped observation are combined, and an image data file is generated.

Figure 15:
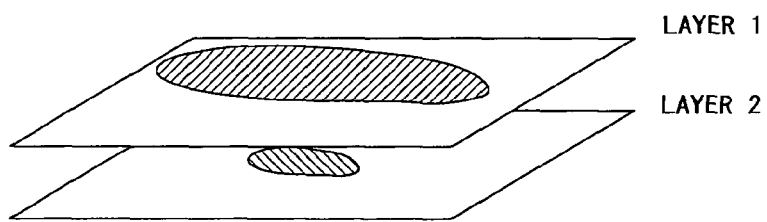
FIG. 15 shows the relationship between the images shown in FIGS. 13 and 14.

Thus, via the host system 2 performing the above-mentioned microscopic image data acquisition process, microscopic images are obtained using different microscopies—such as B-pumped observation (layer 1) and G-pumped observation (layer 2)—for the same specimen 19, as shown in FIG. 15. As clearly indicated by comparing the coordinates of mesh a' (6, 4, 1) with the coordinates of mesh b' (6, 4, 2), the specimens 19 indicated by these microscopic images are located at the same coordinates in each image.

Next, the reproducing and displaying operation of a microscopic image is explained below.

The reproducing and displaying operation is basically the same as the operation according to embodiment 1, and can be realized by the host system 2 performing the microscopic image reproduction and display process shown in FIGS. 7A and 7B. In the present embodiment, a change is made to the flowcharts shown in FIGS. 7A and 7B.

Figure 16:
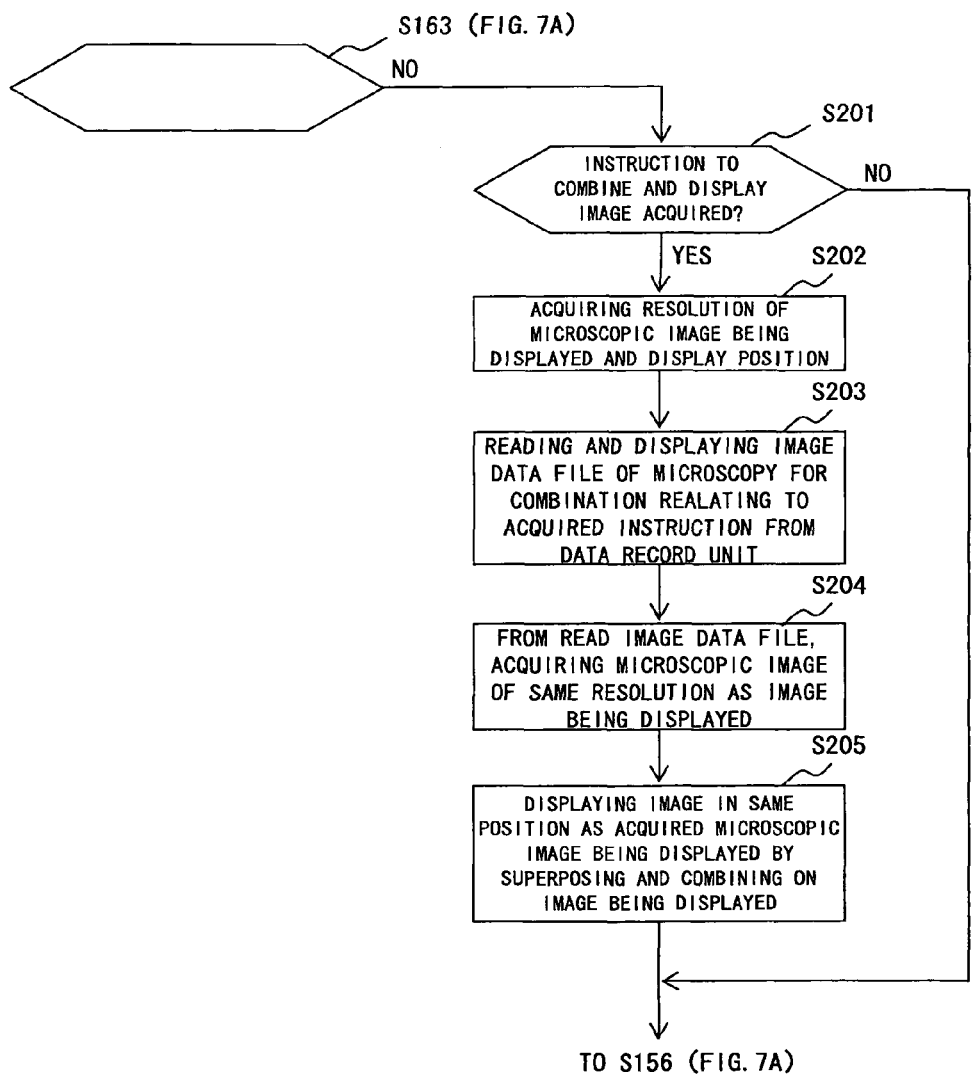
FIG. 16 shows a changed portion in embodiment 2 of the microscopic image reproduction and display process.

The point shown in FIG. 16 is described below. FIG. 16 shows a changed portion in embodiment 2 of the microscopic image reproduction and display process shown in FIGS. 7A and 7B. The flowchart shown in FIG. 16 is performed when the result of the determining process in S163 shown in FIG. 7A is NO. In S163 shown in FIG. 7A, if it is determined that an instruction to switch the selection details of the objective lens 23 in the virtual observation of the specimen 19 has not been acquired, control is passed to the process in FIG. 16, and it is determined in S201 whether or not an instruction has been acquired to superpose and combine the microscopic image captured in another microscopy on the microscopic image being displayed. If it is determined that the instruction has been acquired (YES as a determination result), control is passed to S202. If it is determined that the instruction has not been acquired (NO as a determination result), then control is returned to S156 shown in FIG. 7A, and the above-mentioned processes are repeated.

In S202, the resolution and the display position (enlargement position in the macro image of the enlarged image being displayed) of the microscopic image (enlarged image) currently being displayed on the monitor 5 are acquired.

In S203, in the image data files recorded in the data record unit 4, integrated microscopic images (captured in a microscopy different from the image currently being displayed) to be combined relating to the instruction acquired in the process in S201 are read.

In S204, the images having the resolution obtained in the process in S202 that are in the microscopic images integrated into the image data file read in the process in S203—that is, the images having the same resolution as the microscopic images (enlarged images) currently being displayed on the monitor 5—are acquired, and are temporarily stored in a predetermined work storage area in the host system 2.

In S205, an instruction is issued to the image composition unit 34, and the partial images that are in the range corresponding to the magnification of the objective lens 23 currently selected in the virtual observation of the microscopic image acquired in the process in S204 and that are in the same position as the display position acquired in the process in S202 are superposed and combined with the microscopic image (enlarged image) currently being displayed on the monitor 5, and then control is returned to S156 shown in FIG. 7A and the above-mentioned processes are repeated. The process in S205 is performed by the image composition unit 34 together with the superposing, combining, and displaying operations.

Via the host system 2 performing the above-mentioned processes, the microscope system shown in FIG. 12 can superpose, combine, and display the microscopic images from different microscopies on the same specimen 19. The state of superposing, combining, and displaying a microscopic image in the microscopic image reproduction and display process is explained below by referring to the case in which an image data file into which microscopic images captured in the microscopies of B-pumped observation and G-pumped observation is recorded on the data record unit 4.

First, when a user specifies a virtual observation in B-pumped observation, for example, the macro image of the specimen 19 as exemplified on the left of FIG. 17 and an enlarged image that looks as if it were obtained by enlarging a portion of the macro image as exemplified on the right of FIG. 17 are displayed on the monitor in the processes in S151 to S155.

When the user switches the specification of the microscopy from B-pumped observation to G-pumped observation, the display of an image on the monitor 5 is switched from an image captured using B-pumped observation to the microscopic image captured using G-pumped observation as exemplified in FIG. 18 in the processes in S156 to S159 shown in FIG. 7A and the processes in S160 shown in FIG. 7B. In the microscopic images before and after the display is switched, an enlarged image having the same resolution (display magnification) and indicating the portion at the same position as the specimen 19 is displayed.

Figure 19:
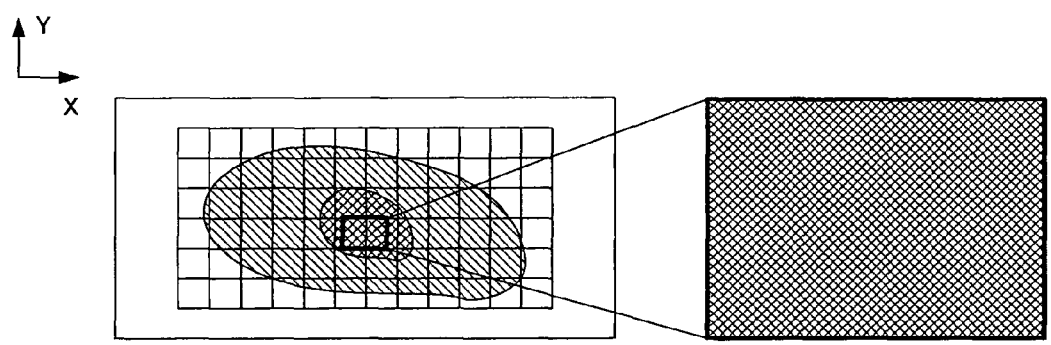
FIG. 19 shows an example of the displaying of a screen when the superposing and composite display of microscopic images using B-pumped observation is supported when

When the user specifies superposing, combining, and displaying the microscopic image via B-pumped observation on the microscopic image obtained using G-pumped observation that is being displayed on the monitor 5, the display of the image on the monitor 5 is switched to the microscopic image obtained by superposing and combining the image captured using G-pumped observation and the image captured using B-pumped observation as exemplified in FIG. 19 in the processes in S201 to S205 shown in FIG. 16. The microscopic images before and after the display is switched are the composite enlarged images having the same resolution (display magnification) and that are at the same position as the specimen 19.

As described above, in the microscope system according to the present embodiment, the microscopic images that have the same magnification at the same position as the specimen 19 but that are captured with different microscopies are combined and displayed. Therefore, a virtual observation with a high reliability for faithfully reproducing the position information of a specimen can be realized via an operation similar to that in the case where the specimen is practically observed using a microscope.

In the present embodiment, the microscopic images having the same magnification at the same position as the specimen 19 but that are captured in different microscopies are combined and displayed. It is also possible to arrange and display on the monitor 5 microscopic images that have the same magnification at the same position as the specimen 19 but that are captured in different microscopies in accordance with the purpose of the virtual observation.

In the present embodiment, as in embodiment 1, the origin point sensor of the electric stage 20 and the initializing operation are used, but it is also possible to acquire the shift of an optical axis using fluorescent cube (cube unit 25) in both B-pumped observation and G-pumped observation in advance, and thereby correct the shift from an acquired image.

In the microscopic image data acquisition process, a high-resolution microscopic image in one microscopy (for example, B-pumped observation) is captured on all meshes, and then a high-resolution microscopic image is captured in another microscopy (for example, G-pumped observation). Alternatively, a high-resolution microscopic image in each specified microscopy can be captured on each mesh, and in this situation the capturing operation is performed repeatedly on each mesh, thereby obtaining a high-resolution microscopic image.

In the present embodiment, two microscopies, B-pumped observation and G-pumped observation, are exemplified; switching between them can occur and both can be used. It is also possible to switch between various other microscopies, not limiting the present invention to only the switching between two types.

Embodiment 3

Figure 20:
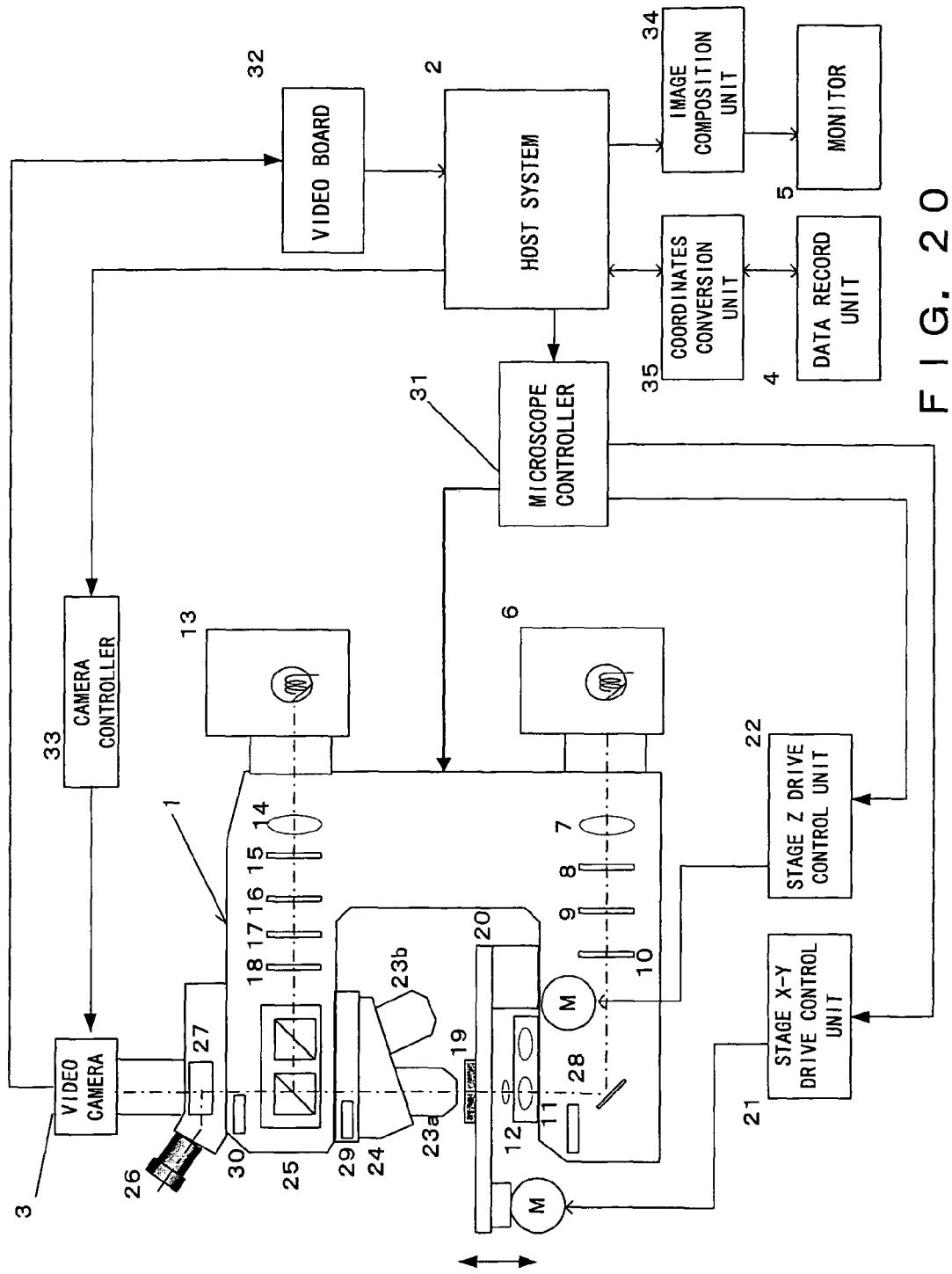
FIG. 20 shows the third example of the configuration of the microscope system embodying the present invention.

FIG. 20 shows the third embodiment of the configuration of the microscope system for embodying the present invention. In FIG. 20, the same components as those in the second example shown in FIG. 12 are assigned the same reference numerals, and the detailed explanation is omitted.

The configuration shown in FIG. 20 is different from the configuration shown in FIG. 12 in that a coordinate conversion unit 35 is inserted between the host system 2 and the image composition unit 34. The coordinate conversion unit 35 provides the function of rotation-converting, in relation to an instruction from the host system 2, the coordinates of each pixel constituting the image.

Next, the operation of the microscope system shown in FIG. 20 is explained.

First, the microscopic image acquiring operation is the same as the operation according to embodiment 2, and a microscopic image is acquired by the host system 2 performing the microscopic image data acquisition process shown in FIGS. 2A and 2B.

The operation of acquiring a microscopic image in the microscopic image data acquisition process is explained below by referring to the case where B-pumped observation and G-pumped observation, which are fluorescent observations having different wavelengths, are specified as microscopies for observing the specimen 19.

When the user specifies the above-mentioned microscopy, the host system 2 acquires the specification in the process in S101 shown in FIG. 2A.

Figure 21:
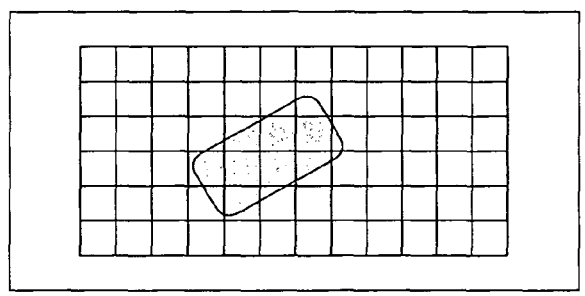
FIG. 21 shows the second example of a high-resolution microscopic image of a specimen using B-pumped observation.

Then, in the processes in S103 to S107, a low-resolution microscopic image of the specimen 19 is obtained using B-pumped observation. Then, in the processes in S108 to S110, a 1×n mesh is defined for the low-resolution microscopic image obtained using B-pumped observation, and a mesh for which a microscopic image is to be captured with a high resolution is determined. In the processes in S112 to S116, a high-resolution microscopic image for each mesh of the specimen 19 obtained using B-pumped observation is obtained, each mesh is combined in the process in S117, and the high-resolution microscopic image of the specimen 19 obtained using B-pumped observation exemplified as shown in FIG. 21 is generated. Then, in the process in S118, the low-resolution microscopic images of the specimen 19 obtained using B-pumped observation are integrated, and one image data file is generated.

Figure 22:
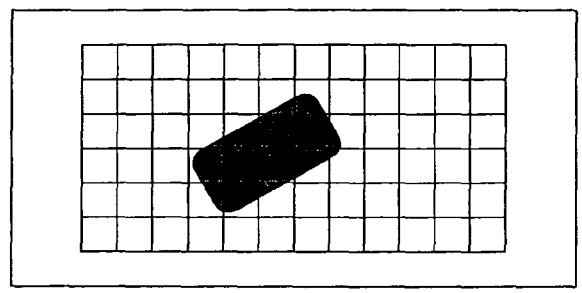
FIG. 22 shows the second example of a high-resolution microscopic image of a specimen using G-pumped observation.

Afterwards, in the processes in S102 to S107, a low-resolution microscopic image of the specimen 19 using G-pumped observation is obtained. At this time, since a mesh has already been defined for the low-resolution microscopic image of the specimen 19 using B-pumped observation, the result of the determining process in S108 is NO. In the subsequent processes in S112 to S116, a high-resolution microscopic image is obtained for each mesh of the specimen 19 using G-pumped observation on the basis of the definition of the mesh for the low-resolution microscopic image obtained using B-pumped observation. Afterwards, in the process in S117, each mesh is combined and a high-resolution microscopic image of the specimen 19 obtained using G-pumped observation exemplified as shown in FIG. 22 is generated. Then, in the process in S118, the low-resolution microscopic image and the high-resolution microscopic image of the specimen 19 obtained using G-pumped observation are combined, and an image data file is generated.

Figure 23:
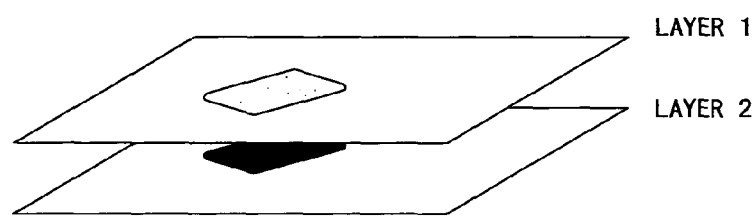
FIG. 23 shows the relationship between the images shown in FIGS. 21 and 22.

Thus, via the host system 2 performing the above-mentioned microscopic image data acquisition process, microscopic images in different microscopies such as B-pumped observation (layer 1) and G-pumped observation (layer 2) are obtained for the same specimen 19 as shown in FIG. 23.

Described below is the reproducing and displaying operation of a microscopic image.

The reproducing and displaying operation is basically the same as the operation according to embodiment 2, and can be read by the host system 2 performing the microscopic image reproduction and display process shown in FIGS. 7A, 7B, and 16; in the present embodiment, however, a change is made to the flowcharts shown in these figures.

The process shown in FIG. 24A is explained below. FIG. 24A shows the first changed portion according to the present embodiment in the microscopic image reproduction and display process shown in FIGS. 7A, 7B, and 16. The processes in the flowchart shown in FIG. 24A are performed when the result of the determining process in S201 shown in FIG. 16 is NO.

If it is determined in S201 shown in FIG. 16 that an instruction to superpose, combine and display the microscopic image of the specimen 19 captured in another microscopy on the microscopic image being displayed has not been acquired, control is passed to the processes shown in FIG. 24A, and it is determined in S301 whether or not a rotating operation by a user, that is, the operation of rotating the microscopic image being observed, has been detected by the host system 2. If it is determined that a rotating operation has been detected (YES as a determination result), control is passed to S302. If it is determined that a rotating operation has not been detected (NO as a determination result), control is returned to S156 shown in FIG. 7A, and the above-mentioned processes are repeated.

In S302, an instruction is issued to the coordinate conversion unit 35, and the coordinates of each pixel constituting the microscopic image currently being displayed on the monitor 5 are rotation-converted at the rotation angle indicated by the rotating operation performed by a user.

In S303, the microscopic image constituted by pixels rotation-converted in the process in the preceding step is switched and displayed on the monitor 5. Afterwards, control is returned to S156 shown in FIG. 7A, and the above-mentioned processes are repeated.

By the host system 2 performing the above-mentioned processes, the microscopic image of the specimen 19 being displayed on the monitor 5 is rotated at the instruction of a user.

Figure 24B:
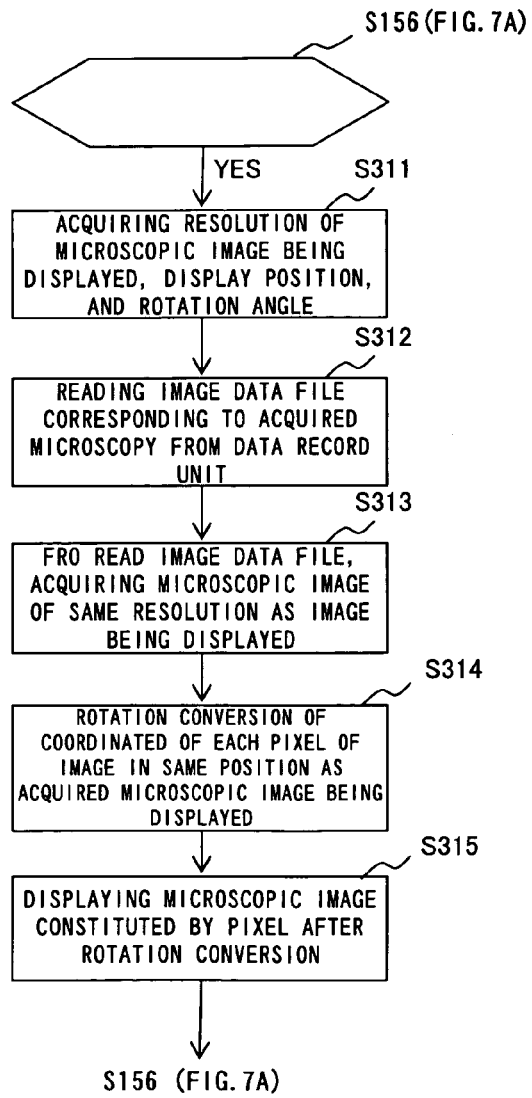
FIG. 24B shows the second change portion in embodiment 3 of the microscopic image reproduction and display process.

The process shown in FIG. 24B is explained below. FIG. 24B shows the second changed portion according to the present embodiment of the microscopic image reproduction and display process which is shown in FIG. 7A, FIG. 7B and FIG. 16. The flowchart shown in FIG. 24B is performed instead of the processes from S157 to S159 shown in FIG. 7A and S160 shown in FIG. 7B.

In S156 shown in FIG. 7A, when it is determined that an instruction has been received to switch the microscopy in the virtual observation of the specimen 19, control is passed to the process in FIG. 24B, and the resolution and the display position of the microscopic image currently being displayed on the monitor 5 and the rotation angle of the microscopic image being displayed are acquired in S311. At this time, when the microscopic image being displayed is not rotated, the rotation angle is "0°".

In S312, the image data files are read that are recorded on the data record unit 4 and into which the microscopic images captured in the microscopy after the switching by the instruction obtained in the process in S156 are integrated, and the microscopic images integrated into the read image data file and having the lowest resolution are switched and displayed on the monitor 5 as a new macro image.

In S313, the microscopic images integrated into an image data file read in the process in S312 and having the resolution obtained in the S311 are acquired and temporarily stored in a predetermined work storage area of the host system 2.

In S314, an instruction is issued to the coordinate conversion unit 35, and the coordinates of each pixel constituting the microscopic image currently being displayed on the monitor 5 are rotation-controlled at a rotation angle acquired in the process in S311.

In S315, the microscopic image constituted by the rotation-conversion in the process in the preceding step is switched and displayed on the monitor 5. Afterwards, control is returned to S156 shown in FIG. 7A, and the above-mentioned process is repeated.

By the host system 2 performing the above-mentioned processes, the display of the images on the monitor 5 is switched, and the partial images of the microscopic images (that were captured in the microscopy) relating to the switching instruction and indicating a portion of the specimen 19 that is at the same position as the displayed partial image before the switch and that has the same resolution as the displayed partial image before the switch are displayed after undergoing the same rotation undergone by the displayed partial images before the switch.

The state of superposing, combining, and displaying a microscopic image in the microscopic image reproduction and display process is explained below by referring to the case in which an image data file into which microscopic images captured in the microscopies of B-pumped observation and G-pumped observation is recorded on the data record unit 4.

Figure 25:
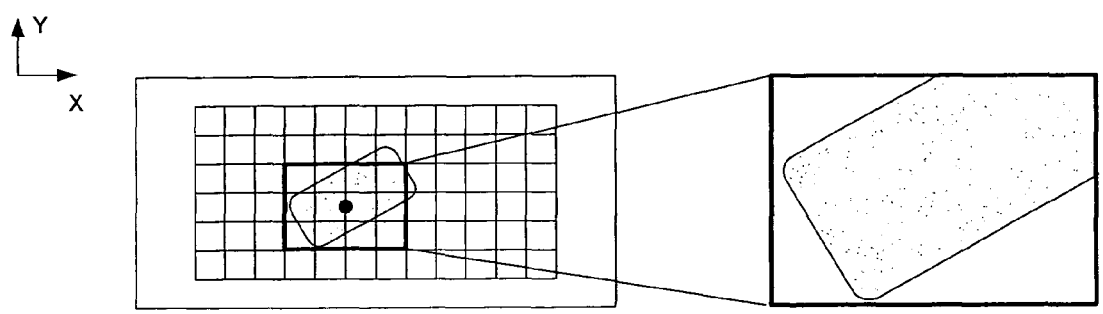
FIG. 25 shows the second example of the displaying of a microscopic image when a virtual observation using B-pumped observation is specified.

First, for example, when a user specifies a virtual observation using B-pumped observation, the macro image of the specimen 19 as exemplified on the left of FIG. 25 and an enlarged image that looks as if it were obtained by enlarging a portion of the macro image as exemplified on the right of FIG. 25 are displayed on the monitor 5 in the processes in S151 to S155 shown in FIG. 7A.

Figure 26:
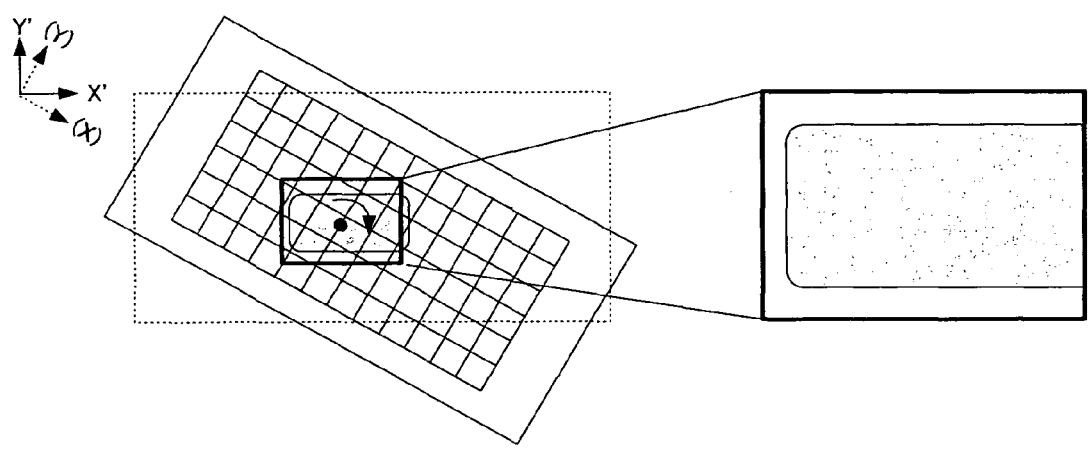
FIG. 26 shows an example of the displaying of a microscopic image when a turning operation is performed when

When the user performs a rotating operation (especially a clockwise movement), the display of the microscopic image on the monitor 5 is switched to the display of the portion obtained by rotating clockwise the display of the specimen 19 shown in FIG. 25 as exemplified in FIG. 26 in the processes in S301 to S303 shown in FIG. 24A.

At this time, when the user performs an operation to move (especially in the X' direction that is the horizontal direction after the above-mentioned rotation) the X-Y position, the display of the enlarged image s on the monitor 5 is switched from the display of the specimen 19 shown in FIG. 26 to the display of the portion obtained after the movement in the X' direction in the processes in S161 and S162 of FIG. 7A as exemplified in FIG. 27.

Figure 28:
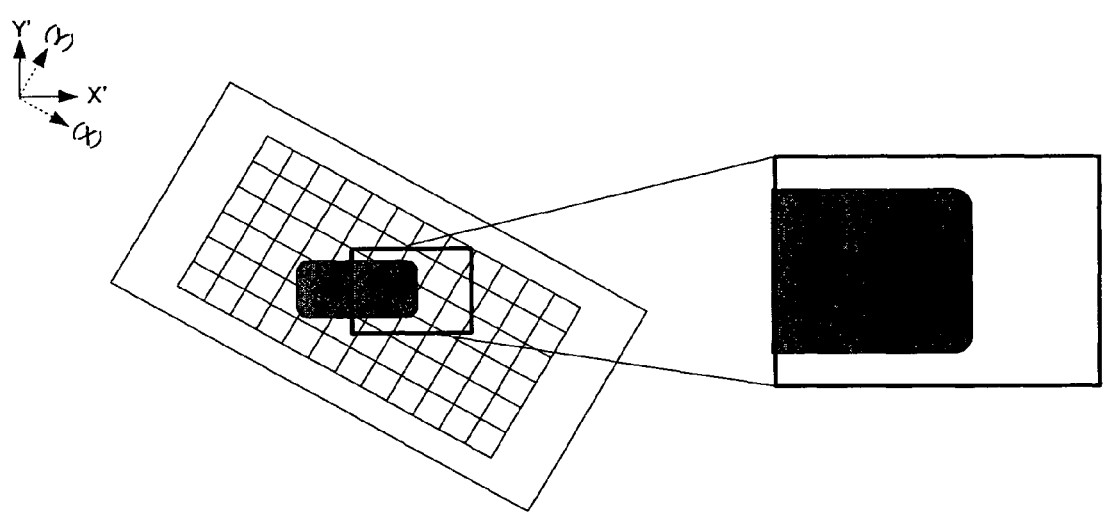
FIG. 28 shows an example of the displaying of a microscopic image when a virtual observation using G-pumped observation is specified when

When the user switches the specification of the microscopy from B-pumped observation to G-pumped observation, the display of an image on the monitor 5 is switched from an image captured using B-pumped observation to the microscopic image captured using G-pumped observation as exemplified in FIG. 28 in the processes in S156 shown in FIG. 7A and S311 through S315 shown in FIG. 24B. In the microscopic images before and after the display switch, an enlarged image having the same resolution (display magnification) and indicating the portion at the same position as the specimen 19 is displayed after the same rotating process.

As described above, in the microscope system according to the present embodiment, microscopic images having the same magnification at the same position as the specimen 19 that are captured in different microscopies are displayed after performing the same rotating process. Therefore, a virtual observation with a high reliability for faithfully reproducing the position information of a specimen can be realized by the operability similar to that in the case where the specimen is practically observed using a microscope.

As described above, in the microscope system according to the present embodiment, a microscopic image can be rotated and the microscopy can be switched via an operation similar to that used in the case in which the specimen is practically observed using a microscope in a so-called virtual microscope system used for reconstituting an image of a specimen by combining the microscopic images that are obtained by capturing a specimen.

In the present embodiment, two microscopies, B-pumped observation and G-pumped observation, are exemplified, and switching between them can occur and both can be used. It is also possible to switch between various other microscopies, not limiting the present invention to only the switching between two types.

Embodiment 4

The microscope system according to the present embodiment is different from the systems shown in FIGS. 2A and 2B in the details of the microscopic image data acquisition process, while the other operations and configurations are the same as those according to embodiment 1 (or 2 or 3).

In the microscopic image data acquisition process shown in FIGS. 2A and 2B, after capturing high-resolution microscopic images in one microscopy on all meshes, high-resolution microscopic images are captured in another microscopy. In the microscopic image data acquisition process according to the present embodiment, a high-resolution microscopic image is completely captured in a specified microscopy on one mesh, and the entire high-resolution microscopic image is obtained by repeatedly performing the capturing process on each mesh.

Figure 29A:
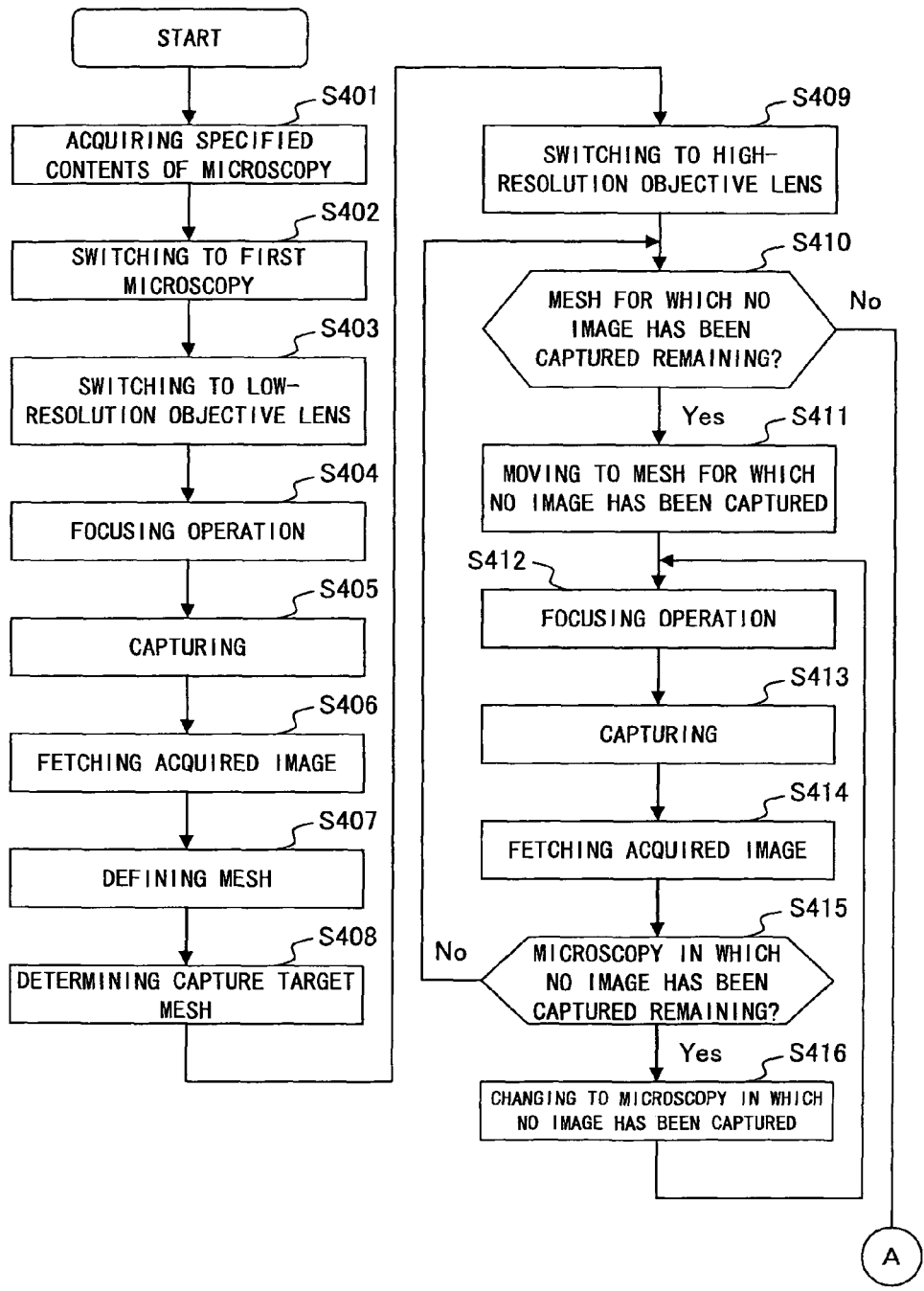
FIG. 29A is flowchart (1) showing the microscopic image data acquisition process in embodiment 4.
Figure 29B:
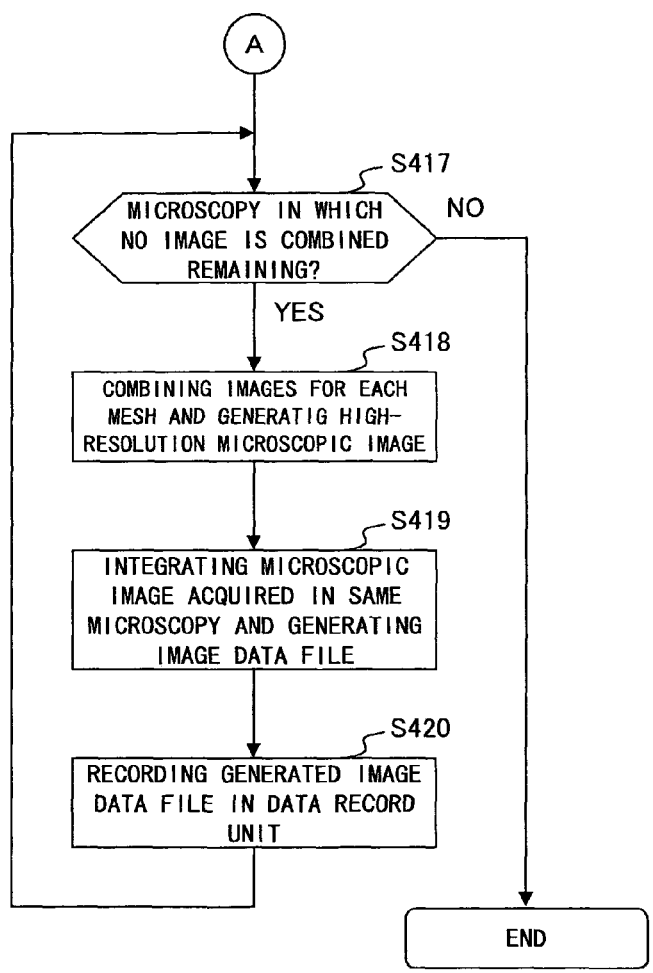
FIG. 29B is flowchart (2) showing the microscopic image data acquisition process in embodiment 4.

FIGS. 29A and 29B show the microscopic image data acquisition process according to the present embodiment. This process is realized and started by the CPU of the host system 2 executing a predetermined control program.

First, in S401 shown in FIG. 29A, the instruction of the microscopy for observation of the specimen 19 is acquired from the user. In the present embodiment, it is assumed that the specification of three different microscopies, hereinafter called the first microscopy, the second microscopy, and the third microscopy, is acquired.

In S402, an instruction is issued to the microscope controller 31, and the setting of the microscope apparatus 1 is changed to the setting for capturing a microscopic image in the first microscopy. At the instruction, the microscope controller 31 controls the operation of each component of the microscope apparatus 1 to capture an image in the first microscopy. At this time, the coordinate system of the specimen 19 is set using the origin point sensor of the electric stage 20 in the initializing operation.

In the subsequent S403 to S406 and S407 to S409, since processes similar to the processes in S104 to S107 and S109 to S111 shown in FIG. 2A are performed, the explanation is omitted here.

In S410, it is determined whether or not there is an image on which high-resolution capturing has not been performed in each microscopy obtained in the process in S401 in the mesh to be captured with high-resolution determined in the process in S408. When the determination result is YES, control is passed to S411. If NO, control is passed to S417 (shown in FIG. 29B).

When the determination result in S410 is YES, processes similar to the processes in S112 to S116 shown in FIG. 2A are performed in S411 to S414. Therefore, the explanation is omitted here.

In S415, it is determined whether or not there remains any microscopy acquired by the process of S401 by which a microscopic image has not been captured on the portion of the specimen 19 immediately below the current objective lens 23b. If the determination result is YES, control is passed to S416. If NO, control is returned to the process in S410 and the above-mentioned processes are repeated.

After S416, control is returned to S412, and the above-mentioned processes are repeated.

Thus, the processes in S412 to S416 are repeated until the determination in S416 is NO, thereby capturing the portion of the specimen 19 immediately below the objective lens 23b in the first to third microscopies and obtaining one microscopic image in each of the three different microscopies. By repeating the processes in S410 to S416 until the determination in S410 is NO, one microscopic image in each of the three different microscopies are obtained for each portion of the specimen 19 in the mesh to be captured with high resolution.

When the determination result in S415 is YES, an instruction is issued to the microscope controller 31 in S416 to change the setting of the microscope apparatus 1 to the setting for capturing a microscopic image of the portion of the specimen 19 immediately below the current objective lens 23b in the microscopy that has not performed the capturing operation. Upon receiving the instruction, the microscope controller 31 controls the operation of each component of the microscope apparatus 1 to capture an image in the microscopy.

When the determination in S410 is NO, in S417 (shown in FIG. 29B) it is determined whether or not there is a microscopy that is obtained in the process in S401 that has not combined high-resolution microscopic images for each mesh. If the determination result is YES, control is passed to S418. If NO, the microscopic image data acquisition process terminates.

If the determination in S417 is YES, in S418 the high-resolution microscopic images are combined for each mesh captured in one remaining microscopy, and a high-resolution microscopic image indicating the entire specimen 19 is generated. In this process, the high-resolution microscopic images of adjacent meshes captured in the microscopy are combined, and the high-resolution microscopic image indicating the entire specimen 19 is generated.

In S419, the low-resolution microscopic image of the specimen 19 fetched to the host system 2 in the process in S406 (FIG. 29A) and is integrated into one image data file with the high-resolution microscopic image indicating the entire specimen 19 generated in the process in S418.

In S420, the image data file obtained in the preceding step is recorded on the data record unit 4. Afterwards, control is returned to S417, and the above-mentioned processes are repeated.

Thus, the processes in S417 to S420 are repeated until the determination in S417 is NO, thereby recording on the data record unit 4 the image data file that includes the images of combined high-resolution microscopic images captured in the first microscopy, the image data file that includes the image of combined high-resolution microscopic images captured in the second microscopy, and the image data file that includes the image of the combined high-resolution microscopic images captured in the third microscopy.

The above-mentioned processes comprise the microscopic image data acquisition process relating to the present embodiment.

The state of acquiring a microscopic image in the microscopic image data acquisition process is explained by referring to a case in which differentiation interference observation (first microscopy), B-pumped fluorescent observation (second microscopy), and G-pumped fluorescent observation (third microscopy) are specified as the microscopies in observing the specimen 19.

First, in the processes in S402 to S406, the low-resolution microscopic image of the specimen 19 is obtained in differentiation interference observation. Then, in the process in S407 to S408, a mesh is determined for which a high-resolution microscopic image is to be captured for the low-resolution microscopic image in differentiation interference observation. In the processes in S409 to S416, a high-resolution microscopic image via differentiation interference observation, a high-resolution microscopic image via B-pumped fluorescent observation, and a high-resolution microscopic image via G-pumped fluorescent observation are obtained for each mesh in accordance with the definition of a mesh for a low-resolution microscopic image obtained by differentiation interference observation. Furthermore, in the processes in S417 to S420, an image data file of an image of combined high-resolution microscopic images obtained by differentiation interference observation integrated with a low-resolution microscopic image obtained by differentiation interference observation, an image data file of an image of combined high-resolution microscopic images obtained by B-pumped fluorescent observation integrated with a low-resolution microscopic image obtained by differentiation interference observation, and an image data file of an image of combined high-resolution microscopic images obtained by G-pumped fluorescent observation integrated with a low-resolution microscopic image obtained by differentiation interference observation are recorded on the data record unit 4.

As described above, according to the present embodiment, since the XY coordinates of the high-resolution microscopic image acquired in different microscopies are the same, the reducibility of the XY coordinates is improved. Additionally, since it is not necessary to move the electric stage 20 in the XY direction for each capturing operation, the time required in the microscopic image data acquisition process can be shortened.

In the microscopic image data acquisition process according to the present embodiment, control is returned to S412 after S416 and a focusing operation is performed for each microscopy on one mesh, but it is also possible to return control to S413 after S416 in order to perform a focusing operation only once on one mesh. Thus, the time required to perform the microscopic image data acquisition process can be shortened. When the fluorescent observation is included in a microscopy other than the first microscopy in the microscopies specified in S401, the fading using fluorescent observation can be avoided.

In the microscopic image data acquisition process according to this embodiment, a low-resolution microscopic image can be acquired only in the first microscopy. However, it is possible to, for example, acquire a low-resolution microscopic image in each of the other microscopies. In this case, an image of a low-resolution microscopic image combined with a high-resolution microscopic image obtained in the same microscopy can be integrated into an image data file.

In the present embodiment, the first microscopy is not limited to a partial interference observation, but can be any of several well-known microscopies such as bright-field observation, dark-field observation, phase difference observation, etc.

The second and third microscopies are not limited to the fluorescent observation, but can be any of various well-known microscopies. The number of specified microscopies is not limited to three, but can be two or four or more.

Embodiment 5

The microscope system according to the present embodiment is a microscope system based on embodiment 2, and has a further function of being capable of changing the display condition of a microscopic image in a desired microscopy in the superposed and combined image (hereinafter referred to as a superposed and combined image) displayed in the process shown in FIG. 16.

In the display condition change function, when a user issues a predetermined specification through an input unit of the host system 2 (not shown in the attached drawings) when a superposed and combined image (for example, the superposed and combined microscopic image and an enlarged image shown in FIG. 19) is displayed in the process in S205 shown in FIG. 16, the monitor 5 displays a display window capable of having the display condition input of a microscopic image in a desired microscopy for a superposed and combined image.

FIG. 30 shows an example of a display window.

As shown in FIG. 30, the display window displays a superposed and combined macro image 36 (for example, a superposed and combined macro image displayed on the left of FIG. 19) displayed on the monitor 5, and a slider 37 (37a and 37b) capable of inputting brightness for the microscopic image, in each microscopy, constituting a superposed and combined image. In the superposed and combined macro image 36 in the display window, the easiness of an observation is considered, and the background portion is colored black when displayed.

In the present embodiment, a superposed and combined image is an image obtained by superposing a microscopic image obtained by G-pumped observation on a microscopic image obtained by B-pumped observation. The slider 37a can input brightness for the microscopic image obtained by G-pumped observation, and the slider 37b can input brightness for the microscopic image obtained by B-pumped observation. Each slider is constituted such that it can be moved up and down by operating the input unit (for example, a mouse) of the host system 2 not shown in the attached drawings. Moving the slider up increases brightness level and moving it down decreases brightness level.

Figure 31:
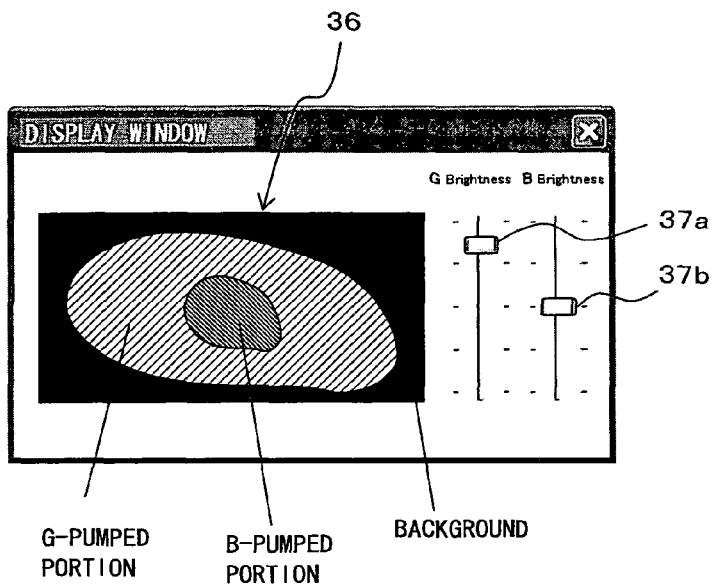
FIG. 31 shows an example of a display window after a slider is moved.

If a user moves the slider 37a upward when the above-mentioned display window is displayed, an image is processed such that the image can be displayed with brightness depending on the position of the moved slider 37a relative to the microscopic image, obtained by G-pumped observation, constituting a superposed and combined image. Then, the microscopic image that was obtained by G-pumped observation and that constitutes the displayed superposed and combined image is replaced with the processed image. Thus, in the display window, as shown in FIG. 31, a microscopic image obtained by G-pumped observation in the superposed and combined macro image 36 is displayed as an image with brightness depending on the position of the moved slider 37a—that is, as a brighter image. Similarly, in the superposed and combined macro image and enlarged image (for example, the microscopic image and enlarged image shown in FIG. 19) displayed on the monitor 5, the microscopic image obtained by G-pumped observation in the microscopic image is displayed with brightness depending on the position of the moved slider 37a.

As described above, according to the present embodiment, when a microscopic image obtained by each microscopy is displayed after being superposed and combined, a user can freely change the display condition for the microscopic image in a desired microscopy. In this way, the observation position can be easily recognized.

In the present embodiment, there are two microscopic images constituting a superposed and combined image, but it is possible for there to be three or more. If there are three or more, the sliders of the number of microscopic images constituting a superposed and combined image are displayed in the display window.

In the present embodiment, the display condition is brightness, but can also be, for example, contrast, a correction control, color balance, etc. Alternately, gain, contrast, a gamma correction, etc. can be used.

In the present embodiment, the display condition is input by moving each slider. Also, a numeric value can be input directly.

The present invention can also be embodied by recording the processes shown in the flowcharts in FIGS. 2A, 2B, 7A, 7B, 16, 24A, 24B, 29A, and 29B in a computer-readable recording medium after generating a control program to give the CPU of the computer a standard configuration and after the execution by the CPU of the program read by the computer from the recording medium.

The recording medium capable of reading a recorded control program by a computer can be, for example, a storage device such as ROM provided in a computer or as an external device attached to a computer or a hard disk, a portable recording medium such as a flexible disk capable of storing a control program recorded by inserting the disk into a medium drive device provided for a computer, MO (optical magnetic disk), CD-ROM, DVD-ROM, etc., or other such recording mediums.

The recording medium can also be a storage device connected to a computer through a communication circuit and provided in a computer system functioning as a program server. In this case, a transmission signal obtained by modulating a carrier wave using a data signal that represents a control program is transmitted to a computer from a program circuit through a communication circuit that acts as a transmission medium. A computer then demodulates the received transmission signal to reproduce a control program, thereby enabling the CPU of the computer to execute the control program.

In the present embodiment, the image acquisition device is a video camera, but it can be replaced with a well-known image acquisition device such as a CCD, a line sensor, etc. Focusing can be performed via the so-called video AF, which can be an active AF or other well-known AF device, and the precision of the AF can be enhanced by an aberration lens.

Embodiments 1 through 5 of the present invention are described above, but the present invention is not limited to the above-mentioned embodiments 1 through 5, and various improvements and changes can be realized within the scope of the gist of the present invention.

For example, in the microscope system according to each of the embodiments 1 through 5, an erect microscope is used as the microscope apparatus 1, but it is possible to use an inverted microscope, and the present embodiment can be applied to various systems such as a line device into which a microscope apparatus is incorporated.

As another example, in each of the embodiments 1 through 5 above a microscopic image captured by a microscope system is reproduced and displayed on the same microscope system. Alternately, the microscope system can be provided at separate places and an image data file of the microscopic images generated in one microscope system can be transmitted to another microscope system through a communication circuit, and a microscopic image represented by the image data file can be reproduced and displayed on the other microscope system.

Embodiment 6

FIG. 32 shows an example of the configuration of the microscope system according to embodiment 6 of the present invention.

In FIG. 32, the microscope apparatus 1, which functions as a transmission observation optical system, includes the transmission illumination light source 6, the collector lens 7 for collecting illumination light from the transmission illumination light source 6, the transmission filter unit 8, the transmission field iris 9, the transmission aperture iris 10, the capacitor optical element unit 11, and the top lens unit 12. Furthermore, it includes as an incident-light observation optical system the incident-light illumination light source 13, the collector lens 14, the incident-light filter unit 15, the incident-light shutter 16, the incident-light field iris 17, and the incident-light aperture iris 18.

Furthermore, the electric stage 20 capable of moving up and down and right and left and having the specimen 19 placed on it is provided on the observation optical path where the optical path of the transmission observation optical system overlaps the optical path of the incident-light observation optical system. The movement of the electric stage 20 is controlled by the stage X-Y drive control unit 21 and the stage Z drive control unit 22. The electric stage 20 has an origin point detection function (not shown in the attached drawings) operated by an origin point sensor, and the coordinates can be set for each portion of the specimen 19 placed on the electric stage 20.

On the observation optical path, the revolver 24 for selecting what is used in an observation from among a plurality of objective lenses 23a, 23b, . . . (hereinafter referred to as an "objective lens 23" as necessary) that are selected via rotation of the revolver, a cube unit 25 for switching the observation method (microscopy), and the beam splitter 27 for branching the observation optical path into the eyepiece 26 side and the video camera 3 side. Furthermore, the polarizer 28 for differentiation interference observation, the DIC (differentiation interference contrast) prism 29, and the analyzer 30 can be inserted into the observation optical path. Each unit is power driven, and the operation is controlled by the microscope controller 31 described later.

The microscope controller 31 connected to the host system 2 has the function of controlling the operation of the entire microscope apparatus 1, changes the observation method according to the control signal from the host system 2, adjusts the light of the transmission illumination light source 6 and the incident-light illumination light source 13, and has the function of transmitting the observation status (microscopy status) of the current microscope apparatus 1 to the host system 2. Furthermore, the microscope controller 31 is also connected to the stage X-Y drive control unit 21 and the stage Z drive control unit 22, and the electric stage 20 can also be controlled by the host system 2.

The microscopic image of the specimen 19 captured by the video camera 3 is fetched by the host system 2 through the video board 32. The host system 2 can set the control of an automatic gain ON or OFF, can set the gain, can set the control of automatic exposure ON or OFF, and can set the exposure time on the video camera 3 through the camera controller 33. The host system 2 can store a microscopic image transmitted from the video camera 3 as an image data file in the data record unit 4. The image data recorded in the data record unit 4 is read by the host system 2, and the microscopic image expressed by the image data can be displayed on the monitor 5 as a display unit.

Furthermore, the host system 2 also provides a so-called video AF function for performing a focusing operation on the basis of the contrast of the image captured by the video camera 3, and has the function of recording the coordinates of the focus position obtained by the video AF function on a capture coordinates record unit 134. The host system 2 is a general-purpose computer that includes a CPU (central processing unit) for controlling the operation of the entire microscope system by executing a control program, main memory used by the CPU as work memory as necessary, an input unit such as a mouse, a keyboard, etc. for obtaining various instructions from a user, an interface unit for managing communications of a variety of data with each component of the microscope system, and an auxiliary storage device such as a hard disk device, etc. for storing various programs and data.

Described below is the operation of the microscope system.

First, the process of acquiring the microscopic image data of the specimen 19 in the microscope system shown in 32 is described.

Figure 33A:
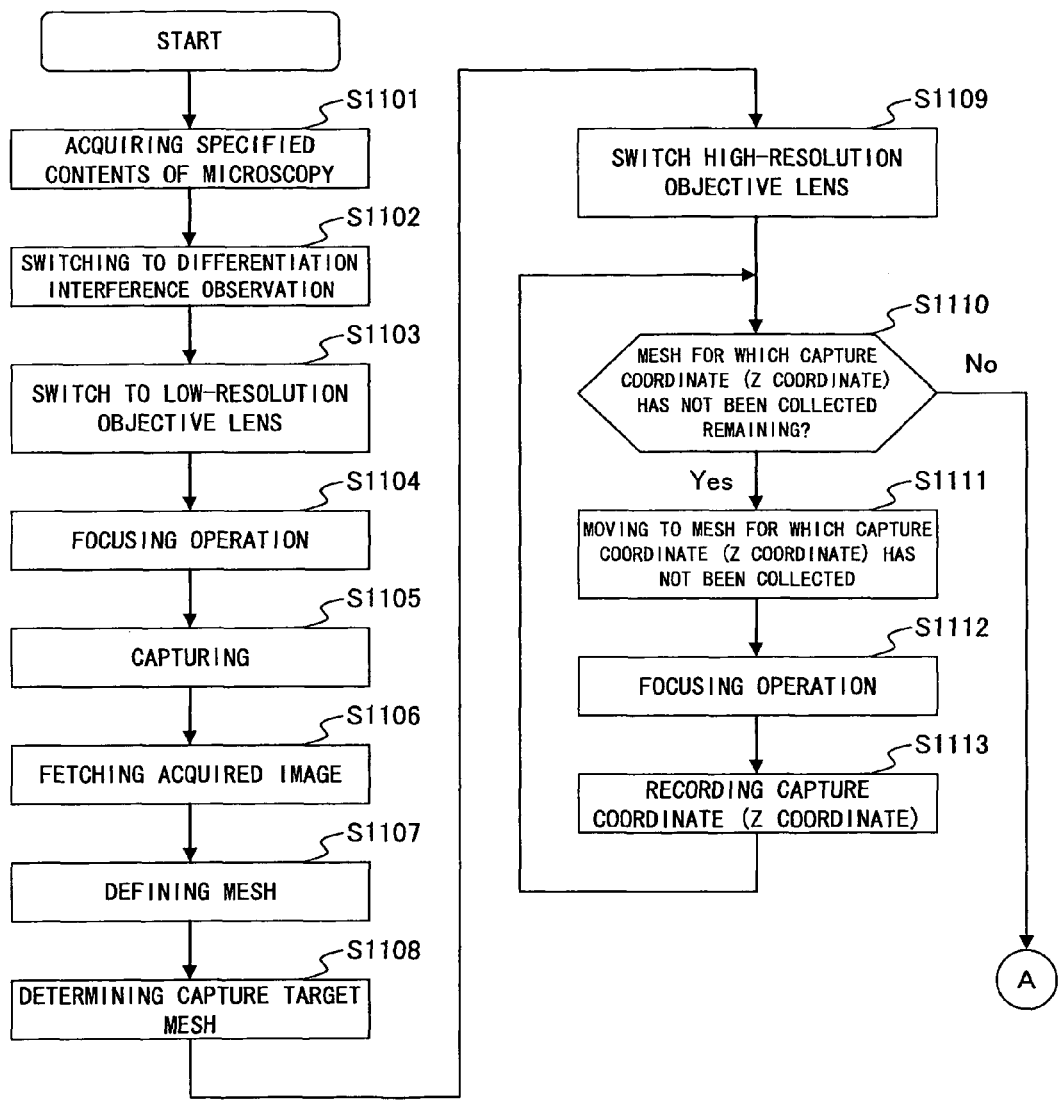
FIG. 33A is the first flowchart showing the microscopic image data acquisition process performed by the host system according to embodiment 5.
Figure 33B:
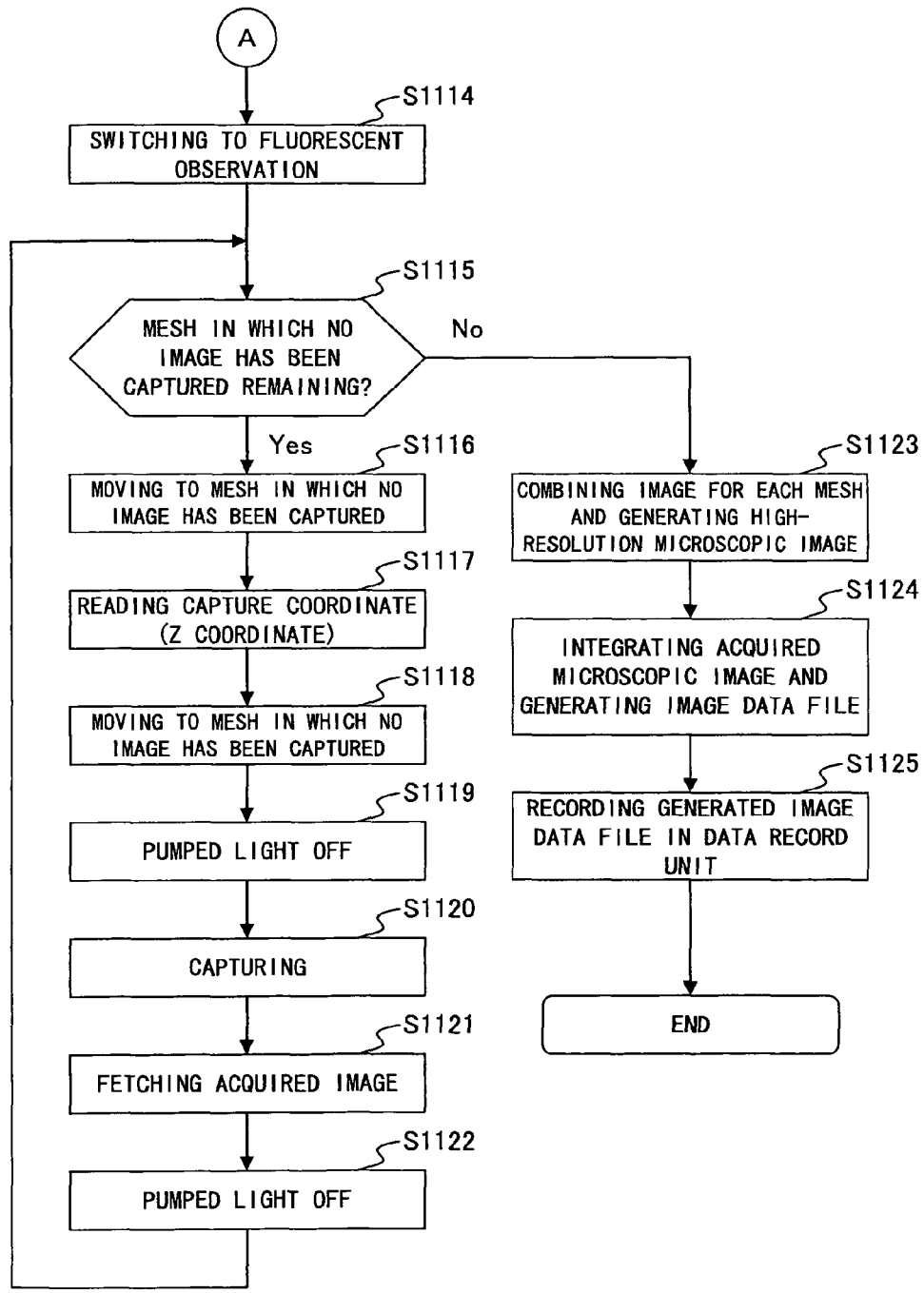
FIG. 33B is the second flowchart showing the microscopic image data acquisition process performed by the host system according to embodiment 5.

FIGS. 33A and 33B are flowcharts of the microscopic image data acquisition process performed by the host system. The process is realized and started by the CPU of the host system 2 executing a predetermined control program. In this process, the instructions given by and operations performed by a user are issued and performed via an input unit, not shown in the attached drawings, of the host system 2.

In FIG. 33A, in S1101, the process of acquiring from a user an instruction of the observation method (microscopy) of the specimen 19 is performed. In the present embodiment, it is assumed that the differentiation interference observation method is specified as the observation method when capture coordinates are acquired and that the fluorescent observation method is specified as an observation when an image is captured.

In S1102, an instruction is issued to the microscope controller 31, and the setting of the observation method for the microscope apparatus 1 is switched to the setting of the differentiation interference observation method acquired in S1101 as the observation method used when capture coordinates are acquired. Thus, the microscope controller 31 operates various components of the microscope apparatus 1, and sets the image-capturing settings in the differentiation interference observation method. When this is done, the origin point sensor and its initializing operation set the coordinates system of the specimen 19.

In S1103, an instruction is issued to the microscope controller 31, the revolver 24 is rotated, and the low-magnification objective lens 23a is selected.

In S1104, the controlling process for focusing, which is based on the contrast of the microscopic image of the specimen 19 captured by the video camera 3, is performed.

In S1105, an instruction is issued to the camera controller 33, and the entire image of the specimen 19 is captured by the video camera 3.

In S1106, the low-resolution microscopic image acquired in the preceding step is fetched from the video camera 3 to the host system 2 through the video board 32.

In S1107, a small section (hereinafter referred to as a mesh) corresponding to a view area (angle of view) when the specimen 19 is captured using the high-resolution objective lens 23b for the low-resolution microscopic image fetched in the preceding step. In the present embodiment, a mesh of a 1×n (1 row by n columns) rectangle is defined. For example, as shown in FIG. 34, a mesh of 1×n=6×12 rectangles is defined. In FIG. 34, the reference numeral 51 indicates the portion that was captured of the specimen 19 of the low-resolution microscopic image.

In S1108, it is determined whether or not the image of the captured portion of the specimen 19 is contained in each partial area of the low-resolution microscopic image divided by the mesh defined in the preceding step, and a mesh (hereinafter referred to as a "capture target mesh") for capturing an image using the high-resolution objective lens 23b is determined. The determination can be performed on the basis of, for example, the presence/absence of a contour image (contrast image) of the specimen 19 obtained by calculating the difference between adjacent pixels, the color of the image of each mesh, etc. For example, if the process in the current step is performed when the mesh is defined as shown in FIG. 34, the mesh indicated by the bold line is determined to be a capture target mesh as shown in FIG. 35.

In S1109, an instruction is issued to the microscope controller 31, the revolver 24 is rotated, and a high magnification objective lens 23b is selected.

In S1110, it is determined whether or not there are remaining meshes in the capture target meshes determined in S1108 that have not collected a Z coordinate (coordinate in the optical axis direction of the objective lens 23 being selected) as a capture coordinate in the focusing operation. If the determination result is YES, control is passed to S1111.

In S1111, an instruction is issued to the microscope controller 31, and the electric stage 20 is moved such that the portion of the specimen 19 displayed in the area of the capture target mesh that has not collected a capture coordinate (Z coordinate) can be located immediately below the objective lens 23b.

In S1112, the control process for the focusing operation that is based on the contrast of the image of the specimen 19 captured by the video camera 3 is performed.

In S1113, the capture coordinate (Z coordinate) is stored in the capture coordinates record unit 134 as a focus coordinate in the capture target mesh being processed.

After S1113, control is returned to S1110, and the above-mentioned processes are repeated. That is, the capture coordinate (Z coordinate) in each capture target mesh determined in S1108 is recorded in the capture coordinates record unit 134.

In the determination in S1110, when the determination result is NO—that is, if it is determined that the capture coordinates (Z coordinates) of all capture target meshes have been acquired in the current differentiation interference observation method—control is passed to the step in S1114 shown in FIG. 33B.

In S1114, an instruction is issued to the microscope controller 31, and the setting of the observation method that will be used for the microscope apparatus 1 when an image is captured is switched to the fluorescent observation method acquired in S1101. Thus, upon receiving the instruction, the microscope controller 31 sets the status for capturing an image with the fluorescent observation method by controlling the operation of each component of the microscope apparatus 1. When this occurs, the coordinates system of the specimen 19 is set by the origin point sensor of the electric stage 20 and its initializing operation. With these settings, the incident-light shutter 16 is closed by the microscope controller 31, and the pumped light is in the OFF state.

In S1115, it is determined whether or not there is a remaining capture target mesh that has not captured an image using the fluorescent observation method that was switched to in the preceding step. If the determination result is YES, control is passed to S1116.

In S1116, an instruction is issued to the microscope controller 31, and the electric stage 20 is moved such that the portion of the specimen 19 displayed in the area of the capture target mesh that has not captured an image can be immediately below the objective lens 23b.

In S1117, the capture coordinate (Z coordinate) in the capture target mesh for which the electric stage 20 has moved in the preceding step (the capture coordinate (Z coordinate) recorded in S1113) is read from the capture coordinates record unit 134.

In S1118, the electric stage 20 is moved to the capture coordinate (Z coordinate) read in the preceding step. That is, in the capture target mesh (1, n) in which an image is captured using the fluorescent observation method, the electric stage 20 is moved to the capture coordinate (Z coordinate), which is a focus coordinate in the capture target mesh (1, n) obtained in the above-mentioned differentiation interference observation method.

In S1119, the microscope controller 31 has opened the incident-light shutter 16, and the pumped light is in the ON status.

In S1120, an instruction is issued to the camera controller 33, and the process of capturing an image with the video camera 3 is performed.

In S1121, a high-resolution microscopic image obtained in capturing an image in the preceding step is fetched from the video camera 3 to the host system 2 through the video board 32.

In S1122, the incident-light shutter 16 is closed by the microscope controller 31, and the pumped light is in the OFF status.

After S1122, control is returned to S1115, and the above-mentioned processes are repeated.

In the determination in S1115, when the determination result is NO—that is, when it is determined that all capture target meshes (for example, all capture target meshes shown in FIG. 35) have been captured in the current fluorescent observation method—control is passed to S1123.

In S1123, the high-resolution microscopic images for each capture target mesh are combined, and a high-resolution and wide-angle-view microscopic image is generated.

In S1124, the high-resolution and wide-angle-view microscopic image generated in the preceding step and the low-resolution microscopic image fetched in S1106 are integrated into one image data file.

In S1125, the image data file integrated in the preceding step is recorded on the data record unit 4.

Figure 36:
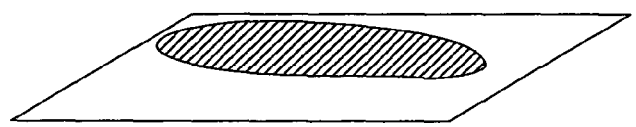
FIG. 36 is an explanatory view showing the high-resolution and wide-angle-view microscopic image generated in S1123.

In the microscopic image data acquisition process explained above by referring to FIGS. 33A and 33B and given as an example, the capture target mesh as shown in FIG. 35 is determined for the low-resolution microscopic image of the specimen 19 acquired in the differentiation interference observation method in the processes in S1103 through S1118. Then, in S1109 through S1113, the capture coordinate (Z coordinate) for the high-resolution microscopic image for each capture target mesh is acquired. In S1114 through S1122, using the fluorescent observation method, the high-resolution microscopic image for each capture target mesh is acquired on the basis of the capture coordinate (Z coordinate). Then, in S1123 through S1125, the high-resolution microscopic images are combined, and the high-resolution and wide-angle-view microscopic image of the specimen 19 using the fluorescent observation method as shown in FIG. 36 is generated.

Next, to perform a virtual observation on a microscopic image displayed in the image data file recorded in the data record unit 4 by performing the microscopic image data acquisition process, the process of reproducing and displaying the microscopic image on the monitor 5 is explained below.

Figure 37:
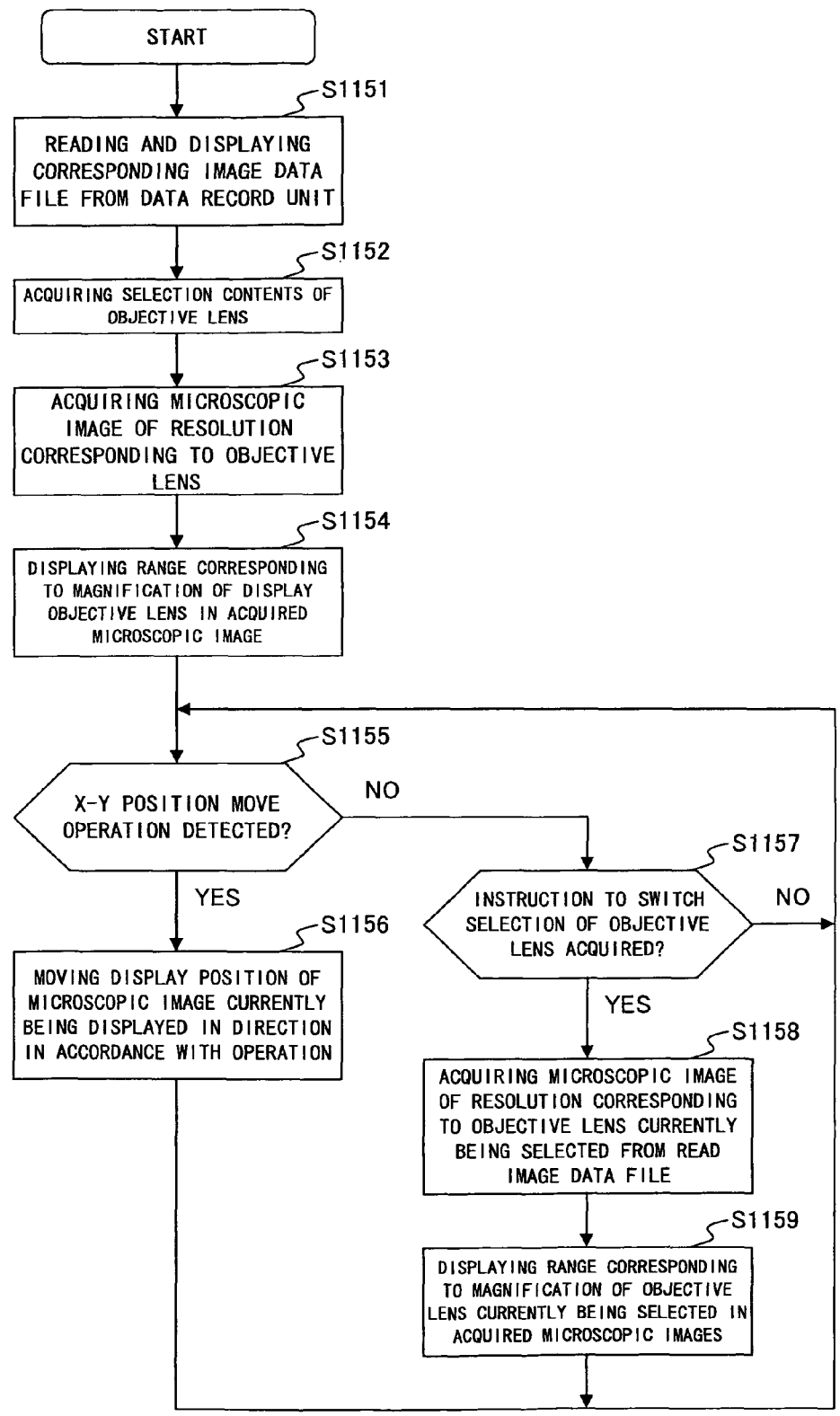
FIG. 37 is a flowchart of the microscopic image reproduction and display process performed by a host system.

FIG. 37 is a flowchart of the microscopic image reproduction and display process performed by the host system 2. The process is realized and started by the CPU of the host system 2 performing a predetermined control program. In this process, the instruction and operation of a user are performed on an input unit, not shown in the attached drawings, of the host system 2.

In FIG. slider 37, first in S1151, a corresponding image data file is read, upon receiving instructions from a user, from the image data file into which microscopic images recorded in the data record unit 4 are integrated, and the low-resolution microscopic images in the integrated microscopic images are displayed on the monitor 5 as macro images.

In S1152, the selection details of the objective lens 23 for the virtual observation performed by a user are acquired.

In S1153, the microscopic images (microscopic images obtained by capturing the specimen 19 using the objective lens 23 relating to the selection details) at the resolution corresponding to the objective lens 23 relating to the selection details acquired in the preceding step are acquired from the microscopic images integrated into the image data file read in S1151 and are temporarily stored in a predetermined work storage area of the host system 2. The microscopic image acquired and stored in this step can be obtained, for example, by performing an image process such as a resizing process on the high-resolution and wide-angle-view microscopic image integrated into the image data file.

In S1154, the images in the range corresponding to the magnification of the objective lens 23 relating to the selection details acquired in S1152 are acquired from the microscopic images acquired in the preceding step and are displayed as partially enlarged images of the macro images on the monitor 5 with the macro images. Thus, the user can perform a virtual observation while watching the displayed microscopic image.

In S1155, it is determined whether or not the host system 2 has detected the operation to move the X-Y position by a user—that is, the operation for moving the display point of the specimen 19 at which it is displayed as a partially enlarged image on the monitor 5. If the determination result is YES, control is passed to S1156.

In S1156, the microscopic images temporarily stored in the predetermined work storage area of the host system 2 in S1153 or S1158 are referred to, and the display range for displaying the partially enlarged image in the microscopic image on the monitor 5 is moved in the direction and by the amount corresponding to the move operation detected in the preceding step, and is then switched and displayed on the monitor 5.

Thus, in S1156, by displaying an image using the microscopic image temporarily stored (cached) in the work storage area, the displayed image can be more smoothly switched than when an image data file is serially read from the data record unit 4.

Instead of temporarily storing the entire microscopic image acquired in S1153, only the partial image near the partial image displayed on the monitor 5 in the microscopic images can be stored in the work storage area. In S1156, in accordance with the performance by the user of the operation to move the X-Y position, the vicinal partial images are displayed, an image data file is read from the data record unit 4, and the partial images near the displayed partial images are acquired and stored in the work storage area.

After S1156, control is returned to the process in S1155.

In the determination in S1155, when the determination result is NO—that is, if it is determined that the move operation of the X-Y position has not been detected by a user—then control is passed to S1157.

In S1157, it is determined whether or not an instruction to switch the selection details of the objective lens 23 in the virtual observation of the specimen 19 has been acquired. If the determination result is YES, control is passed to S1158.

In S1158, the microscopic image at the resolution corresponding to the objective lens 23 relating to the selection details corresponding to the instruction acquired in the preceding step is acquired from the microscopic images integrated into the image data file read in S1151, and is temporarily stored in a predetermined work storage area of the host system 2. The microscopic image acquired and stored in the present step can be obtained by performing an image process such as, for example, a resizing process on the high-resolution and wide-angle-view microscopic images integrated into the image data file.

In S1159, images in the range corresponding to the magnification of the objective lens 23 relating to the selection details corresponding to the instruction acquired in S1157 are acquired from the microscopic images acquired in the preceding step, and the images displayed as partially enlarged images on the monitor 5 with the above-mentioned macro images are switched to the images acquired in this step and displayed.

After S1159, control is returned to S1155, and the above-mentioned processes are repeated.

In the determination in S1157, when the determination result is NO—that is, when it is determined that an instruction to switch the selection details of the objective lens 23 has not been acquired—control is returned to S1157, and the above-mentioned processes are repeated.

Figure 39:
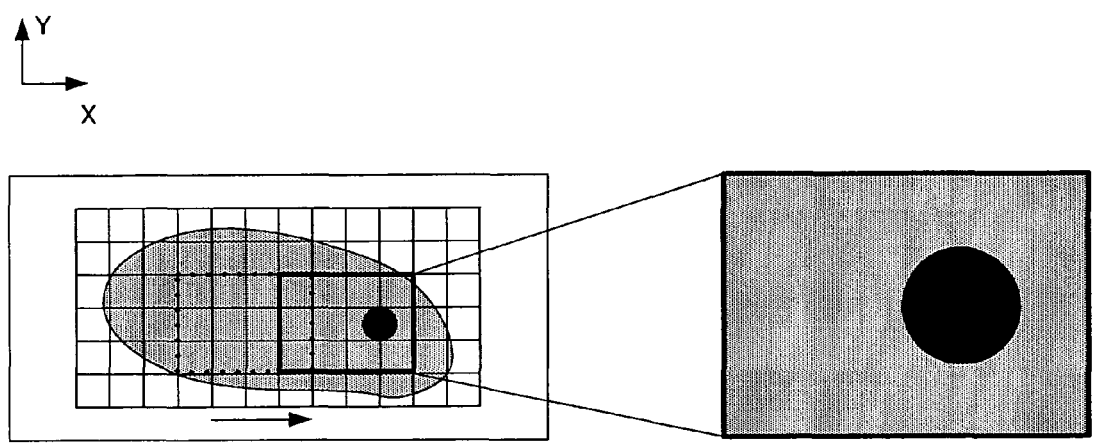
FIG. 39 is an explanatory view showing a macro image and a partially enlarged image displayed on the monitor in accordance with the movement of the X-Y position.

As described above, in the microscopic image reproduction and display process explained by referring to FIG. 37, if a user specifies the virtual observation via the fluorescent observation when the image data file is recorded in the data record unit 4 in the microscopic image data acquisition process explained by referring to FIGS. 33A and 33B, then the macro image of the specimen 19 as shown on the left of FIG. 38 and the partially enlarged image showing a partially enlarged portion of the macro image as shown on the right of FIG. 38, for example, can be displayed on the monitor 5 in the processes in S1151 through S1154. When a user performs a move operation in, for example, the X direction as a move operation of the X-Y position, the display of the partially enlarged image on the monitor 5 is switched from the display shown in FIG. 38 to, for example (as shown in FIG. 39), the display of the portion moved in the X direction in accordance with the move operation in the processes in S1155 and S1156. At this time, when the user specifies the switching of the selection of the objective lens 23 to a higher magnification, the display of the partially enlarged image on the monitor 5 is switched from the display shown in FIG. 39 to the display of the image that has been further enlarged at the specification, as shown in FIG. 40, in the processes in S1157 through S1159.

As described above, in the microscope system according to the present embodiment, in a so-called virtual microscope system in which an image of a specimen is reconstructed by combining the microscopic images obtained by capturing the specimen, the time required for applying the pumped light to the specimen can be shortest by acquiring an image using the fluorescent observation method on the basis of the capture coordinate (Z coordinate) obtained using the differentiation interference observation method, the fading can be avoided and the uneven fading for each mesh can also be avoided, thereby obtaining a high-quality and high-resolution fluorescent observation image.

In the present embodiment, capturing an image using the fluorescent observation method is explained on the basis of the capture coordinate (Z coordinate) acquired in the differentiation interference observation method. However, capturing an image with different observation methods on the basis of the capture information in an observation method is not limited to the exemplified observation method; other observation methods can be used in place of the exemplified one. For example, as an observation method to be used when a capture coordinate (Z coordinate) is acquired, a phase difference observation method can be applied instead of the differentiation interference observation method. In the explanation above, two observation methods are described, but three or more observation methods can be used.

Embodiment 7

The microscope system according to embodiment 7 of the present invention is explained below.

Figure 41:
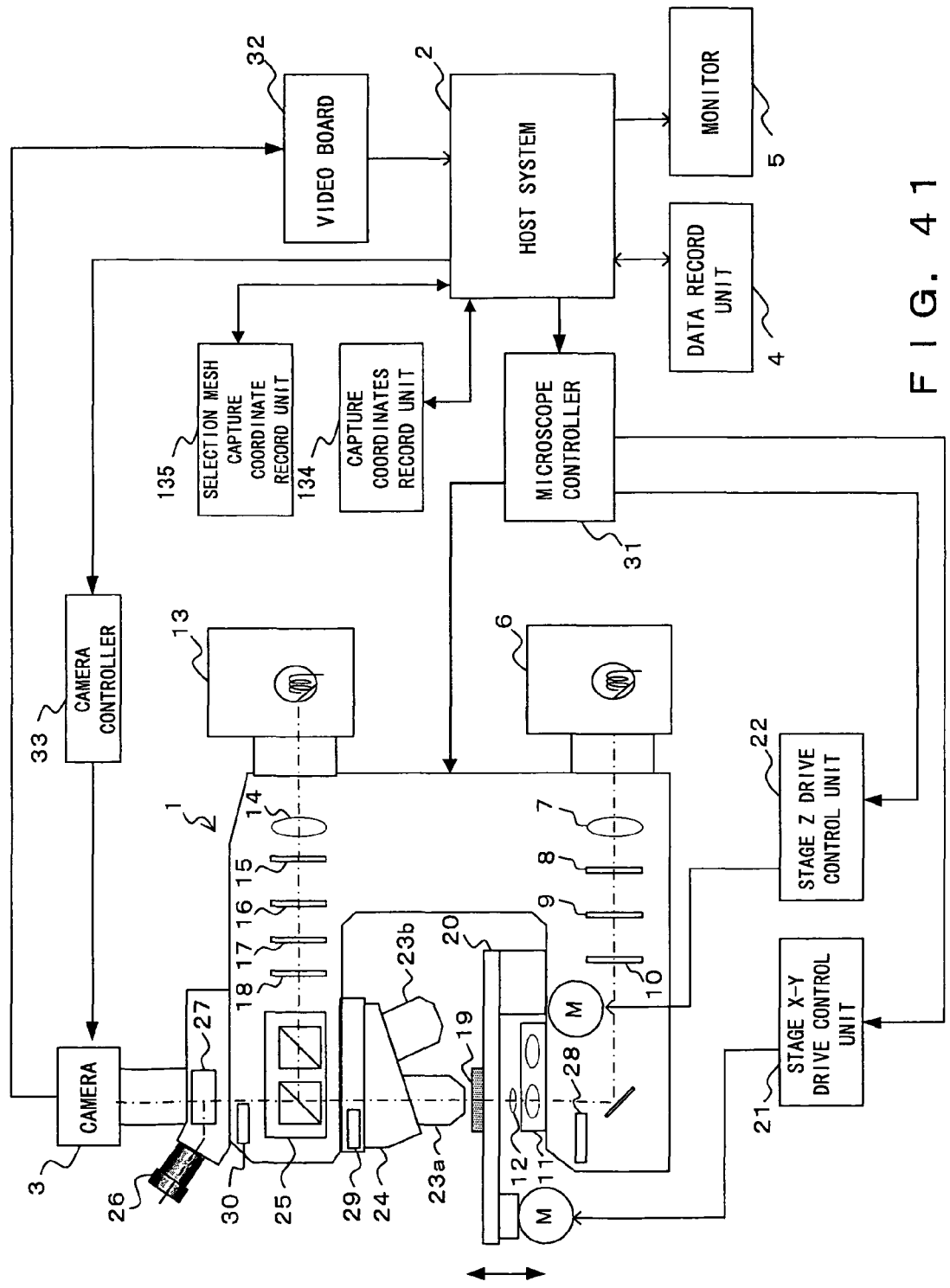
FIG. 41 shows an example of the configuration of the microscope system according to embodiment 6 of the present invention.

FIG. 41 shows an example of the configuration of the microscope system according to the present embodiment.

The microscope system shown in FIG. 41 is different from the microscope system shown in FIG. 32 in that the system includes a selection mesh capture coordinate record unit 135; the other details of the configuration are the same. The same components that are also shown in FIG. 32 are assigned the same reference numerals, and the explanation is omitted here.

Next, the operation of the microscope system according to the present embodiment is explained.

In the present embodiment, the process is explained below of acquiring a B-pumped fluorescent observation image (hereinafter referred to simply as a "B-pumped image") and a G-pumped fluorescent observation image (hereinafter referred to simply as a G-pumped image) that are images acquired using the fluorescent observation method using different pumped wavelengths.

Figure 42A:
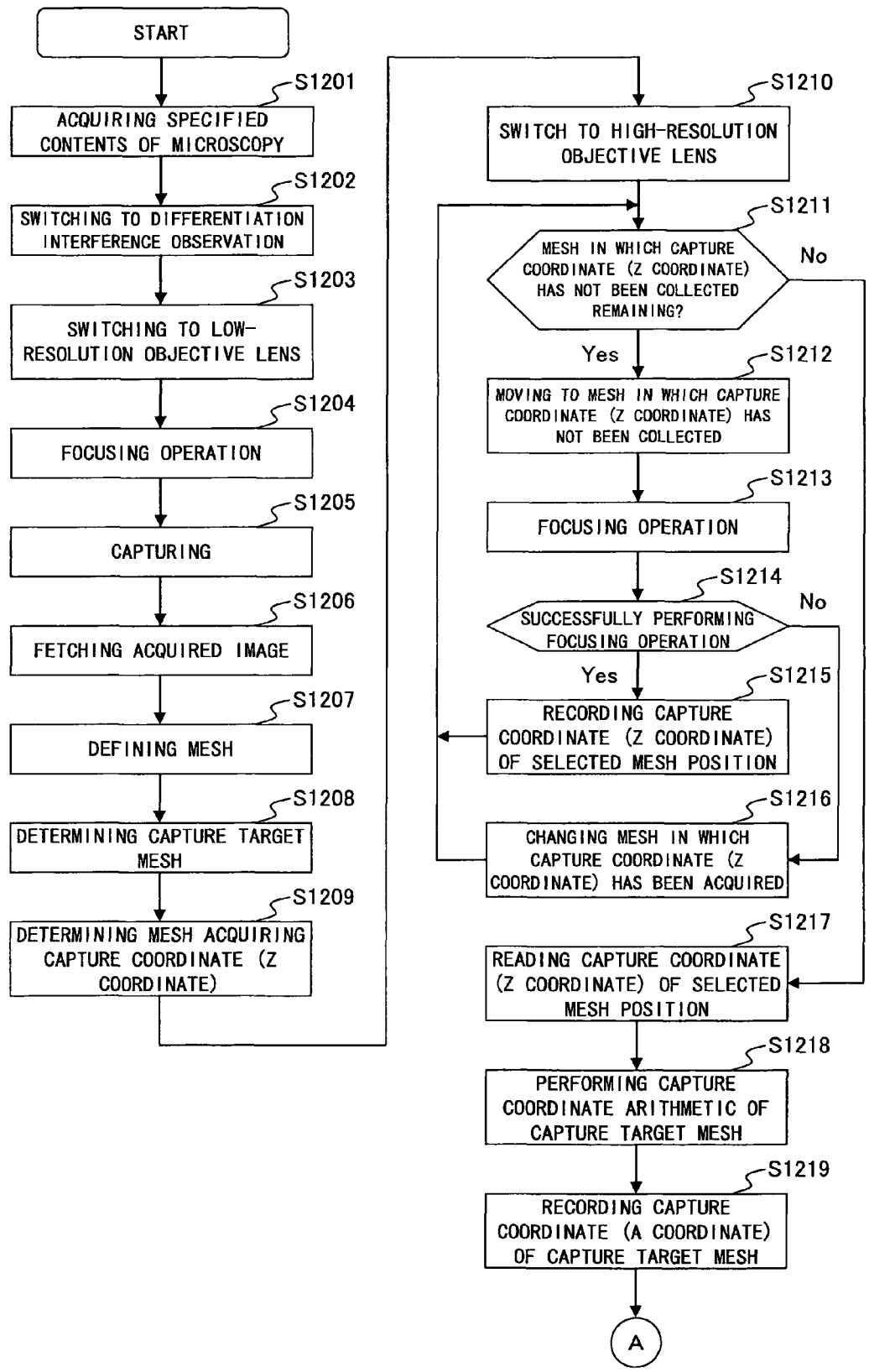
FIG. 42A is the first flowchart showing the microscopic image data acquisition process performed by the host system according to embodiment 6.
Figure 42B:
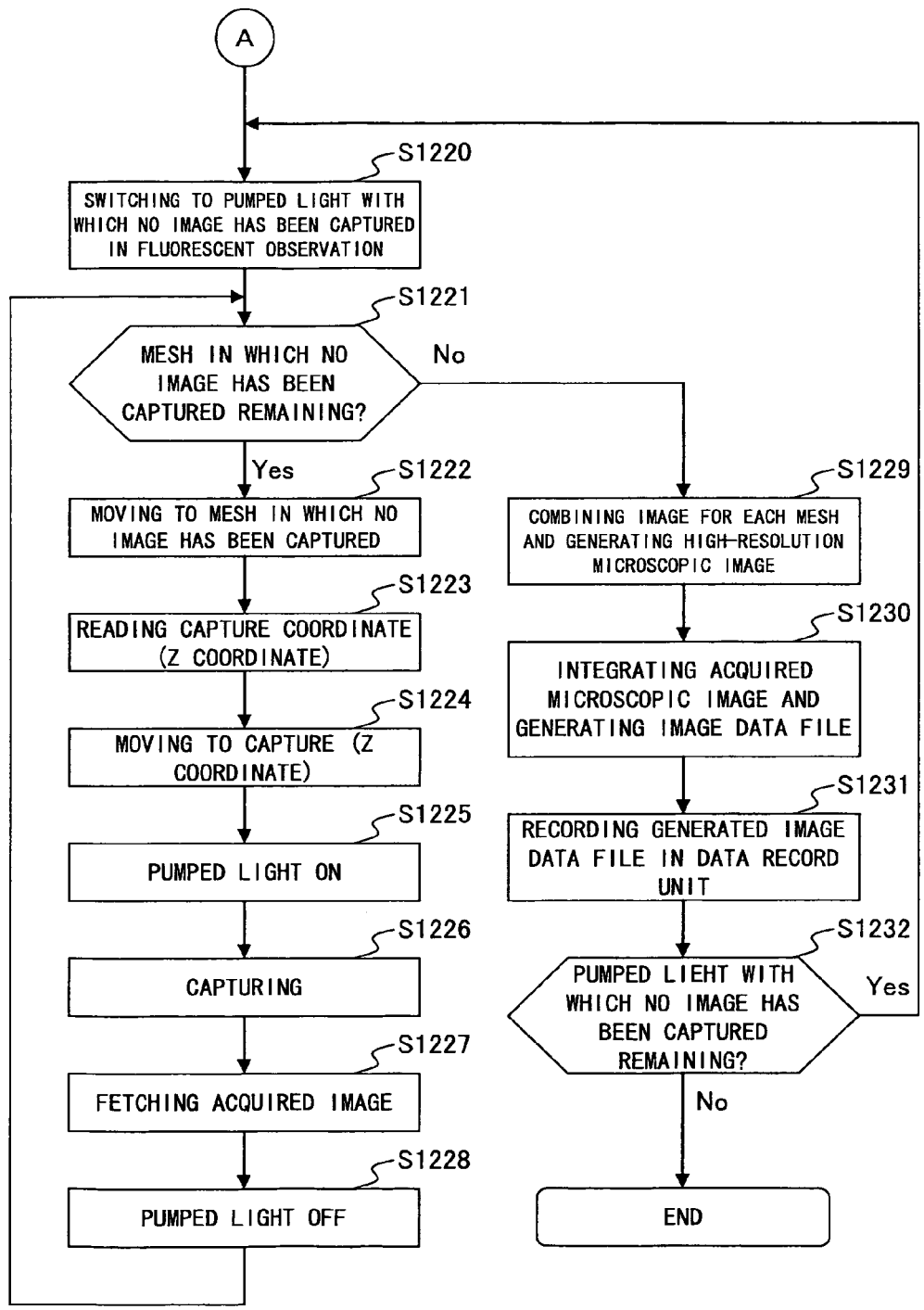
FIG. 42B is the second flowchart showing the microscopic image data acquisition process performed by the host system according to embodiment 6.

FIGS. 42A and 42B show flowcharts showing the microscopic image data acquisition process performed by the host system 2 according to the present embodiment. The process is performed to acquire the microscopic image data of the specimen 19 in the microscope system shown in FIG. 41, is realized, and is started by the CPU of the host system 2 executing a predetermined control program. In this process, the instruction and operation of a user are issued to and performed by the input, not shown in the attached drawings, of the host system 2.

First, in FIG. 42A, in S1201, the specification of an observation method (microscopy) of the specimen 19 is acquired from the user. In the present embodiment, it is assumed that the differentiation interference observation method is specified as an observation method when capture coordinates are acquired, and the B-pumped observation method and the G-pumped observation method are specified as observation methods when an image is captured.

Then, in S1202 through S1208, the processes similar to those in S1102 through S1108 explained by referring to FIG. 33A are performed. For example, in S1207, as shown in FIG. 34, 1×n=6×12 rectangular meshes are defined, and the capture target mesh indicated by bold lines is determined as shown in FIG. 35 in s1208.

In S1209, the meshes (hereinafter referred to as the "capture coordinate acquisition mesh") for acquiring the capture coordinate (Z coordinate) as focus coordinates for capturing an image are selected and determined from among the capture target meshes determined in the preceding step. For example, when the process in this step is performed when the capture target mesh as shown in FIG. 35 is performed, six meshes 1 through 6 indicated by the bold lines are selected and determined as capture coordinate acquisition meshes as shown in FIG. 43.

In the present embodiment, a capture coordinate acquisition mesh is automatically selected, but it is selected and determined without a capture target mesh of high importance as, for example, an observation target mesh corresponding to the end portion of the specimen 19, and a manual operation can be performed.

In S1210, the processes similar to those in S1109 explained by referring to FIG. 33A are performed.

In S1211, it is determined whether or not there are remaining meshes in the capture coordinate acquisition meshes that have not collected a Z coordinate (coordinate in the optical axis direction of the objective lens 23 being selected) as a capture coordinate in the focusing operation. If the determination result is YES, control is passed to S1212.

In S1212, an instruction is issued to the microscope controller 31, and the electric stage 20 is moved such that the portion of the specimen 19 displayed in the area of the capture coordinates acquisition mesh that has not collected a capture coordinate (Z coordinate) can be located immediately below the objective lens 23b.

In S1213, the control process for the focusing operation that is based on the contrast of the image of the specimen 19 captured by the video camera 3 is performed.

In S1214, it is determined whether or not the focusing operation in the preceding step has been successfully performed. If the determination result is YES, control is passed to S1215.

In S1215, the capture coordinate (Z coordinate) as a focus coordinate in the capture coordinates acquisition mesh being processed is stored in the selection mesh capture coordinates record unit 134. After S1215, control is returned to S1211.

If the determination result is NO in S1214—that is, when the focusing operation fails—control is passed to S1216.

In S1216, the capture coordinate acquisition mesh used when the focusing operation fails is changed to another mesh. That is, another mesh is defined as the capture coordinate acquisition mesh instead of the capture coordinate acquisition mesh currently being used when the focusing operation fails. For example, when the capture coordinate acquisition mesh being used when the focusing operation fails is the capture coordinate acquisition mesh of S3 shown in FIG. 43, the capture coordinate acquisition mesh is changed to the mesh of the vicinal mesh of S3'. After S1216, control is returned to S1211.

On the other hand, if the determination result in S1211 is YES—that is, if it is determined that the capture coordinates (Z coordinates) in all capture coordinate acquisition meshes have been acquired—control is passed to S1217. For example, in the example shown in FIG. 43, when each capture coordinate (Z coordinate) in S3', S4, S5, and S6 (hereinafter referred to as "S1 through S6") replacing the capture coordinate acquisition meshes S1, S2, and S3 are acquired, control is passed to S1217.

In S1217, the capture coordinates (Z coordinates) recorded in the selection mesh capture coordinate record unit 135 in S1215 are all read.

In S1218, from the capture coordinate (Z coordinate) read in the preceding step and the capture coordinate acquisition mesh for which the capture coordinate (Z coordinate) has been acquired, the capture coordinate (Z coordinate) in the capture target mesh in which the capture coordinate (Z coordinate) has not been acquired in the capture target mesh determined in S1208 is obtained in the arithmetic operation. For example, in the examples shown in FIGS. 35 and 43, each capture coordinate (Z coordinate) of the capture target meshes (refer to FIG. 35) other than the capture coordinate acquisition mesh is obtained by the arithmetic operation from the capture coordinate (Z coordinate) of the capture coordinate acquisition meshes S1 through S6 (refer to FIG. 43) read from the capture coordinates record unit 134. The arithmetic operation performed in this step could be, for example, interpolation via a numeric operation.

In S1219, the capture coordinate (Z coordinate) of the capture coordinate acquisition mesh read in S1218, and the capture coordinate (Z coordinate) of the capture target mesh obtained by an arithmetic operation in S1218—that is, the capture coordinate (Z coordinate) of all capture target meshes determined in S120—is recorded in the capture coordinates record unit 134. After S1219, control is passed to S1220 shown in FIG. 42B.

In S1220, an instruction is issued to the microscope controller 31, and the setting of the observation method for the microscope apparatus 1 is switched to the fluorescent observation method to be the observation method when an image is captured in S1201. However, in the present embodiment, since the B-pumped fluorescent observation method and the G-pumped fluorescent observation method are specified as fluorescent observation methods, it is assumed that the method is switched to the B-pumped fluorescent observation method. Thus, at the specification, the microscope controller 31 controls the operation of each component of the microscope apparatus 1 and sets the status of capturing an image in the B-pumped fluorescent observation method. At this time, the coordinates system of the specimen 19 is set by the origin point sensor of the electric stage 20 and by its initializing operation. Also, the incident-light shutter 16 is closed by the microscope controller 31, and the pumped light is in the OFF state.

In S1221, it is determined whether or not there is a remaining capture target mesh for which an image has not been captured using the fluorescent observation method switched to in the preceding step. If the determination result is YES, control is passed to S1222.

In the subsequent S1222 through S1228, processes similar to those in S1116 through S1122 explained by referring to FIG. 33b are performed.

On the other hand, when tie determination result is NO in the determination in S1221—that is, if it is determined that images have been completely captured for all capture target meshes in the current fluorescent observation method—control is passed to S1229.

In the subsequent S129 through S1231, the processes similar to those in S1123 through S1125 explained by referring to FIG. 33B are performed. Thus, on the basis of the capture coordinate (Z coordinate) in the capture coordinate acquisition mesh acquired in the differentiation interference observation method, an image data file into which high-resolution and wide-angle-view microscopic images obtained in the B-pumped fluorescent observation method are integrated is recorded in the data record unit 4.

In the subsequent S1232, it is determined whether or not there is pumped light not used in a capturing process—that is, whether or not there is a fluorescent observation method that has not been set yet. If the determination result is YES, control is returned to the process in S1220.

When control is returned to S1220, an instruction is issued to the microscope controller 31, and the setting of the observation method with regard to the microscope device is switched to that of a fluorescent observation method that has not yet been set. In the present embodiment, the setting is switched from the B-pumped fluorescent observation method to the G-pumped fluorescent observation method. Then, using the G-pumped fluorescent observation method, the processes in S1221 through S1231 are performed as in the above-mentioned B-pumped fluorescent observation method. Thus, on the basis of the capture coordinate (Z coordinate) in the capture coordinate acquisition mesh acquired in the differentiation interference observation method, the image data file into which the high-resolution and wide-angle-view microscopic images obtained in the G-pumped fluorescent observation method are integrated is stored in the data record unit 4.

If the determination result is NO in the determination in S1232—that is, if it is determined that there is no pumped light being used in capturing an image (no unset fluorescent observation method)—then the process terminates.

As described above, in the microscopic image data acquisition process explained above by referring to FIGS. 42A and 42B, first, in the process in S1203 through S1209, for example, the capture target mesh as shown in FIG. 35 and the capture coordinate acquisition mesh as shown in FIG. 43 (these two meshes are used as examples here) are determined on the low-resolution microscopic image of the specimen 19 acquired using the differentiation interference observation method, and then, in the processes in S1210 through S1219, the capture coordinate (Z coordinate) for the high-resolution microscopic image for each capture coordinate acquisition mesh is acquired and the capture coordinates (Z coordinates) for the high-resolution microscopic images for other capture target meshes are obtained via arithmetic operations. In the first process in S1220 through S1232, the high-resolution microscopic image for each capture target mesh is obtained using the B-pumped fluorescent observation method, the microscopic images are combined, and a high-resolution and wide-angle-view microscopic image of the specimen 19 can be generated using the B-pumped fluorescent observation method, as shown in FIG. 44. Then, in the second process in S1220 through S1232, the high-resolution microscopic image for each capture target mesh is obtained using the G-pumped fluorescent observation method, the microscopic images are combined, and the high-resolution and wide-angle-view microscopic image of the specimen 19 can be generated using the G-pumped fluorescent observation method, as shown in FIG. 44.

In the present embodiment, as in embodiment 6, by performing the microscopic image reproduction and display process explained by referring to FIG. 37, the microscopic image can be reproduced and displayed on the monitor 5 in order to perform a virtual observation on the microscopic image (B-pumped and G-pumped fluorescent observation images) displayed by the image data file recorded in the data record unit 4 by performing the microscopic image data acquisition process shown in FIGS. 42A and 42B.

In the microscope system according to the present embodiment, in the so-called virtual microscope system for reproducing an image of a specimen by combining microscopic images obtained by capturing the specimen, the time required to apply pumped light to the specimen can be minimized by acquiring an image in the B-pumped fluorescent observation method and the G-pumped fluorescent observation method on the basis of the capture coordinate (Z coordinate) obtained by the capture coordinate (Z coordinate) obtained in the differentiation interference observation method and an arithmetic operation, fading can be avoided, and uneven fading for each mesh can be simultaneously avoided, thereby obtaining a high-quality and high-resolution fluorescent observation image.

Since the capture coordinate (Z coordinate) in the capture target mesh is obtained by an arithmetic operation, the time required to acquire the capture coordinate (Z coordinate) in all capture target meshes can be shortened.

In the present embodiment, capturing an image using the fluorescent observation method for pumped light having two different wavelengths is explained above on the basis of the capture coordinate (Z coordinate) acquired in the differentiation interference observation method. However, from the point of view of capturing an image with different observation methods according to the capture information in an observation method, the present invention is not limited to the exemplified observation method of the pumped light with two wavelengths, and an observation method of pumped light having other wavelengths can also be used. Furthermore, an observation method of pumped light having three or more different wavelengths can be used. In the present embodiment, for example, a phase difference observation method can be applied for the differentiation interference observation method as an observation method when acquiring a capture coordinate (Z coordinate).

In each of the above-mentioned embodiments 6 and 7, when an image is captured with the fluorescent observation method using the capture coordinate (Z coordinate) acquired in the differentiation interference observation method, in addition to the capture of an image at the capture coordinate (Z coordinate), an image is captured in the position for each of the upper and lower limits from the capture position (Z coordinate), and a plurality of high-resolution microscopic images having different capture positions (Z coordinates) can be acquired for one capture target mesh. In this case, a plurality of high-resolution and wide-angle-view microscopic images having different capture positions (Z coordinates) can be acquired by generating a high-resolution and wide-angle-view microscopic image that indicates the entire specimen 19 by combining high-resolution microscopic images for each capture position (Z coordinate). Thus, it is also possible to display an image of corresponding capture position (Z coordinate) on the monitor 5 in accordance with the move operation in the z direction performed by a user.

In addition, in each of the above-mentioned embodiments 6 and 7, in a position that has less importance as an observation target in the specimen 19, such as a capture target mesh that has a low importance as an observation target, the focus position (Z coordinate) in the differentiation interference observation method and the focus position (Z coordinate) in the fluorescent observation method are acquired, the difference between the focus positions is obtained as an amount of offset, and in the above-mentioned microscopic image data acquisition process, an image can be captured using the fluorescent observation method on the basis of the coordinates (Z coordinates) obtained by subtracting the above-mentioned amount of offset from the capture coordinate (Z coordinate) acquired using the differentiation interference observation method.

In each of the above-mentioned embodiments 6 and 7, a video camera is used as an image capture device, but it can also be replaced with any of several other well-known capture devices such as a CCD camera, a line sensor, etc.

In each of the above-mentioned embodiments 6 and 7, the capture coordinate (Z coordinate) is acquired using the video AF function. In acquiring a capture coordinate, any other well-known focusing device can be used, or a capture coordinate can be acquired via manual focusing.

Additionally, in each of the above-mentioned embodiments 6 and 7, in the microscopic image data acquisition process a low-resolution microscopic image for which a mesh is defined is acquired by one image capturing operation using a low-magnification objective lens. However, it can also be acquired by, for example, combining images obtained by capturing the low-resolution microscopic images in a plurality of capturing operations.

The present invention can also be embodied by recording a process shown in the flowcharts in FIGS. 33A, 33B, 38, 42A, and 42B in a computer-readable recording medium after generating a control program for allowing the CPU of the computer to have a standard configuration, and by the CPU executing the program read by the computer from the recording medium.

The recording medium capable of reading a recorded control program by a computer can be, for example, a storage device such as ROM provided in a computer or as an external device attached to a computer or a hard disk, or a portable recording medium such as a flexible disk capable of reading a control program recorded by inserting it into a medium drive device provided for a computer such as MO (optical magnetic disk), CD-ROM, DVD-ROM, etc.

The recording medium can also be a storage device connected to a computer through a communication circuit and provided in a computer system functioning as a program server. In this case, a transmission signal obtained by modulating a carrier wave using a data signal that represents a control program is transmitted to a computer from a program server through a communication circuit that acts as a transmission medium, and a computer demodulates the received transmission signal to reproduce the control program, thereby enabling the CPU of the computer to execute the control program.

Embodiments 6 and 7 of the present invention are described above, but the present invention is not limited to the above-mentioned embodiments 6 and 7, and various improvements and changes can be realized within the scope of the gist of the present invention.

For example, in the microscope system according to each of the embodiments 6 and 7, an erect microscope is used as the microscope apparatus 1, but it is possible to use an inverted microscope, and the present embodiment can be applied to various systems such as line devices into which the microscope apparatus is incorporated.

As a further example, in each of the embodiments 6 through 7 above, a microscopic image captured by a microscope system is reproduced and displayed on the same microscope system. Alternately, the microscope system can be provided at separate places, an image data file of the microscopic images generated in one microscope system can be transmitted to another microscope system through a communication circuit, and the microscopic image represented by the image data file can be reproduced and displayed on the other microscope system.

Embodiment 8

Figure 45:
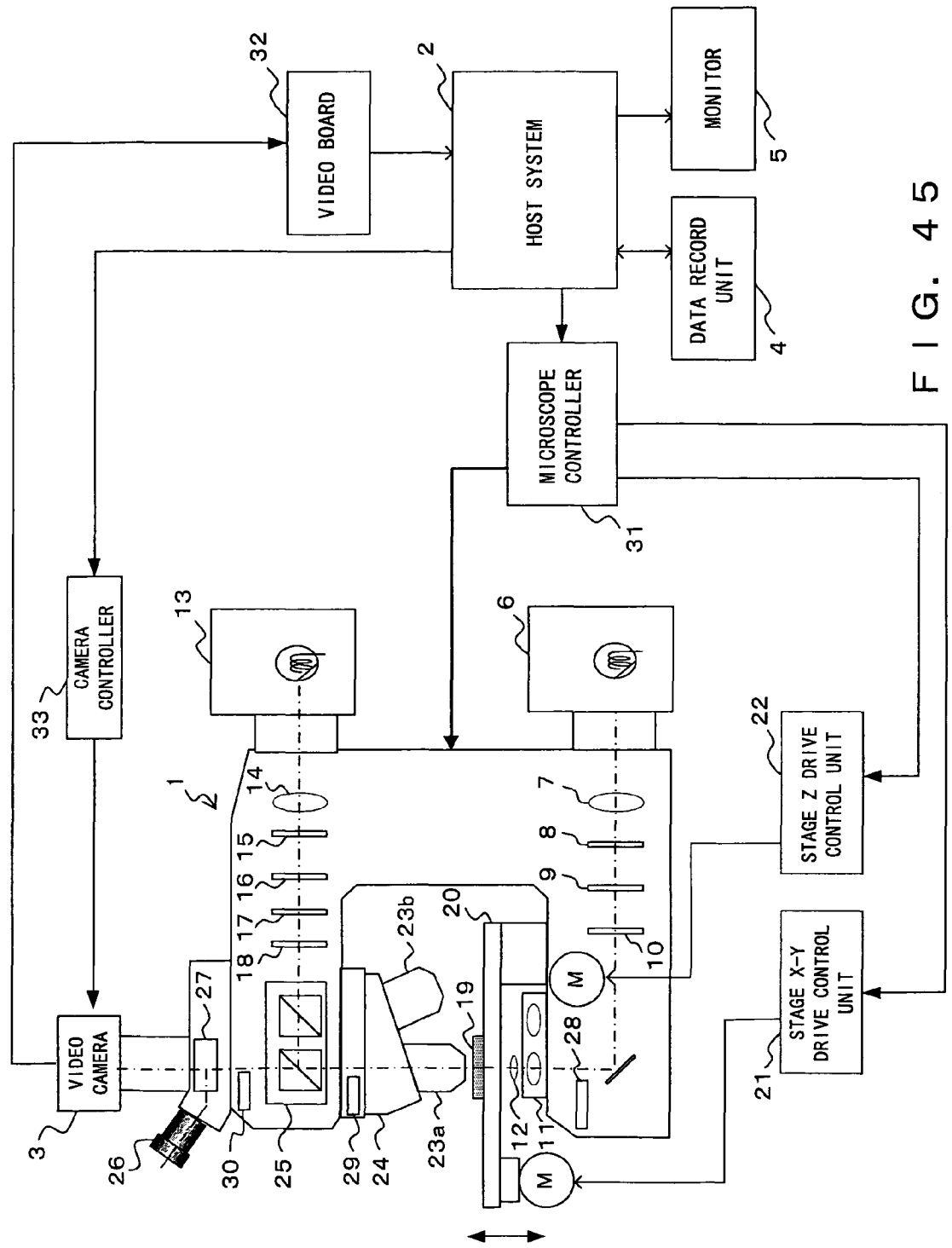
FIG. 45 shows an example of the configuration of the microscope system according to embodiment 7 of the present invention.

FIG. 45 shows an example of the configuration of the microscope system according to embodiment 8 of the present invention.

In FIG. 45, the microscope apparatus 1 includes as a transmission observation optical system the transmission illumination light source 6, the collector lens 7 for collecting illumination light of the transmission illumination light source 6, the transmission filter unit 8, the transmission field iris 9, the transmission aperture iris 10, the capacitor optical element unit 11, and the top lens unit 12. Furthermore, it includes as an incident-light observation optical system the incident-light illumination light source 13, the collector lens 14, the incident-light filter unit 15, the incident-light shutter 16, the incident-light field iris 17, and the incident-light aperture iris 18.

Furthermore, the electric stage 20 capable of moving up, down, right and left and of having the specimen 19 placed on it is provided on the observation optical path where the optical path of the transmission observation optical system overlaps the optical path of the incident-light observation optical system. The movement of the electric stage 20 is controlled by the stage X-Y drive control unit 21 and the stage Z drive control unit 22. The electric stage 20 has a function for detecting the origin point (not shown in the attached drawings) via an origin point sensor, and the coordinates can be set for each portion of the specimen 19 placed on the electric stage 20.

On the observation optical path, the revolver 24 for selecting the lens used in an observation from among a plurality of objective lens 23a, 23b, . . . (hereinafter referred to as an "objective lens 23" as necessary) via the rotation of the revolver, a cube unit 25 for switching the observation method (microscopy), and the beam splitter 27 for branching the observation optical path into the eyepiece 26 side and the video camera 3 side are included on the observation optical path. Furthermore, the polarizer 28 for differentiation interference observation, the DIC (differentiation interference contrast) prism 29, and the analyzer 30 can be inserted into the observation optical path. Each unit is power driven, and the operation is controlled by the microscope controller 31 described later.

The microscope controller 31 connected to the host system 2 has the function of controlling the operation of the entire microscope apparatus 1, controls the cube unit 25 and the revolver 24, adjusts the light of the transmission illumination light source 6 and the incident-light illumination light source 13, and has the function of transmitting the observation status (microscopy status) of the current microscope apparatus 1 to the host system 2. Furthermore, the microscope controller 31 is also connected to the stage X-Y drive control unit 21 and the stage Z drive control unit 22, and the electric stage 20 can also be controlled by the host system 2.

The microscopic image of the specimen 19 captured by the video camera 3 is fetched by the host system 2 through the video board 32. The host system 2 has the function of setting the capture conditions for setting the control of the automatic gain ON or OFF, for setting the gain, for setting the control of the automatic exposure ON or OFF, and for setting the exposure time on the video camera 3 via the camera controller 33. The host system 2 can store a microscopic image transmitted from the video camera 3 and a capture parameter transmitted from the camera controller 33 as an image data file in the data record unit 4. The image data recorded in the data record unit 4 is read by the host system 2, and the microscopic image expressed by the image data can be displayed on the monitor 5 as a display unit.

Furthermore, the host system 2 also provides a so-called video AF function for performing focusing on the basis of the contrast of the image captured by the video camera 3.

The host system 2 is a general-purpose computer that includes a CPU (central processing unit) for controlling the operation of the entire microscope system by executing a control program, main memory that is used by the CPU as work memory as necessary, an input unit such as a mouse, a keyboard, etc. for obtaining various instructions (for example, an instruction to set the capture condition) from a user, an interface unit for managing the communications of a variety of data with each component of the microscope system, and an auxiliary storage device such as a hard disk device for storing various programs and a variety of data.

Described below is the operation of the microscope system.

First, the process of acquiring the microscopic image data of the specimen 19 in the microscope system shown in FIG. 45 is described.

Figure 46:
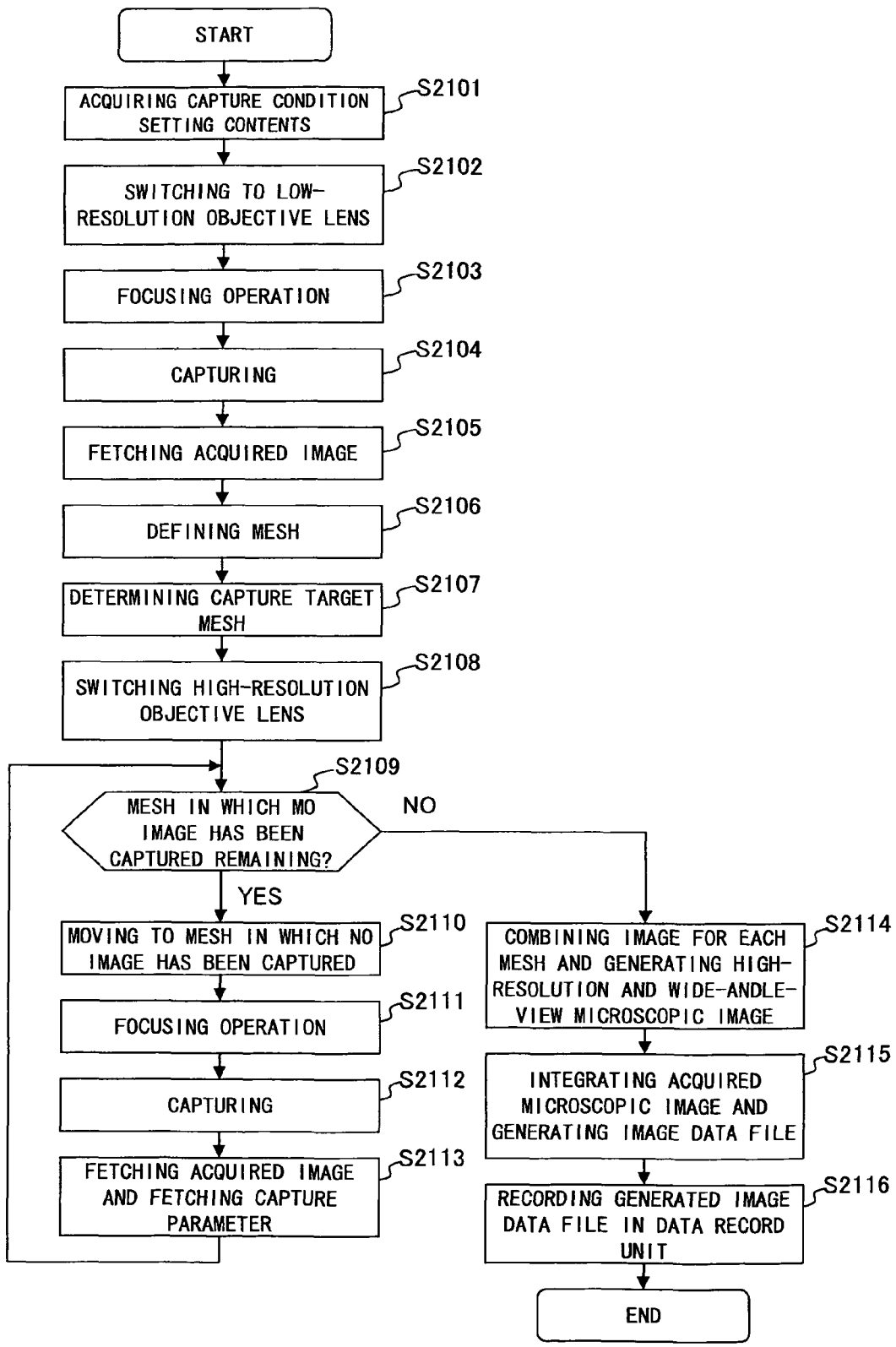
FIG. 46 is a flowchart of the microscopic image data acquisition process performed by a host system.

FIG. 46 is a flowchart of the microscopic image data acquisition process performed by the host system. The process is realized and started by the CPU of the host system 2 executing a predetermined control program. In this process, the instructions from and operation by a user are issued and performed via an input unit, not shown in the attached drawings, of the host system 2.

In S2101 In FIG. 46, an instruction to set a capture condition in the observation of the specimen 19 is acquired from a user. The capture condition can be the setting of the control of the automatic gain ON or OFF, the setting of gain, the setting of the control of automatic exposure ON or OFF, and the setting of the exposure time. When a large amount of information is obtained for each image to be acquired, it is desirable to set the automatic exposure control and the manual exposure control to an appropriate exposure time for each image to be acquired. In the present embodiment, it is assumed that an instruction to set the automatic exposure control is acquired in S2101.

In S2102, an instruction is issued to the microscope controller 31, the revolver 24 is rotated, and the low magnification objective lens 23a is selected.

In S2103, the controlling process for a focusing operation that is based on the contrast of the microscopic image of the specimen 19 captured by the video camera 3 is performed.

In S2104, an instruction is issued to the camera controller 33, and the entire image of the specimen 19 is captured by the video camera 3.

In S2105, a low-resolution microscopic image acquired in the preceding step is fetched from the video camera 3 to the host system 2 through the video board 32.

In S2106, a small section (hereinafter referred to as a mesh) corresponding to a view area (angle of view) when the specimen 19 is captured using the high-resolution objective lens 23b for the low-resolution microscopic image fetched in the preceding step. In the present embodiment, meshes of a 1×n (1 rows by n columns) rectangle are defined. Each defined mesh is assigned unique coordinates.

In S2107, it is determined whether or not the image of a portion of the specimen 19 is contained in each partial area of the low-resolution microscopic image divided by the mesh defined in the preceding step, and a mesh (hereinafter referred to as a "capture target mesh") for capturing an image using the high-resolution objective lens 23b is determined. The determination can be performed on the basis of, for example, the presence/absence of a contour image (contrast image) of the specimen 19 obtained by calculating the difference between adjacent pixels, the color of the image of each mesh, etc.

In S2108, an instruction is issued to the microscope controller 31, the revolver 24 is rotated, and a high magnification objective lens 23b is selected.

In S2109, it is determined whether or not there are remaining meshes in the capture target meshes determined in S2107 that do not have a captured image. If the determination result is YES, control is passed to S2110.

In S2110, an instruction is issued to the microscope controller 31, and the electric stage 20 is moved such that the portion of the specimen 19 displayed in the area of the capture target mesh that has no captured image can be located immediately below the objective lens 23b.

In S2111, the control process for the focusing operation that is based on the contrast of the image of the specimen 19 captured by the video camera 3 is performed.

In S2112, an instruction is issued to the microscope controller 31, and the video camera 3 performs the process of capturing an image. The capture condition at this time is set to the optimum exposure for the mesh area to be captured.

In S2113, the high-resolution microscopic image obtained in the capturing process in the preceding step is fetched from the video camera 3 to the host system 2 through the video board 32, and the capture parameters (the gain, exposure time, etc. of the video camera 3) when an image is captured is fetched from the camera controller 33.

After S2113, control is returned to S2109, and the above-mentioned processes are repeated. That is, a high-resolution microscopic image and the capture parameter when an image is captured are acquired for each capture target mesh determined in S2107.

On the other hand, in the determination in S2109, when the determination result is NO—that is, if it is determined that the capturing operation on all capture target meshes is completed—control is passed to S2114.

In S2114, in the high-resolution microscopic image in each of the acquired capture target meshes, the high-resolution microscopic images in the adjacent capture target meshes are combined, and a high-resolution and wide-angle-view microscopic image indicating the entire specimen 19 is generated.

In S2115, the high-resolution and wide-angle-view microscopic image generated in the preceding step, the low-resolution microscopic image fetched in S2105, and the high-resolution microscopic image and the capture parameter when an image is captured are integrated in the capture target mesh fetched in S2113 as one image data file.

In S2116, the image data file integrated in the preceding step is recorded in the data record unit 4.

In the above-mentioned microscopic image data acquisition process, not all capture target meshes are equally captured using the same capture parameter, but each capture target mesh is captured using the appropriate capture parameter for the particular mesh. Therefore, an image with no loss of image information can be obtained as a high-resolution microscopic image for each capture target mesh.

Figure 47:
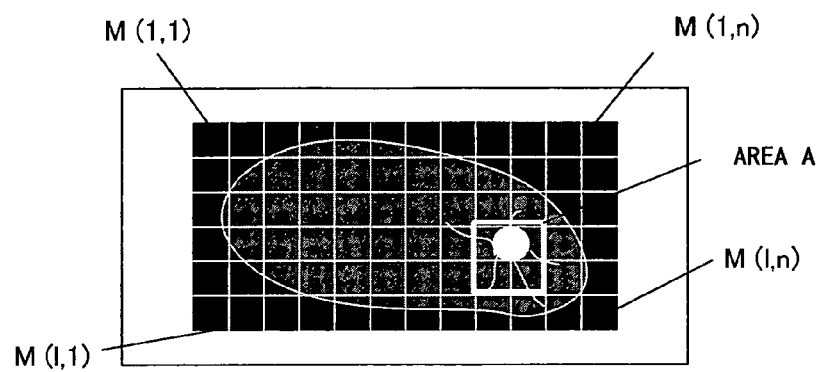
FIG. 47 shows an example of a high-resolution and wide-angle-view microscopic image generated in the microscopic image data acquisition process.

FIG. 47 shows an example of a high-resolution and wide-angle-view microscopic image generated in the microscopic image data acquisition process. It shows an example of the situation in which all meshes defined in S2106 are capture target meshes.

The high-resolution and wide-angle-view microscopic image shown in FIG. 47 is an image obtained by combining high-resolution microscopic images in each capture target mesh from mesh M (1, 1) through mesh M (1, n) (where 1=6, n=12 in FIG. 47).

In the example shown in FIG. 47, there is a kernel of high brightness at the portion of the specimen 19 in the mesh M (4, 9) and the mesh M (4, 10), while there is no such kernel in the portion of the specimen 19 in the mesh M (5, 9) or the mesh M (5, 10). The status is displayed of the image of area A enclosed by the bold line shown in FIG. 47.

Figures 48A, 48B:
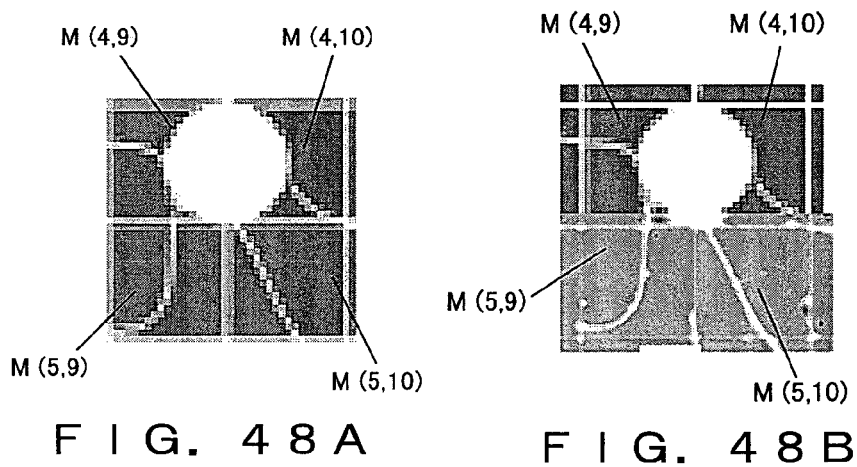
FIG. 48A is the first view showing an image obtained by combining high-resolution microscopic image s in the four meshes corresponding to the area A.
FIG. 48B is the second view showing an image obtained by combining high-resolution microscopic image s in the four meshes corresponding to the area A.

FIGS. 48A and 48B are views showing images obtained by combining high-resolution microscopic images in mesh M (4, 9), mesh M (4, 10), mesh M (5, 9), and mesh M (5, 10) corresponding to the area A. However, FIG. 48A is an image obtained when all capture target meshes are captured using the same capture parameter such that the gray-scale value is not saturated, and FIG. 48B shows the image obtained when an image is captured using an appropriate capture parameter such that the gray-scale value is not saturated for each capture target mesh—that is, an image obtained in the process shown in FIG. 46.

When the images shown in FIGS. 48A and 48B are compared with each other, it is confirmed that the amount of information on the images in mesh M (5, 9) and mesh M (5, 10) is quite different because the image information lost by capturing all capture target meshes using the same capture parameter can be stored without any loss by capturing each capture target mesh using an appropriate capture parameter. Thus, in the microscopic image data acquisition process, an image with no loss of image information can be obtained.

In the microscopic image data acquisition process relating to the present embodiment, as a capture condition setting in S2101, not only the settings of the above-mentioned automatic exposure control and manual exposure control, but also the setting of the capturing of an image in a short exposure time for each capture target mesh and the integration of image information, and the setting of the capturing of an image for an exposure time for several patterns can be performed as a capture condition setting in S2101. Thus, an image with no loss of image information can be obtained.

Next, the process is explained below of reproducing and displaying a microscopic image on the monitor 5 in order to perform a virtual observation of a microscopic image that is expressed by an image data file recorded on the data record unit 4 by performing the above-mentioned microscopic image data acquisition process.

Figure 49:
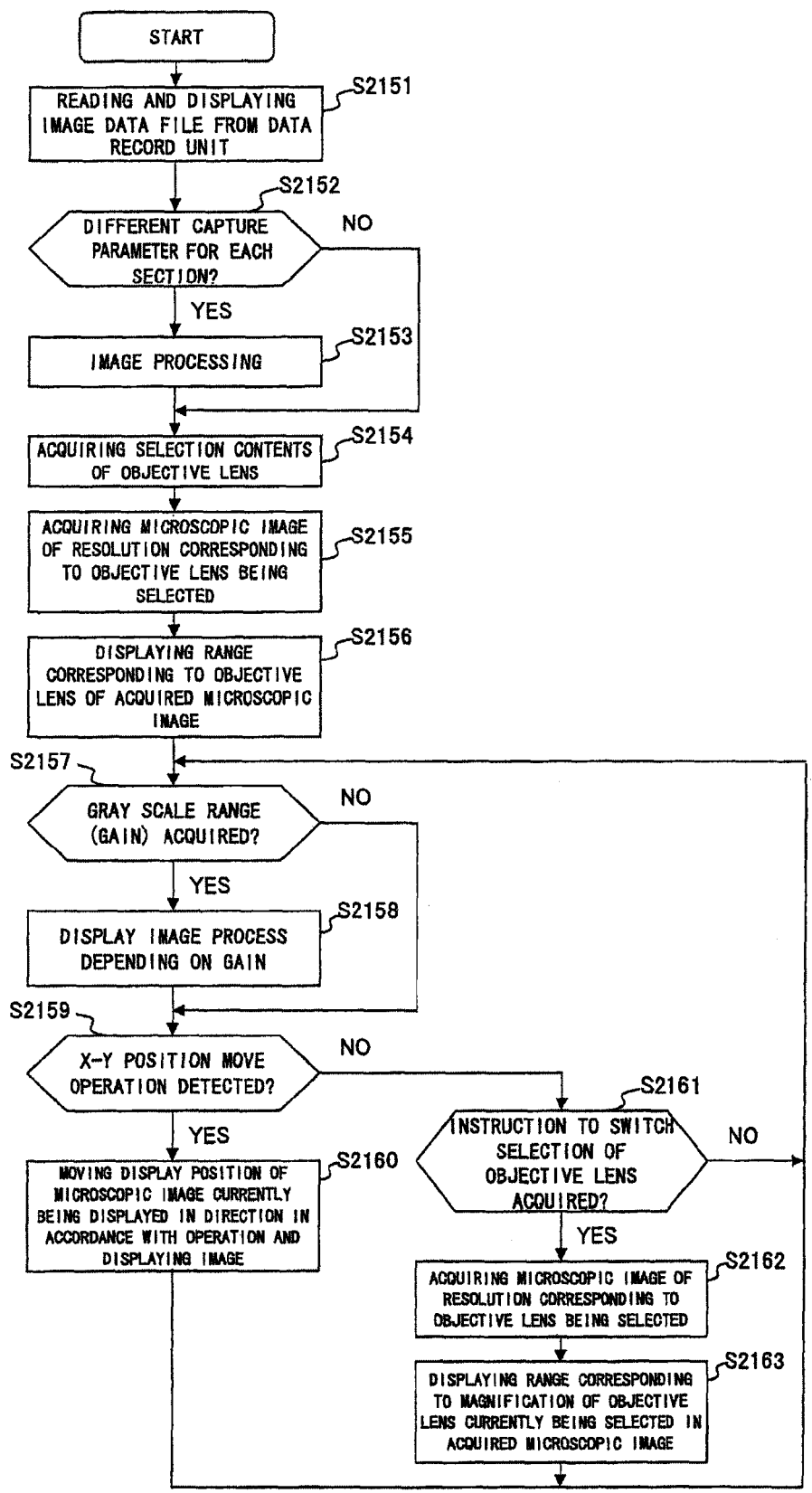
FIG. 49 is a flowchart of the microscopic image reproduction and display process performed by the host system according to embodiment 7.

FIG. 49 is a flowchart of the microscopic image reproduction and display process performed by the host system 2. The process is realized and started by the CPU of the host system 2 performing a predetermined control program. In this process, it is assumed that the instructions from and operation by a user are issued and performed via the input unit, not shown in the attached drawings, of the host system 2.

In S2151 in FIG. 49, an image data file that is stored in the data record unit 4 and into which microscopic images are integrated is read when the instruction is given by a user, and the process of displaying in monitor 5 a low-resolution microscopic image as a macro image in the microscopic images integrated into the image data file is performed.

In S2152, it is determined whether or not the capture parameter (for example, the exposure time) in each capture target mesh integrated into the image data file read in the preceding step is different. If the determination result is YES, control is passed to S2153. If NO, the process in S2153 is skipped.

In this determination, if the capture parameter in the capture target mesh is different, brightness information of the high-resolution microscopic images in the capture target meshes cannot be observed in relation to each other. In this case, the next process in S2153 is performed so that they can be observed in relation to each other.

That is, in S2153, on basis of the capture parameter (for example, exposure time, gain, etc.) in each capture target mesh integrated into the image data file read in S2151, the image processing (for example, the image processing relating to the normalization of gray scales) is performed so that the image can be represented as if it were an image obtained by the capturing process using a predetermined capture parameter for the high-resolution and wide-angle-view microscopic image integrated into the image data file (i.e., an image generated by combining high-resolution microscopic images obtained when all capture target meshes are captured using the same capture parameter), and the image is temporarily stored in a predetermined work storage area of the host system 2. The images stored in this step are hereinafter referred to simply as "first microscopic images".

In the present embodiment, the image processing is performed on the basis of the capture parameter in each capture target mesh. For example, the gray-scale value of the position of the combination between capture target meshes in the high-resolution and wide-angle-view microscopic image can be acquired, and the processing can be performed by making an amendment on the basis of the gray-scale value, and any other processing method can be used so far as similar effects can be acquired. The image processing can also be performed when the high-resolution microscopic images in each capture target mesh are combined (S2115 shown in FIG. 46). In the present embodiment, the first microscopic image can be integrated into the above-mentioned image data file.

In S2153, only when the gray-scale range of the first microscopic image exceeds a gray-scale range in which the monitor 5 can display images (hereinafter referred to simply as a "gray-scale display range") is the image processing of compressing the gray-scale value performed on the first microscopic image such that the gray-scale range of the image can be expressed in the gray-scale display range, and the result can be temporarily stored in a predetermined work storage area of the host system 2. The stored image is hereinafter referred to simply as a "second microscopic image".

In S2154, the selection details of the objective lens 23 in the virtual observation by a user are acquired.

In S2155, the microscopic image of the resolution corresponding to the objective lens 23 relating to the selection details acquired in S2151 (the microscopic image corresponding to the microscopic image obtained by capturing the specimen 19 using the objective lens 23 relating to the selection details) is acquired in the image processing process (such as the resizing process) from the second microscopic image (however, the first microscopic image is used when the second microscopic image has not been acquired) obtained in S2153 when the determination in S2152 is YES, or from the high-resolution and wide-angle-view microscopic images integrated into the image data file read in S2151 when the determination in S2152 is NO, and it is temporarily stored in a predetermined work storage area of the host system 2. The stored images are referred to simply as a "third microscopic image".

In S2156, an image in the range corresponding to the magnification of the objective lens 23 relating to the selection details acquired in S2152 is acquired from the third microscopic image acquired in the preceding step, and displayed along with the macro image on the monitor 5 as a partially enlarged image of the macro image. Thus, the user can perform a virtual observation by referring to the displayed microscopic image.

In S2157, it is determined whether or not the host system 2 has detected the operation (for example, the operation of specifying the upper or lower limit of a gray-scale range, etc.) of a user specifying a gray-scale range (gain). If the determination result is YES, control is passed to S2158. If it is NO, the process in S2158 is skipped.

In S2158, in the image displayed as a partially enlarged image on the monitor 5, an expressed image is acquired such that the gray-scale range (gain) specified in the operation detected in the preceding step in the image can be expressed in the gray-scale display range in the image processing for the first microscopic image temporarily stored in a predetermined work storage area of the host system 2 in S2153 when the determination in S2152 is YES, or in the image processing on the high-resolution and wide-angle-view microscopic image integrated into the image data file read in S2151 when the determination in S2152 is NO, and the image is switched and displayed as a partially enlarged image to be displayed on the monitor 5.

Thus, when the determination in S2152 is YES, even if a gray-scale value is compressed (image processing) on the first microscopic image such that an image can be expressed in the gray-scale display range in S2153, the gray-scale value is not decompressed (image processing) on the second microscopic image after compressing the gray-scale value in S2158, the gray-scale value is decompressed (image processing) on the first microscopic image before compressing the gray-scale value, thereby displaying a larger amount of image information, which results in the ability to observe images in more detail.

In S2159 it is determined whether or not the host system 2 has detected the performance by a user of the operation to move the X-Y position—that is, the operation of moving the display portion of the specimen 19 to be displayed as the partially enlarged image on the monitor 5. If the determination result is YES, control is passed to S2160.

In S2160, the third microscopic image temporarily stored in a predetermined work storage area of the host system 2 in the above-mentioned process in S2155 or the process in S2162 described later is referred to, the display range to be displayed on the monitor 5 as a partially enlarged image in the microscopic image is moved in the direction and by an amount in accordance with the move operation detected in the preceding step, and this display range is switched and displayed on the monitor 5.

Thus, in S2160, the third microscopic image temporarily stored (cached) in the work storage area is used and displayed, thereby switching the image display more smoothly than in the case in which an image data file is sequentially read from the data record unit 4.

It is also possible to store in the work storage area only a partial image near the partial image displayed on the monitor 5 in the microscopic images instead of temporarily storing the entire third microscopic image acquired in S2155 (or in S2162 described later) in the work storage area, to display the vicinal partial image in accordance with the user's movement of the X-Y position in S2160, to read an image data file from the data record unit 4, to acquire the partial image near the displayed partial image, and to store it in the work storage area.

After S2160, control is returned to S2157.

In the determination in S2159, when the determination result is NO—that is, when it is determined that the movement of the X-Y position by the user has not been detected, control is passed to S2161.

In S2161, it is determined whether or not an instruction to switch the selection details of the objective lens 23 in the virtual observation of the specimen 19 has been acquired. If the determination result is YES, control is passed to S2162.

In S2162, the microscopic image of the resolution corresponding to the objective lens 23 relating to the selection details corresponding to the instruction acquired in S2161 is acquired in the image processing process (such as the resizing process) from the second microscopic image (the first microscopic image when the second microscopic image has not been acquired) obtained in S2153 when the determination in S2152 is YES or from the high-resolution and wide-angle-view microscopic image integrated into the image data file read in S2151 when the determination in S2152 is NO, and the acquired image replaces the third microscopic image already stored in a predetermined work storage area of the host system 2 and is temporarily stored. That is, the image acquired in this step is temporarily stored as the third microscopic image.

In S2163, an image in the range corresponding to the magnification of the objective lens 23 relating to the selection details according to the instruction acquired in S2161 is acquired from the third microscopic image acquired in the preceding step, and the image displayed as a partially enlarged image on the monitor 5 is replaced with the image acquired in this step.

After S2163, control is returned to S2157, and the above-mentioned processes are repeated.

On the other hand, in the determination in S2161, when the determination result is NO—that is, if it is determined that an instruction to switch the selection details of the objective lens 23 has not been acquired—control is returned to S2157, and the above-mentioned processes are repeated.

As described above, in the microscopic image reproduction and display process, even if the high-resolution and wide-angle-view microscopic image integrated into the image data file is generated by combining the high-resolution microscopic images obtained in the capturing process using a different capture parameter, the high-resolution and wide-angle-view microscopic image can be displayed as if it were an image obtained by the capturing process using the same capture parameter and by performing image processing using the capture parameter of each high-resolution microscopic image integrated into the image data file.

Furthermore, by specifying the gray-scale range when an image is displayed as a partially enlarged image, the specified gray-scale range in the image can be represented in the gray-scale display range, and the image can be observed in detail. Additionally, although the image displayed when the gray-scale range is specified as an image that exists after compressing the gray-scale value, a larger amount of image information can be displayed by obtaining an image represented as described above in the image processing on the image before the compression of the gray-scale value, thereby allowing the observation of an image in more detail.

FIGS. 50A, 50B, and 50C are explanatory views with practical examples of the process in S2153 during the microscopic image reproduction and display process. As a simple explanation, the high-resolution and wide-angle-view microscopic image integrated into the image data file is an image generated by combining the high-resolution microscopic images into two small sections (capture target mesh). The capture parameters for each capture target mesh integrated into the image data file are exposure time and gain.

FIG. 50A shows a high-resolution and wide-angle-view microscopic image integrated into an image data file and the X position-intensity relationship of the image. As shown in FIG. 50A, the high-resolution and wide-angle-view microscopic image is generated by combining high-resolution microscopic images in two different small sections M1 and M2 having different capture parameters in the capture process. The high-resolution microscopic image in small section M1 is captured with an exposure time of 0.5 [s] and a gain of 1×, and the capture parameter in small section M1 refers to the exposure time of 0.5 [s] and the gain of 1×. The high-resolution microscopic image in small section M2 is captured with an exposure time of 1 [s] and a gain of 1×, and the capture parameter in small section M2 refers to the exposure time of 1 [s] and the gain of 1×.

In this case, in S2153, on the basis of the capture parameters of small sections M1 and M2 that are integrated into an image data file, the image processing is performed such that, for the high-resolution and wide-angle-view microscopic image shown in FIG. 50A, the image can be represented as if it were an image (an image generated by combining high-resolution microscopic images obtained in the capture process using the same capture parameter) obtained in the capture process using a predetermined capture parameter.

FIG. 50B shows the image obtained when the above-mentioned process is performed and shows the X position-intensity relationship of the image.

In this example, when the white balance, etc. is fixed, the image in small section M2 can be processed as an image captured using the same capture parameter as the capture parameter of the image in small section M1 by simply doubling the gray scale of the image. Thus, as shown in FIG. 50B, the images between small sections M1 and M2 are continuous images obtained by doubling the gray scale of the images in small section M2.

In S2153, when the gray-scale range of the image exceeds the gray-scale display range, the gray-scale value is compressed as image processing such that the gray-scale range of the image can be represented by the gray-scale display range for the image—that is, the image shown in FIG. 50B.

FIG. 50C shows the image obtained when the image processing is performed and shows the X position-intensity relationship of the image.

In this example, the gray-scale value of the image shown in FIG. 50B is compressed using a conversion coefficient (0.5 in this example), and an image represented by the gray-scale range (display range) is obtained.

FIGS. 51A, 51B, and 51C are explanatory views of the processes in S2158 in the above-mentioned microscopic image reproduction and display process.

FIG. 51A shows the image displayed on the monitor 5 in the process in S2156 (or S2163), and the X position-intensity relationship of the image.

FIG. 51B shows the display window displayed on the monitor 5 when the user specifies a gray-scale range (gain) in S2157.

In the display window, the image (image displayed as a partially enlarged image) displayed on the monitor 5 in the process in S2156 (or S2163) and the X position-intensity relationship of the image are displayed, and in the portion in which the P position-intensity relationship is displayed, two dotted lines indicating the upper and lower limits of the gray-scale range, which move up and down in the gray-scale range specified by a user, are shown.

Assuming that the gray-scale range indicated by the two dotted lines shown in FIG. 51B is specified by a user, then because the gray-scale range expressed by the two dotted lines is represented by the gray-scale display range in the image displayed in the display window in 2158, the represented image is acquired in either the image processing process for the first microscopic image temporarily stored in a predetermined work storage area of the host system in S2153 when the process in S2152 is YES or in the image processing process for the high-resolution and wide-angle-view microscopic image integrated into the image data file read in S2151 when the process in S2152 is NO, and the image is switched and displayed as a partially enlarged image on the monitor 5.

FIG. 51C shows the image obtained when the image processing is performed and shows the X position-intensity relationship of the image.

As shown in FIG. 51C, an image indicating the specified gray-scale range via a gray-scale display range is obtained. A gray-scale value not found in the specified gray-scale range will be considered the minimum value or the maximum value of the gray-scale display range, and this value will be considered broken or saturated.

In the examples shown in 51A, 51B, and 51C, a gray-scale range is specified by specifying the upper and lower limits of the gray-scale range. For example, buttons can be provided that correspond to a plurality of different gray-scale ranges, and the gray-scale range can be specified in accordance with the operation of the buttons.

FIGS. 52A, 52B, 52C, and 52D are explanatory views of examples of specifying a gray-scale range in accordance with the operation of the buttons.

Figure 52A:
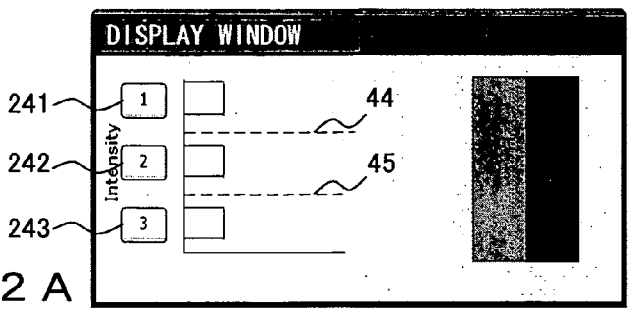
FIG. 52A is the first explanatory view showing an example of specifying a gray-scale range depending on the operation using a button.

FIG. 52A shows a display window displayed on the monitor 5 when the gray-scale range (gain) is specified by a user in S2157.

As shown in FIG. 52A, the display window according to the present example is slightly different from the display window shown in FIG. 51B. That is, in the display window of the example, the image (image displayed as a partially enlarged image) displayed on the monitor 5 in the process in S2156 (or S2163), the histogram of the image, and the three buttons 241, 242, and 243 for specification of the gray-scale range are displayed. The histogram has a vertical axis as a gray scale, and a horizontal axis as the number of pixels. The three buttons 241, 242, and 243 are buttons that correspond to the respective gray-scale range obtained by dividing the gray-scale display range into three equal portions. That is, the button 241 specifies the high-brightness gray-scale range in the three equal portions, the button 242 specifies the intermediate brightness gray-scale range in the three equal portions, and the button 243 specifies the low-brightness gray-scale range in the three equal portions. The dotted lines 244 and 245 in the histogram shown in FIG. 52A indicate the boundaries of the gray-scale ranges that are equally divided into three portions.

In the display window shown in FIG. 52A, if the button 241 is operated (selected), the process in S2158 is performed by assuming that the gray-scale range corresponding to the button 241 has been specified.

Figure 52B:
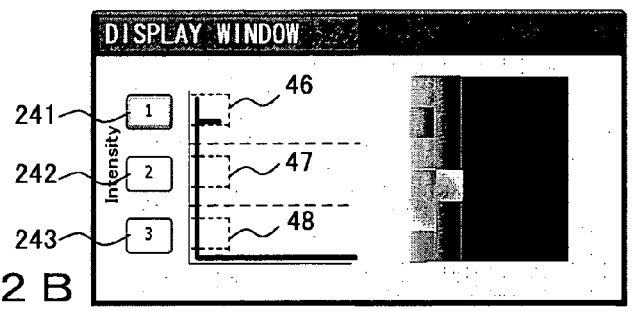
FIG. 52B is the second explanatory view showing an example of specifying a gray-scale range depending on the operation using a button.

FIG. 52B shows a display window when the button 241 is operated. As shown in FIG. 52B, the image displayed in the display window shown in FIG. 52A is switched to the image of the high-brightness gray-scale range corresponding to the button 241 in the image and represented by the gray-scale display range. At this time, the image displayed as a partially enlarged image on the monitor 5 is correspondingly switched.

Thus, since the high-brightness gray-scale range corresponding to the button 241 is decompressed and a represented image is displayed, the high-brightness gray-scale range of the image shown in FIG. 52A can be observed in detail. However, since other portions of the gray-scale range have the minimum values of the gray-scale display range, they are broken.

Figure 52C:
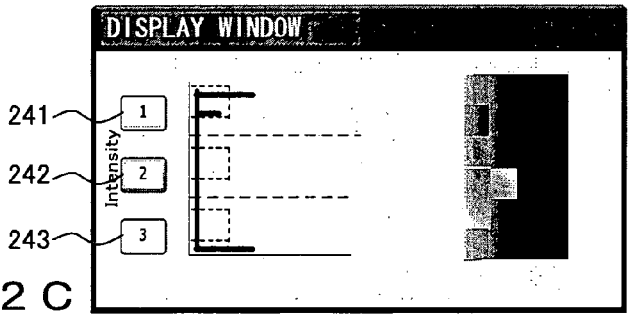
FIG. 52C is the third explanatory view showing an example of specifying a gray-scale range depending on the operation using a button.
Figure 52D:
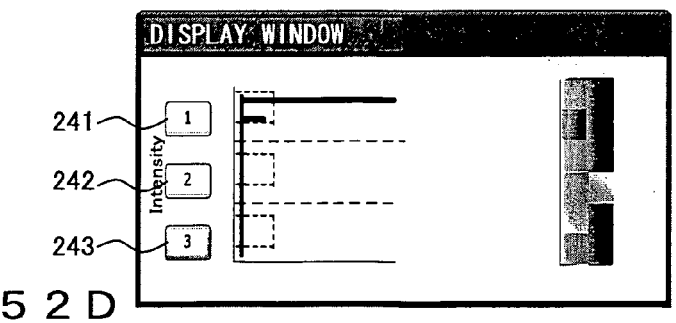
FIG. 52D is the fourth explanatory view showing an example of specifying a gray-scale range depending on the operation using a button.

The dotted lines 246, 247, and 248 in the histogram shown in FIG. 52B show the histograms shown in FIG. 52A (which are the same as those in FIGS. 52C and 52D). The dotted lines 246, 247, and 248 may not be displayed.

In the display window shown in FIG. 52A, or when the button 242 is operated (selected), the process in S2158 is performed by assuming that the gray-scale range corresponding to the button 242 is specified.

FIG. 52C shows the display window that is displayed when the button 242 is operated. As shown in FIG. 52C, the image displayed in the display window shown in FIG. 52A is switched to the image of the intermediate brightness gray-scale range corresponding to the button 242 in the image represented by the gray-scale display range. At this time, the image displayed as a partially enlarged image on the monitor 5 is switched correspondingly.

Thus, since the image represented by decompressing the intermediate brightness gray-scale range corresponding to the button 242 is displayed, the intermediate brightness gray-scale range of the image shown in FIG. 52A can be observed in detail. However, other portions of the low-brightness gray-scale range have the minimum values of the gray-scale display range as gray-scale values. Therefore, they are considered to be broken. Since the high-brightness gray-scale range portions have the maximum values as gray-scale values, they are considered to be saturated.

In the display window shown in FIG. 52A, or when the button 243 is operated (selected), the process in S2158 is performed by assuming that the gray-scale range corresponding to the button 243 has been specified.

FIG. 52D shows the display window displayed when the button 243 is operated. As shown in FIG. 52D, the image displayed in the display window shown in FIG. 52A is switched to the image of the low-brightness gray-scale range corresponding to the button 243 of the image represented by the gray-scale display range. At this time, the image displayed as a partially enlarged image on the monitor 5 is also switched correspondingly.

Thus, the image of the low-brightness gray-scale range corresponding to the button 243 is decompressed and represented. Therefore, the low brightness gray-scale range of the image shown in FIG. 52A can be observed in detail. However, since other gray-scale range portions have the maximum values of the gray-scale display range, they are considered to be saturated.

As described above, according to the present embodiment, since the capture parameter used in the capture process of the high-resolution microscopic image in each small section is integrated into the image data file, the image can be displayed as if it were an image obtained in the capture process using the same capture parameter by performing the image processing on the basis of the capture parameter that has been integrated into the image data file even if an image obtained by combining high-resolution microscopic images with different capture parameters is displayed.

Via a user specifying a desired gray-scale range, the gray-scale range is represented as a gray-scale display range. Therefore, the specified gray-scale range in the image displayed as a partially enlarged image can be observed in detail.

In the present embodiment, when a gray-scale range is specified, the image processing is performed such that a specified gray-scale range is represented by the gray-scale display range as explained above by referring to FIGS. 51A, 51B, 51C or 52A, 52B, 52C and 52D, and the gray-scale ranges other than the specified gray-scale ranges are considered to be broken or saturated. A user may request to, for example, observe a part of the gray-scale range in detail, but to roughly observe other gray-scale ranges. Therefore, as explained below, it is possible to flexibly specify the gray-scale range in an image represented by a gray-scale display range.

FIGS. 53A and 53B show examples of display windows in which a gray-scale range of the image can be flexibly specified. The display window shown in FIG. 53A corresponds to the display window shown in FIG. 51B. M1 and M2 shown in FIGS. 53A and 53B correspond to two capture target meshes.

If a user, using an input device such as a mouse, transforms a graph indicating the X position-intensity relationship (for example, a gamma correction) displayed in the display window to a desired shape in accordance with the level of the gray-scale range to be observed when the display window shown in FIG. 53 is displayed, then image processing will be performed such that the gray-scale range of the image displayed in the display window can be changed in accordance with the shape of the transformed graph, and the image displayed in the display window and the image displayed as a partially enlarged image are switched to the image that results from the image processing. This same image is also obtained in the image processing on the first microscopic image temporarily stored in a predetermined work storage area of the host system 2 in S2153 when the determination in S2152 is YES, or in the image processing on the high-resolution and wide-angle-view microscopic image integrated into the image data file read in S2151 when the determination in S2152 is NO.

FIG. 53B shows an example of a display window that is displayed after the gray-scale range is flexibly specified. According to the display window of the example, the image of the area corresponding to the M2 displayed in the display window shown in FIG. 53A can be observed in detail, and the image of the area corresponding to the M1 can be roughly observed.

Alternately, in configurations other than the configuration explained by referring to FIGS. 53A and 53B for example, image processing can be performed by a user specifying a part of area of a partially enlarged image displayed on the monitor 5 such that the gray-scale range in the area can be represented by a gray-scale display range.

Embodiment 9

Described below is the microscope system according to embodiment 9 of the present invention.

The microscope system according to the present embodiment is different from the microscope system according to embodiment 8 only in the operation relating to the microscopic image reproduction and display process, and is the same in other aspects of the configuration and operations.

That is, in the microscope system according to the present embodiment, in the microscopic image reproduction and display process, the image processing for representing an image as if it were an image obtained in the capturing process using the same capture parameter is not performed on the entire high-resolution and wide-angle-view microscopic image integrated into an image data file, but is performed only on the image in the range displayed on the monitor 5.

Figure 54:
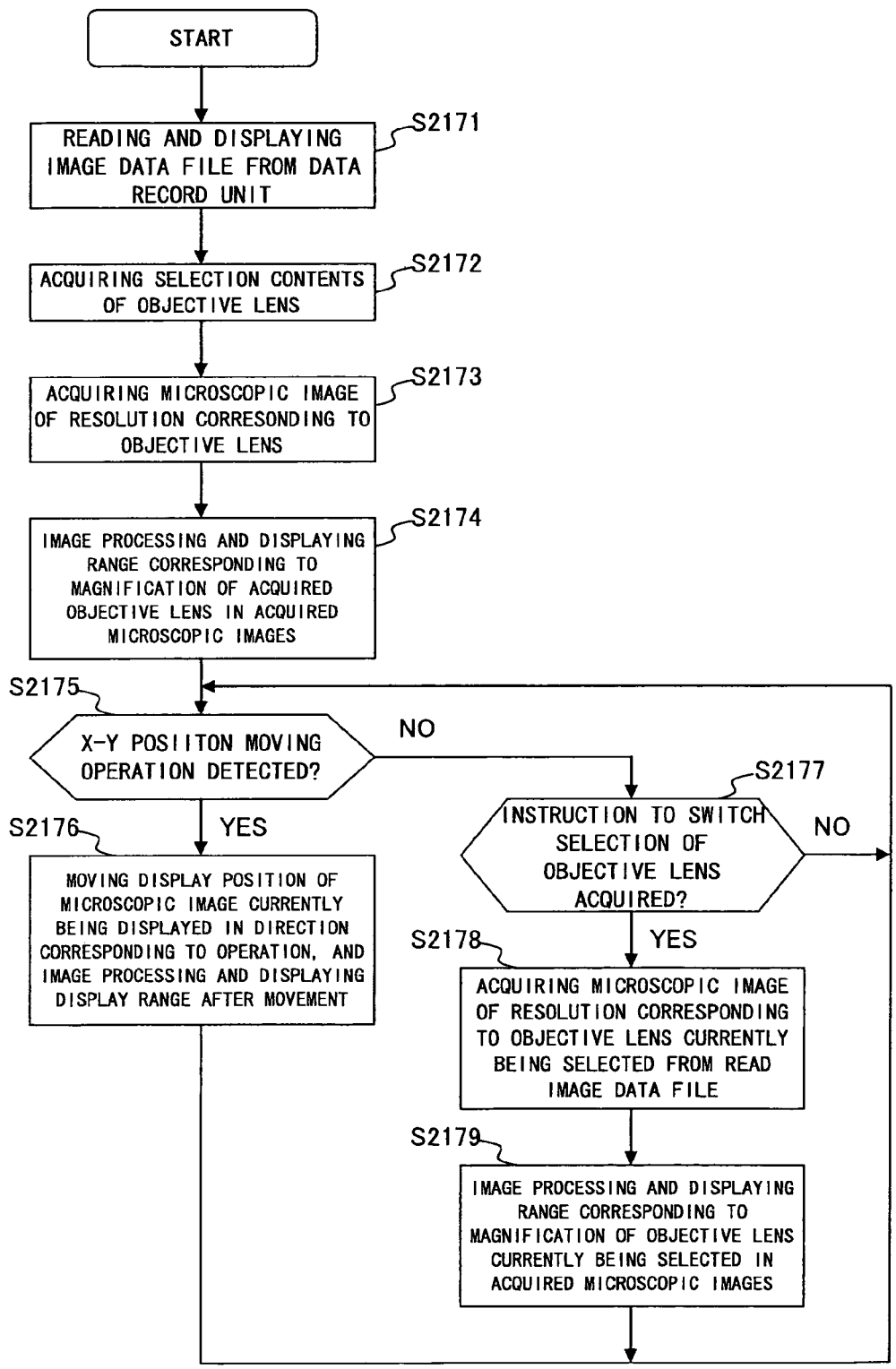
FIG. 54 is a flowchart of the microscopic image reproduction and display process performed by the host system according to embodiment 8.

FIG. 54 is a flowchart of the microscopic image reproduction and display process performed by the host system 2 according to the present embodiment. This process is also realized and started by the CPU of the host system 2 executing a predetermined control program. Also in this process, the instructions from and operation by a user are assumed to be issued to and performed on the input unit of the host system 2.

In S2171 In FIG. 54, an image data file into which microscopic images are integrated and that is stored in the data record unit 4 is read upon receiving the instruction from a user, and in the microscopic image integrated into the file, low-resolution microscopic images are displayed on the monitor 5 as macro images.

In S2172, the selection details of the objective lens 23 in the virtual observation of a user are acquired.

In S2173, from the high-resolution and wide-angle-view microscopic images integrated into the image data file read in S2171, the microscopic images of the resolution corresponding to the objective lens 23 that relates to the selection details acquired in the preceding step (microscopic images obtained by the capture of the specimen 19 using the objective lens 23 that relates to the selection details) are acquired in the image processing process (such as the resizing process) and are temporarily stored in a predetermined work storage area of the host system 2. The stored image is hereinafter referred to simply as the "fourth microscopic image".

In S2174, from the fourth microscopic image acquired in the preceding step, an image in the range corresponding to the magnification of the objective lens 23 that relates to the selection details acquired in S2172 is acquired, and on the basis of the capture parameter (for example, exposure time, gain, etc.) in the corresponding capture target mesh integrated with the image data file read in S2171, the image processing (for example, the image processing relating to the normalization of gray scales) is performed on the acquired image such that the image can be represented as if it were obtained in the capture process using a predetermined capture parameter, and the image is display on the monitor 5 together with the macro image as a partially enlarged image of the macro image. However, if the gray-scale range of the image on which the image processing is performed exceeds the gray-scale display range, the image processing of compressing a gray-scale value is performed on the image on which the above-mentioned image processing is performed such that the gray-scale range of the image can be represented in the gray-scale display range, and the image is displayed together with the macro image as a partially enlarged image of the macro image on the monitor 5. Thus, the user can perform a virtual observation while checking the microscopic image being displayed.

In S2175, it is determined whether or not the movement of the X-Y position by a user—that is, the operation for moving the display portion of the specimen 19 displayed as the partially enlarged image on the monitor 5—has been detected by the host system 2. If the determination result is YES, control is passed to S2176.

In S2176, the fourth microscopic image temporarily stored in the predetermined work storage area of the host system 2 in S2173 described above or S2178 described later is referred to, the display range displayed on the monitor 5 as a partially enlarged image in the microscopic image is moved in a direction and by an amount that depend on the move operation detected in the preceding step, the image in a new display range is acquired, the image processing is performed on the acquired image such that the image can be represented as if it were obtained in the capture process using a predetermined capture parameter that is based on the capture parameter in the corresponding capture target mesh that has been integrated into the image data file read in S2171, and the image is switched and displayed on the monitor 5 as a partially enlarged image. However, when the gray-scale range of the image on which the image processing is performed exceeds the gray-scale display range, the image processing of compressing the gray-scale value is performed on the image on which the above-mentioned image processing is performed such that the gray-scale range of the image can be represented by the gray-scale display range, and the resultant image is switched and displayed on the monitor 5 as a partially enlarged image.

Thus, in S2176, the fourth microscopic image temporarily stored (cached) in the work storage area is used, thereby switching the image display more smoothly than when image data files are sequentially read from the data record unit 4.

It is also possible to store in the work storage area only the partial image that is near the partial image displayed on the monitor 5 in the microscopic images instead of temporarily storing the entire fourth microscopic image acquired in S2173 (or in S2178 described later) in the work storage area, to display the vicinal partial image in accordance with the user's movement of the X-Y position in S2176, to read an image data file from the data record unit 4, to acquire the partial image near the displayed partial image, and to store it in the work storage area.

After S2176, control is returned to S2175.

In the determination in S2175, when the determination result is NO—that is, when it is determined that the performance by the user of the operation to move the X-Y position has not been detected—control is passed to S2177.

In S2177, it is determined whether or not an instruction to switch the selection details of the objective lens 23 in the virtual observation of the specimen 19 has been acquired. If the determination result is YES, control is passed to S2178.

In S2178, from the high-resolution and wide-angle-view microscopic image integrated into the image data file read in S2171, the microscopic image of the resolution corresponding to the objective lens 23 that relates to the selection details acquired in the preceding step (microscopic image corresponding to the microscopic image obtained in the capture process of the specimen 19 using the objective lens 23 that relates to the selection details) is acquired in the image processing process (such as the resizing process) and is switched from the already stored fourth microscopic image and temporarily stored in a predetermined work storage area of the host system 2. That is, the image acquired in this step is temporarily stored as the fourth microscopic image.

In S2179, an image in the range corresponding to the magnification of the objective lens 23 relating to the selection details is acquired from the fourth microscopic image acquired in the preceding step upon receiving an instruction acquired in S2179, the image processing is performed on the acquired image such that the image can be represented as if it were an image obtained in the capture process using a predetermined capture parameter that is based on the capture parameter in the corresponding capture target mesh integrated into the image data file read in S2171, and it is switched and displayed as a partially enlarged image on the monitor 5. If the gray-scale range of the image on which the image processing is performed exceeds the gray-scale display range, the image processing of compressing the gray-scale value is performed on the image on which the above-mentioned image processing is performed such that the gray-scale range of the image can be represented in the gray-scale display range, and the resultant image is switched and displayed as a partially enlarged image on the monitor 5.

After S2179, control is returned to S2175, and the above-mentioned processes are repeated.

On the other hand, when the determination result is NO in the determination in S2177—that is, when it is determined that an instruction to switch the selection details of the objective lens 23 has not been acquired—control is returned to S2175, and the above-mentioned processes are repeated.

As described above, in the microscopic image reproduction and display process, the image processing is performed only on the images in the display range such that the image can be represented as if it were obtained in the capture process using a predetermined capture parameter and can be represented in the gray-scale display range. Thus, the gray-scale range of the image in the display range is smaller than the gray-scale range of the entire image, which includes the image of the display range. Therefore, a larger amount of image information can be displayed by performing the above-mentioned image processing only on the images in the display range, thereby representing an image in more detail.

FIGS. 55A, 55B, and 55C are explanatory views of a part of the microscopic image reproduction and display process that explain the process by referring to a practical example. However, in this example, for convenience in explanation, the high-resolution and wide-angle-view microscopic image integrated into an image data file is an image generated by combining high-resolution microscopic images in the four small sections (capture target meshes) M1, M2, M3, and M4. It is assumed that the capture parameter in each small section is different, but using, respectively, one time, two times, three times, and four times the gray scale of the high-resolution microscopic image in the M1, M2, M3, and M4 sections enables the resultant images to be processed as the images obtained in the capture process using the same capture parameters.

FIG. 55A shows the fourth microscopic image obtained in the process in S2173. If the process in S2174 is started and the image in the display range is the image in the area corresponding to M3 and M4, then the image processing is performed on the image in the areas corresponding to M3 and M4 such that the images in the areas M3 and M4 can be represented as if they were images obtained by the capture process using a predetermined capture parameter, and can be represented in the gray-scale display range.

FIG. 55C shows an image in the area corresponding to M1 to M4 that is displayed when the above-mentioned image processing is performed.

On the other hand, FIG. 55B shows an image in the area corresponding to M1 to M4 that is displayed when the image in the area corresponding to M3 and M4 is in the display range and after performing the image processing on the fourth microscopic image shown in FIG. 55A such that the image can be represented as if it were an image obtained in the capture process using a predetermined capture parameter and can be represented in the gray-scale display range.

When the image in the display area shown in FIG. 55B is compared with the image in the display area shown in FIG. 55C, the image in the display area shown in FIG. 55C can be displayed with image information in more detail because the gray-scale range of the image of the area corresponding to M3 and M4 is smaller than the gray-scale range of the image of the area corresponding to M1 to M4 that functions as a gray-scale range of an image to be processed. By performing the image processing such that the gray-scale range of the image in a small gray-scale range can be represented by the gray-scale display range, a larger amount of image information can be displayed, thereby allowing an image to be observed in more detail.

As described above, according to the present invention, the image processing to be performed such that an image can be represented as if it were an image obtained in the capture process using a predetermined capture parameter and such that the image can be represented in a gray-scale display range is performed only on the image in the display range, thereby allowing the display of a larger amount of image information and the observation of an image in more detail.

In the present embodiment, as in embodiment 8, as explained above by referring to FIGS. 51A, 51B, and 51C, 52A, 52B, 52C, and 52D, a process can be performed such that the gray-scale range specified in the image displayed as a partially enlarged image can be represented in the gray-scale display range in accordance with the specification of the gray-scale range. Otherwise, as explained above by referring to FIGS. 53A and 53B, the gray-scale range can be flexibly specified.

Embodiments 7 and 8 of the present invention are explained above, but the present invention is not limited to embodiments 7 and 8, and various improvements and changes can be made within the gist of the present invention.

For example, in the microscopic image data acquisition process according to embodiments 7 and 8, one high-resolution microscopic image is acquired for one capture target mesh, but a plurality of high-resolution microscopic images having different capture parameters can be acquired for one capture target mesh. In this case, in the microscopic image data acquisition process, after a focusing operation on one capture target mesh, the capture process is performed several times using different capture parameters (for example, different exposure times) upon receiving a set instruction for a capture condition from a user, a plurality of high-resolution microscopic images having different capture parameters are acquired, and the capture parameter in the capture process is acquired for each high-resolution microscopic image. A plurality of high-resolution microscopic images having different capture parameters obtained for each capture target mesh and the capture parameter for each high-resolution microscopic image are integrated with the image data file. In this case, the high-resolution and wide-angle-view microscopic image integrated with the image data file is generated by, for example, combining high-resolution microscopic images (high-resolution microscopic image having the largest amount of image information) obtained by capturing an image using an appropriate capture parameter in each capture target mesh.

As another example, in the microscope system according to embodiments 7 and 8, the focusing operation is realized using a video AF function provided by the host system 2, but other well-known focusing devices can be used or the focusing operation can be manually performed.

As another example, in the microscope system according to embodiments 7 and 8, an erect microscope is adopted as the microscope apparatus 1, but it can be replaced with an inverted microscope, and the present embodiment can be applied to various systems such as a line device or other devices into which a microscope apparatus can be incorporated.

As another example, in each of the embodiments 7 and 8, a microscopic image captured by a microscope system is reproduced and displayed by the same microscope system. Alternately, the microscope systems can be mounted in places distant from each other, an image data file of microscopic images generated by one microscope system can be transmitted to the other microscope system using a communication line, and the other microscope system can reproduce and display a microscopic image displayed by the image data file.

As another example, in the microscope system relating to embodiments 7 and 8, a video camera is used as a capture device, but a well known image fetching device such as a CCD, a line sensor, etc. can also be applied.

As another example, the microscope system according to embodiments 7 and 8 can be applied to the entire microscope system. Particularly in the time lapse observation often used in performing an observation on a living cell, one or all of the processes relating to each embodiment can be used in determining the observation obtain of the time lapse.

For example, in the microscopic image reproduction and display process in embodiments 7 and 8, although capture parameters are different in each small section integrated into an image data file, the high-resolution and wide-angle-view microscopic image integrated into the image data file—that is, the high-resolution and wide-angle-view microscopic image generated by combining each high-resolution microscopic image having different capture parameters—can be displayed as is.

The present invention can also be embodied by recording the processes shown in the flowchart in FIGS. 46, 49, and 54 in a computer-readable recording medium after generating a control program for enabling the CPU of the computer that has a standard configuration, and by executing by the CPU the program read by the computer from the recording medium.

The recording medium capable of reading a recorded control program by a computer can be, for example, a storage device such as ROM provided in a computer or as an external device attached to a computer, a hard disk, etc., or can be a portable recording medium such as a flexible disk capable of reading a control program recorded by inserting into a medium drive device provided for a computer, MO (optical magnetic disk), CD-ROM, DVD-ROM, etc.

The recording medium can also be a storage device connected to a computer through a communication circuit and provided in a computer system functioning as a program server. In this case, a transmission signal obtained by modulating a carrier wave using a data signal that represents a control program is transmitted to a computer from a program server through a communication circuit that acts as a transmission medium, and a computer demodulates the received transmission signal to reproduce the control program, thereby enabling the CPU of the computer to execute the control program.

According to the present invention, with the above-mentioned configuration the microscopy can be smoothly switched in a so-called virtual microscope system that provides a microscopic image of a specimen in an image data format.

Furthermore, according to the present invention, a high-quality image can be acquired without fading even when an image is captured using a fluorescent observation method in the so-called virtual microscope system that is used for reconstituting an image of a specimen by combining images after the specimen is captured.

In addition, according to the present invention, image data can be acquired without a loss of image information by capturing each small section by using an appropriate capture parameter in the so-called virtual microscope system that is used for reconstructing the image of a specimen by combining the images obtained by capturing a specimen in small sections. Even though the images of each small section of a combined image are obtained using different capture parameters, the capture parameter in the capturing process is stored for each image in each small section. Therefore, in the image processing that is based on the capture parameter, the combined image can be displayed as if it were obtained in the capturing process using a predetermined capture parameter.

Furthermore, by limiting the range of the image processing to, for example, the display range, a larger amount of the information about the image (image data) in the small section that is included in the display range can be displayed.

What is claimed is:

1. A microscope system, comprising:

a stage on which a specimen is placed;

a division unit which divides the specimen into a plurality of sections;

a capture condition setting unit which sets a capture condition used when capturing the specimen;

a capture unit which captures the specimen based on the capture condition set by the capture condition setting unit, and which acquires an image of each section of the specimen;

a capture parameter acquisition unit which acquires, for each section of the specimen, a corresponding capture parameter set when the image of each section was acquired;

an image composition unit which combines images of adjacent sections acquired by the capture unit to obtain a composite image;

an image display unit which displays the composite image; and an image processing unit which performs a first image process on the composite image when the capture parameters acquired by the capture parameter acquisition unit are different for each of the sections, wherein in the first image process, processing is performed to represent the composite image as if it were obtained by combining images of adjacent sections which were acquired using a same predetermined capture parameter.

2. The system according to claim 1, further comprising an image display range specification unit which specifies a display range of an image, wherein the image processing unit performs the first image process within the display range specified by the image display range specification unit on the composite image obtained by the image composition unit.

3. The system according to claim 1, wherein when a gray scale range of an image on which the first image process is performed exceeds a gray scale range that can be displayed by the image display unit, the image processing unit further performs a second image process on the image on which the first image process is performed such that the gray scale range of the image can be represented by a gray scale range that can be displayed by the image display unit.

4. The system according to claim 3, further comprising a gray scale range specification unit which specifies a gray scale range, wherein the image processing unit further acquires an image in which a gray scale range specified by the gray scale range specification unit in an image in which the first or second image process is performed can be represented in a gray scale range that can be displayed by the image display unit in a third image process to be performed on an image on which the first image process is performed.

5. The system according to claim 1, wherein the capture unit acquires images of the sections using different capture parameters plural times such that plural images of each of the sections are acquired.

6. The microscope system according to claim 1, wherein the capture parameter is at least one of a gain and an exposure time.

7. The microscope system according to claim 1, wherein the first image process is an image process relating to normalization of gray scales.

* * * * *